(12) United States Patent
Messenger

(10) Patent No.: US 7,170,891 B2
(45) Date of Patent: Jan. 30, 2007

(54) HIGH SPEED DATA CLASSIFICATION SYSTEM

(75) Inventor: Brian Scott Messenger, Monte Sereno, CA (US)

(73) Assignee: Messenger Terabit Networks, Inc., Los Gatos, CA (US)

( * ) Notice: Subject to any disclaimer, the term of this patent is extended or adjusted under 35 U.S.C. 154(b) by 1024 days.

(21) Appl. No.: 09/944,572

(22) Filed: Aug. 30, 2001

(65) Prior Publication Data

US 2003/0231630 A1    Dec. 18, 2003

(51) Int. Cl.
*H04L 12/28* (2006.01)

(52) U.S. Cl. .................................. 370/392; 370/401

(58) Field of Classification Search ............ 370/230, 370/386, 392, 401; 714/728, 735, 739
See application file for complete search history.

(56) References Cited

U.S. PATENT DOCUMENTS

| | | | |
|---|---|---|---|
| 4,530,095 A * | 7/1985 | Ryan .......................... | 714/801 |
| 5,546,503 A * | 8/1996 | Abe et al. .................... | 706/25 |
| 5,907,614 A * | 5/1999 | Bergstrom et al. ..... | 379/413.04 |
| 5,974,104 A * | 10/1999 | Dhara ........................ | 375/368 |
| 6,714,144 B1* | 3/2004 | Reed et al. .................. | 341/50 |
| 2001/0055274 A1* | 12/2001 | Hegge et al. ............... | 370/229 |
| 2005/0083921 A1* | 4/2005 | McDermott et al. ........ | 370/360 |

OTHER PUBLICATIONS

Li et al. "On the design and analysis of unmatched LDSR pattern generators in pseudorandom testing" IEEE CNF, Feb. 1993, pp. 217-222.*

* cited by examiner

*Primary Examiner*—Doris H. To
*Assistant Examiner*—Saba Tsegaye
(74) *Attorney, Agent, or Firm*—Michael A. Glenn; Glenn Patent Group

(57) ABSTRACT

An optical network packet classification architecture is disclosed that addresses the packet classification requirements for OC-768 optical routers and beyond. The herein disclosed system is used for ultra-high speed packet classification of optical data at either the serial data stream level for maximum performance, or after it has been converted into parallel words of data. The presently preferred embodiment of the invention provides a system that operates in the receive path, where electronic data are provided by the optical interface to the data framer. The invention incorporates unique features into a traditional optical data framer chip and relies on a complex ASIC to permit the user to differentiate between up to 10,000 different patterns at ultra-high speeds. One purpose of the general purpose system disclosed herein is to eliminate the need for costly and power consumptive content addressable memory systems, or customer pattern specific ASICs, to perform network packet classification. The system operates on a principle of adaptive programmable randomization to permit a differentiation between the input vectors to be made. The invention dramatically reduces the processing burden required by high-speed optical routers or switches.

21 Claims, 22 Drawing Sheets

HIGH SPEED DATA CLASSIFICATION SYSTEM

BACKGROUND OF THE INVENTION

1. Technical Field

The invention relates to computer networks. More particularly, the invention relates to an information processing system.

2. Description of the Prior Art

Communication between computers over the Internet can be compared to the delivery of mail and packages by the United States Postal Service. Users access the Internet through a variety of options, e.g. phone modems, DSL modems, cable modems, T-1 lines, local area networks, wireless networks, and wide area networks.

In the world of the U.S. Postal Service, access to the mail system could be through a mail-slot in the door of your home, a mailbox at the street in front of your home, a post office box on a street corner, a post office counter, or a post office box. By analogy, each user of the Internet is assigned an address, and the Internet infrastructure learns how to deliver messages intended for them.

In the world of the Postal Service, the zip code, city, street, and street number are used progressively to determine how to route and deliver the mail. Users of the Internet rely on various networking protocols to transfer messages between computers.

In the world of the Postal Service, the protocols for delivering the mail include First Class Delivery, Next Day Air, Parcel Post, and Bulk. In the world of the Internet, messages are sent in packets, as opposed to the letters that are sent in the world of the Post Office. These packets contain information necessary for delivery, and this information is found in the Packet Header. This packet header includes the recipient's addresses and the sender's address, as well as the delivery method and style of message. The packet header is comparable to all of the information that is visible on the outside of a letter or package, i.e. recipient's address, return address, mail type, and specific handling instructions, such as FRAGILE. The remainder of an Internet packet contains user data. This user data is comparable to what is found inside an envelope or package. The Internet infrastructure has no more need to see the user data to route and deliver the message to the intended computer accurately than the post office has to open the mail it handles to figure out where to send it. Table A below shows a typical Internet packet.

TABLE A

| Typical Internet Packet | |
|---|---|
| Packet Header | Data Payload |

As computers are tied together over the World Wide Web, the physical connections between the computers look like a giant spider web. The thick strands of this web transfer huge numbers of packets between big cities to move them along their way. This is comparable to the air or truck traffic carrying millions of letters between postal hubs. At each connection point on the World Wide Web, a sorting function must be performed to determine which direction a message should be sent. This sorting of packets is similar to the process where high-speed postal sorters scan letters to determine their addresses and figure out which direction to send them. Sorting of data packets is often referred to as packet classification An optical router is a device that has many input/output (I/O) ports or connections. Each I/O port connects through an optical fiber to another optical router, optical switch, or optical adapter that can be located a long distance geographically from the first device. In simplistic terms, the purpose of an optical router is to receive data packets on each I/O port, to interpret the headers within the packet, and to route the packet out the appropriate I/O port towards the destination computer. If an optical router is unable to sort packets quickly enough, packets backup and are potentially lost by the router. In such case, the Internet slows down and computer users may lose their connections. As more and more people use the Internet, the situation internal to the optical routers that makeup part of the Internet infrastructure can start to look as chaotic as the Post Office at Christmas time.

The goal of an optical router is to interpret the packet header for each received packet as fast as possible so that the packets can be sent out the correct I/O port. This avoids delays, backups, and potentially lost packets. One problem is that thousands of different users can be sending messages through a router at the same time, and the packets all need to be sorted and routed differently. Table B below shows how the number of possible headers that can be received increases dramatically as the number of bits in the packet header increases.

TABLE B

Possible Headers versus Header Bit Length

| Packet Header Bit Length | Possible Headers |
|---|---|
| 8 | 256 |
| 16 | 65536 |
| 32 | 4.29 E9 |
| 64 | 1.84 E19 |
| 128 | 3.40 E38 |
| 256 | 1.16 E77 |
| 512 | 1.34 E154 |
| 1024 | 1.80 E308 |

The problem of receiving a packet and identifying critical header information to decide where to route the packet is much like finding a needle in a haystack. Initially, routers used microprocessors and large lookup tables in memory to search for addresses and header information. Later, as data rates increased, system designers moved to content addressable memories (CAMs) to allow the received packet header to be compared to all previously analyzed packet headers simultaneously. The architecture of a CAM permits the user to apply the received header information to the memory and to determine to which location(s) it matches.

Because the performance of CAM's could not keep up with ultra-high speed router implementations, some manufacturers switched to custom ASICs (Application Specific Integrated Circuits) to evaluate packet headers in a rapid fashion.

Optical networking is a significant business opportunity because of the tremendous increases in data bandwidth requirements resulting from the increasing use of Internet. The capability of optical fibers to transmit and receive data exceeds the capability of electronic and electro-optical interface products to keep up with increasing data rates. Presently, OC-192 standard networks that operate at 10 Gbit/sec are beginning to be used. Presently available optical routers address the need attendant with processing and routing packets from OC-192 systems.

Existing Optical Network Packet Classification Schemes

High performance optical routers have been generally implemented using either CAMs or custom ASICS to perform packet classification. The custom ASIC approach must rely on filtering and interpreting some subset of possible packet data patterns to determine how to route packets. The approach is inflexible and may be difficult to scale with new standards and new protocols. The CAM approach is more flexible and is popular in high end routers. CAMs are designed to be cascaded so that greater numbers of data bits can be analyzed. CAMs are designed to permit various levels of "don't care" functionality that has increased their flexibility and usefulness.

CAM Based Classification Systems

A typical router is shown in FIGS. 1a and 1b and is used to describe some of the problems associated with increasing data rates to 10 Gbit/sec, 40 Gbit/sec, and beyond. In FIG. 1a, the optical interface 11 translates the light stream into electrical signals and vice-versa. In the receive mode, the data framer 12 is responsible for extracting a serial receive clock and corresponding serial receive data stream. The serial data stream must then be converted into a parallel sequence of words that correspond to a packet. The parallel sequence of words can be operated on by a network processor 13, and eventually routed into the switch fabric 14 where they are sent to the appropriate destination.

Custom ASIC Solution (Juniper Networks ASIC2)

Juniper Networks (Sunnyvale, Calif.) provides high performance routers that use a custom ASIC solution that is marketed as the Juniper Networks ASIC2. The Juniper Networks ASIC2 in conjunction with the Juniper "Junos" software allows up to 40 M packets/sec to be forwarded in the Juniper system. From Juniper's data sheets, the following:

Juniper's routers leave the packet in the shared memory and move only a packet pointer through the queues. When packets arrive they are immediately placed in distributed shared memory where they remain until being read out of memory for transmission. This shared memory is completely nonblocking, which in turn, prevents head-of-line blocking.

FIG. 1b shows how a Juniper router is believed to be implemented, and how it relies on a very high speed shared SRAM 17 where packets are stored and operated on. This architecture avoids the movement of packets around in memory which can take up a considerable amount of time.

CAM and Custom ASIC Shortcomings for Packet Classification of OC-192 and Beyond

A variety of problems are beginning to plague CAM and customer ASIC based systems as data rates are moving to OC-192 (10 Gbits/sec) and OC-768 (40 Gbits/sec). Some of the biggest problems have to do with raw forwarding throughput, which is related to how many packets per second can be processed; latency, which is related to the absolute delay through a router; system power consumption; and board area. A key component of packet latency through a router is the time necessary to perform packet classification. As latency increases, the chances of experiencing upper level networking protocol timeouts for a packet increase.

Typical CAM structures have a width that is associated with how many bits the user desires to analyze, and a depth that is based on the number of possible patterns that the user wishes to differentiate between. CAMs are cascadable to meet both the width and depth that is required. The downside of cascading is that it costs money, increases board area, and increases power consumption. On the other hand, the ASIC2 solution from Juniper Networks does not appear to be cascadable. It appears to operate on data in the SRAM, and permits qualified searches on only certain fields and bits. This limits the ASIC2 solution approach when new search criteria are desired to be used.

Packet Classification Forwarding Rate and Latency Issues

The issues of forwarding rate and latency are intertwined and need to be addressed together. There are two significant architectural issues that affect forwarding rate and latency, i.e. the design of a packet's data flow through the system, and the underlying performance of the packet classification hardware.

In a CAM based system, such as that in FIG. 1a, parallel data from the data framer and any associated memory must be moved by the network processor or custom hardware into the CAM 15 for analysis. This is done after a packet has been received. This data must be moved quickly or additional latency is introduced. Table C below shows how the spacing between words in a received data pattern decreases as the serial data rate is increased. Each word that must be transferred to the CAM requires a read from the data framer's memory and a write to the CAM. In the case of very short data packets, which are the hardest for a router to handle, most of the packets must be transferred into the CAM. Even if reading from the data framer and writing to the CAM could be each done in a single cycle, this would require a dedicated 1/(3.2 nsec/2)=625 MHz processor and memory system to keep up at OC-192 rates with a 32 bit data framer. The problem becomes four times worse at OC-768 speeds and would require a processor and memory system running at 2.5 GHz.

TABLE C

Data Framer Output Word Separation vs. Data Rate

| | OC-48<br>2.5 Gbit/sec | OC-192<br>10 Gbit/sec | OC-768<br>40 Gbit/sec |
|---|---|---|---|
| Output Separation<br>(for a data Framer with a 32<br>Bit Output Word) | 12.8 nsec | 3.2 nsec | 0.8 nsec |
| Output Separation<br>(for a data Framer with a 64<br>Bit Output Word) | 25.6 nsec | 6.4 nsec | 1.6 nsec |

In addition to the delays and uncertainty associated with transferring the data from the data framer into the CAM memory, there is the delay of the CAM memory in processing the data once the final word has been presented. Typical CAM memories have delays of approximately 100 nsec from application of data to input match. This is expected to improve as CAM technologies improve, but is not likely to experience anything close to four times improvements as users move from OC-192 to OC-768. Due to this inherent access delay of CAM memories, the delay in receiving routing information becomes worse relative to data rate as speeds increase. This results in the need to increase queue's and storage depths to account for buffering data prior to knowing to where it should be routed.

Present CAM classification systems are claimed to operate at full line data rates. The problem is that they require packets to be received, staged, and then sent into the classification engine to determine an appropriate route or other required information. This delay increases the latency through the router for a packet to be sent. Eventually, this latency through a router can start to impact connections going through the router and can result in higher layer timeouts. As new CAM technologies are implemented, the focus is on increasing size and maintaining access time. Therefore, the access time is not scaling anywhere near as quickly as data rate.

In the case of the Juniper Network's ASIC2 solution (FIG. 1b), it is difficult to glean detailed technical information from their website. It appears as though the ASIC2 approach operates on a packet that is in shared SRAM. The appropriate bits of this packet appear to be transferred into the ASIC2 18 so that it can perform packet classification. This transfer has measurable delays associated with it, depending upon the hardware architecture and the memory speed. If the shared SRAM has a 10 nsec access time, and it is 64 bits wide, it takes 40 nsec to transfer 256 bits into the ASIC2 chip before a classification begins. The ASIC2 specification identifies a performance metric that provides a raw maximum 40 Million Packets/se of classification performance, which implies a classification every 25 nsec. This could be for packets requiring only a single data write into the ASIC2 part because it is a top end specification. Even in the Juniper ASIC2 solution, the parallel movement of data into the ASIC2 part must limit the performance of the overall packet classification system. The ASIC2 solution has a much lower inherent latency than present CAM solutions, but it's packet classification time varies based on packet movement and memory access prioritization. Even with it's higher performance, the ASIC2 solution does not begin packet classification until well after a data packet has been received. As data rates continue to increase this becomes an architectural limitation for the ASIC2 custom approach.

Power Consumption and Board Area Issues.

The overall power consumption of a router system increases because the network processor speed must be increased to process higher data rates. In addition, CAM memories have a static current draw that must be accounted for and scaled up. As an example, a currently available network data base search engine using CAM technology draws 6 Amps @1.5 Volts running at 1000 MHz. This is an extremely high 9 Watts on a single chip. This impacts the usability of this solution in applications where space is tight and power is limited. It is noted the increased power consumption also raises issues of heat dissipation that must be addressed.

As packet classification searches farther into a packet, such as to 512 or 1024 bits deep, CAM based solutions require multiple parts to be operated in parallel. This significantly increases power consumption and board area. In the case of the ASIC2 solution, increasing the depth of the classification requires an entirely new part to be developed. In addition, the ASIC2 solution could require greater memory bandwidths with higher speeds, which would entail more parts and larger ASICs.

It would be advantageous to provide an improved system for ultra-high speed packet classification of optical data that has been framed into a serial data stream.

SUMMARY OF THE INVENTION

The herein disclosed invention provides a system that permits flexible, low latency, ultra-wide, and deep classification of high speed data. A presently preferred embodiment of the invention comprises an optical network packet classification architecture that addresses the packet classification requirements for OC-768 optical routers and beyond. Packet classification involves understanding the source and destination of a packet, as well as interpreting information within the packet header to determine what the optical network processor should do with the packet. As the data rates of optical networks move up to OC-768 and beyond, the job of performing packet classification is becoming increasingly more difficult. The approach used in the herein disclosed system allows for true "Light Speed" classification of optical data packets.

The herein disclosed system is used for ultra-high speed packet classification of optical data that has been framed into a serial data stream. The presently preferred embodiment of the invention provides a system that operates in the receive path, where electronic data are provided by the optical interface to the data framer. The preferred embodiment of the invention incorporates unique features into a traditional optical data framer chip and relies on a complex ASIC to permit the user to differentiate between up to 10,000 different patterns at light speed. One purpose of the general purpose system disclosed herein is to eliminate the need for costly and power consumptive content addressable memory systems, or customer pattern specific ASICs, to perform network packet classification. The system operates on a principle of adaptive programmable randomization to permit a differentiation between the input vectors to be made. The invention dramatically reduces the processing burden required by high-speed optical routers or switches.

The modified data framer that is used in the preferred system is referred to herein as the novel data framer; the complex ASIC that is used to control the adaptive programmable randomizer is referred to herein as the ASIC, both of which are discussed in greater detail below.

DETAILED DESCRIPTION OF THE INVENTION

Figure 1A:
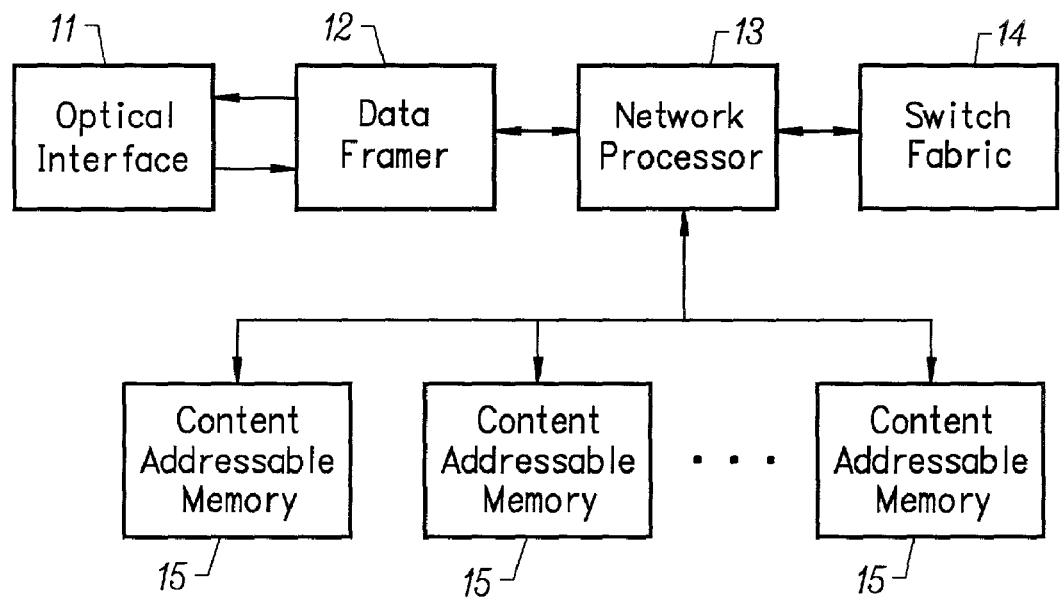
FIG. 1a is a block schematic diagram of a typical router that uses CAMs.
Figure 1B:
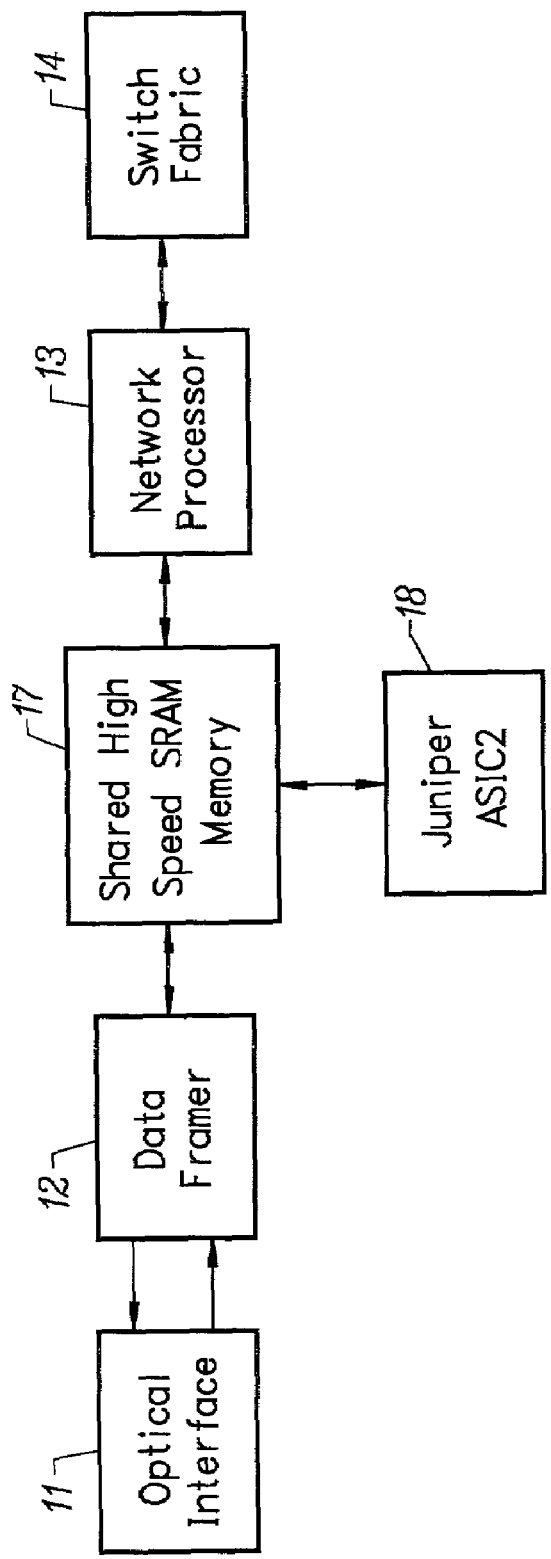
FIG. 1b is a block schematic diagram of the architecture of an ASIC based router.

The herein disclosed system is used for ultra-high speed classification of data that have been organized into a serial or parallel data streams. The presently preferred embodiment of the invention provides a system that operates in the receive path, where electronic data are provided by the optical interface to a data framer. In one embodiment, the invention incorporates unique features into a traditional optical data framer chip and relies on a complex ASIC to permit the user to differentiate between up to 10,000 different patterns at light speed. One purpose of the general purpose system disclosed herein is to eliminate the need for costly and power consumptive content addressable memory systems, or customer pattern specific ASICs, to perform network packet classification. The system operates on a principle of adaptive programmable randomization to permit a differentiation between the input vectors to be made. The invention dramatically reduces the processing burden required by high-speed optical routers or switches.

The modified data framer that is used in the preferred system is also referred to as the novel data framer; the complex ASIC that is used to control the adaptive programmable randomizer is also referred to as the ASIC, both of which are discussed in greater detail below.

The herein disclosed optical network packet classification system analyzes the packet headers of messages sent over the Internet. At their lowest possible level, these packet headers are made up of a sequence of bits that are either a 1 or a 0. The address and networking information for each Internet packet are encoded into these header bits. Depending upon the method of sending the packet, it is possible for there to be many hundreds of bits in the packet header. These bits of data are transferred through optical fibers by pulsing light on or off.

For discussion purposes, the Table D below shows how a packet header would look if it were broken into discrete bits. In this example, the packet header is made up of only ten bits. The first bit to be sent using a light pulse is B0, and the last bit to be sent is B9. The sequence of light pulses corresponding to this packet header is 1110101001.

TABLE D

Sample 10 bit Packet Header (Example only)

| Bit | | | | | | | | | | |
|---|---|---|---|---|---|---|---|---|---|---|
| | B0 | B1 | B2 | B3 | B4 | B5 | B6 | B7 | B8 | B9 |
| Value | 1 | 1 | 1 | 0 | 1 | 0 | 1 | 0 | 0 | 1 |

System Specifications

The following specifications (Table E) apply to a system comprising the presently preferred embodiment of the invention. The general specifications apply to the overall system performance. The bit masking specifications apply to the ability to mask, or ignore, bits in the received packet header. In the case of the herein disclosed system, there is extensive flexibility for masking bits in one operation and then removing the masking in a later step. The masking operation is comparable to looking at a piece of mail and first checking only the zip code to which it is being sent. The next step with the piece of mail might be to look at the city and the street address to determine which mail carrier should be given the letter.

TABLE E

System Specifications

| Specification Group | Specification Name | Specification |
|---|---|---|
| General | Maximum Number of Inputs | 10,000 (Note 1) |
| | Maximum Input Length | 1024 bits |
| | Maximum Classifiable Bits | 10,240,000 bits |
| | Average Input Classification Rate (excluding Flexible Masking). | >50 Million Packets/sec (Note 2] |
| | Maximum Input Classification Time per Masking step. | <50 nsec (Note 3] |
| Bit Masking | Types of Bit Masking Provided | Fixed Block and Flexible |
| | Fixed Block Masking Length | Permits gating off one block of data bits that ranges from 1 to 1023 bits |

TABLE E-continued

System Specifications

| Specification Group | Specification Name | Specification |
|---|---|---|
| | Flexible Masking Bits | in length. 128 individually programmed bits in four selectable 32 bit blocks. |
| | Number of Flexible Masking Patterns permitted | 8 patterns that encompass all 128 individually programmed masking bits. |
| | Maximum number of sequential flexible masking steps per input verification. | 8 steps that include either a final data pattern or one of the flexible masking patterns. |
| System Components | novel custom ASIC | Heart of the system for analyzing received data and determining the input. |
| | Novel data Framer | Standard data Framer product with modifications to support the System classification protocol. |
| | SRAM and DRAM | Size based upon the number of inputs SRAM = 7 nsec–15 nsec Access DRAM = 50 nsec Access |

Note 1 - The initial system chipset is designed to handle 10,000 inputs. Architecturally, this could be increased to 40,000 inputs in a second version of the part. Ultimately, the architecture permits 80,000, 160,000, or more inputs with increased memory and ASIC sizes, but with no speed degradation. The programmable masking patterns of the system permit significantly more than 10,000 inputs to be handled effectively by the system.
The 10,000 input number refers to the number of either inputs or mask patterns that can be stored.
Note 2 - Expected values through the use of 7 nsec SRAMs in the system and based upon an average of 2.35 SRAM accesses per classification.
Note 3 - Expected values through the use of 7 nsec SRAMs in the system and based upon a maximum of 6 SRAM accesses per classification.

The number of fixed block masking periods and the number of flexible masking bits can be increased with increased ASIC sizes. The fixed block masking is intended for a long sequence of bits that are always ignored, while the flexible masking bits are provided to deal with individual fields of bits.

Example of Fixed Block Masking

Table F shows a setup where the length of the packet header to be evaluated is 564 bits. This value is called the input length. All bits that are received after the 564$^{th}$ bit are not used in the packet classification because they exceed the Input Length. A fixed block masking period from bits 136–227 is used in the example. This means that bits falling within this bit window are not used in the input classification evaluation. As an example, the fixed block masking is comparable to ignoring the sender's address when trying to determine where mail should be sent.

TABLE F

Fixed Block Masking

| Bit Number | Bits 0–135 | Bits 136–227 | Bits 227–563 | Bits 564–1023 |
|---|---|---|---|---|
| Sample Header | Bits Used in Evaluation | Bits not Used due to Fixed Block Masking | Bits Used in Evaluation | Bits not Used due to exceeding Input Length |

Example of Flexible Masking (Blocks)

Table G shows a setup where two, of a possible four, 32 bit flexible masking blocks are enabled. These blocks can be setup to fall on any valid 32 bit boundaries after the start of the header. In the example, the first flexible masking block #1 is setup to range from bits 96–127, which lies on a 32 bit boundary. The second flexible masking block #2 is setup to range from bits 352–383, which again lies on a 32-bit boundary. As an example, flexible masking is comparable to ignoring the destination city and street selectively for the recipient of a piece of mail in a rough check, and then looking at these only if the letter was sent using Next Day Air delivery.

TABLE G

Example of 2 Flexible Masking Blocks

| | Bit Number | | | | | |
|---|---|---|---|---|---|---|
| | Bits 0–95 | Bits 96–127 | Bits 128–351 | Bits 352–383 | Bits 384–703 | Bits 704–1023 |
| Sample Header | Bits Used in Evaluation | Flexible Masking Block #1 | Bits Used in Evaluation | Flexible Masking Block #2 | Bits Used in Evaluation | Bits not Used due to exceeding Input Length |

Example of Flexible Masking (sub-Block)

Table H below shows bits 96–101 from flexible masking block #1 in Table G above. These five bits are shown to illustrate how the system permits bit level masking flexibility for any bit in a flexible masking block. To account for different possible masking configurations based upon the network protocols, addresses or fields that are received in the header, the presently preferred embodiment of the system provides eight selective masking patterns for each flexible masking block. The eight selective masking patterns are illustrated in Table H. In the case of selective masking pattern #1, bits 96, 98, 99, and 100 are masked (=1), while bits 97 and 101 are not masked (=0).

TABLE H

Selective Masking Patterns for Flexible Masking Bits (sub-Block)

| | Bit 96 | Bit 97 | Bit 98 | Bit 99 | Bit 100 | Bit 101 |
|---|---|---|---|---|---|---|
| Selective Masking Pattern #1 | 1 | 0 | 1 | 1 | 1 | 0 |
| Selective Masking Pattern #2 | 0 | 0 | 0 | 1 | 1 | 1 |
| . . . | | | | | | |
| Selective Masking Pattern #8 | 1 | 1 | 1 | 1 | 1 | 0 |

System Benefits

The system provides a range of performance, cost, power, and size benefits. The following are some of the key benefits provided by the herein disclosed system:

Extremely Fast and Flexible Packet Classification—The system exceeds the speed of content addressable memory systems in packet processing. It permits extremely deep processing of bits in the packet header without impacting classification speed. When compared to custom solutions, the system provides deeper and more flexible processing at comparable throughputs.

Unparalleled Search Latency—The system starts classifying a packet immediately after the last bit has been received. There is no overhead in performing data transfers to memory or to custom ASICs. This opens up new optical routing and switch architectures for ultra high performance.

Low System Power Consumption—After the initialization process, the system has much lower power consumption than CAM or ASIC alternatives.

Flexible and Programmable Masking—The system provides both fixed block and flexible masking. The flexible masking can be pre-programmed to go through sequential operations without external intervention. This feature is a significant advantage vis-à-vis content addressable memory approaches.

System Theoretical Background

The system uses a technique of adaptive, programmable, predictive, and sequential randomization to permit extremely rapid differentiation between a limited number of serial data bits. Optical networking relies on high speed transmission of digital data packets in a serial format. Optical routers and switches require that these serial packets be analyzed to determine the appropriate source and destination of the data packet so that they can be properly forwarded and at the correct priority level. All known present systems of packet analysis require serial data packets to be translated into a parallel format and then analyzed through the help of a combination of network processors, content addressable memories, custom ASICs, and high speed memories.

The randomization in the ASIC portion of the herein disclosed system is performed using compact, programmable feedback shift registers that are driven by the serial data stream. A general description as to how these programmable feedback shift registers are used in the system is provided below. The final state of these shift registers is used as an index into a memory array to determine which if any input data pattern has been matched. These shift registers require a simple register with exclusive OR feedback taps that can be programmed to be enabled or disabled. They have been designed to minimize power consumption, and the feedback tap enabling or disabling does not have an affect on the propagation delay of the feedback mechanism. The feedback mechanism has been kept simple, and minimal in terms of gate delays, to permit operation at extremely high serial data rates. More importantly, the various programmable feedback paths that are possible in the herein disclosed architecture have been selected specifically to guarantee that output values from one feedback value are uncorrelated to output values from another feedback value. This uncorrelated feature permits general probability theory to be used to evaluate the randomization of the data.

The predictive nature of the randomization comes from the fact that the randomization is pre-calculated for each possible input data pattern. This pre-calculation is done at the time that a new input data pattern is entered into the system for use. A critical feature of the system is that it implements a full hardware calculation of expected randomization outputs for each input that is applied. This hardware implementation allows many randomizer feedback values to be evaluated in real-time when a new input is applied. These randomizer output values are stored in memory for each randomizer feedback that is being considered at the time.

The adaptive randomization results from the system adjusting the randomization, over time, to handle the changing input data patterns that are to be analyzed in the best fashion. The high speed predictive nature of the system permits a significant number of possible randomization feedback paths to be maintained in memory at any time. The system can adjust the possible randomization feedback value after any packet has been received. This is done if the existing feedback randomization is significantly less ideal than another feedback randomization that has been evaluated. The system maintains statistics on all presently evaluated feedback randomization to determine the best randomization, as well as any randomization that may be no longer usable. When a randomization is no longer usable, the system can quickly bring all of the input data patterns back to evaluate other possible randomization patterns.

The sequential randomization that is permitted in the system results from the ability for the user to implement sequential masking operations on the input data. The system permits fixed or programmable masking of selected bit patterns within an input serial data stream. The masking operations of the system permit the user to pre-program a series of masking decisions that can result in a final input data pattern match.

Theoretical Randomization Probabilities

Detailed probability analysis is critical to an understanding of the system. The success of having a usable feedback randomization pattern, for a random set of inputs, depends upon the effective mapping of the input data patterns to output vectors by the randomizer. For practical implementations, with significant numbers of input vectors and reasonable sized memories, a system must be able to handle a limited number of cases where two or more input data patterns are mapped to the same output value. In the presently preferred embodiment of the system this is handled through a variety of methods including permitting a set value of multiple output cases where two, three, or four input data patterns map to the same output pattern. In addition, a secondary randomizer is used to separate between the multiple outputs so that the appropriate input can be determined.

The detailed theory behind evaluating any given randomizer pattern is presented below. This theory has been done in terms of the number of possible output states that are generated by the randomizer, and the number of possible input vectors that are being differentiated. The length of the input data patterns affects the predictive evaluation of the randomization outputs in hardware by the system, but it does not have a first order affect on the randomization probabilities. One part of the discussion below develops the theory to show the odds that a randomizer produces a specific case of a certain number of non-paired outputs, paired outputs, tripled outputs, or quadrupled outputs for a certain number of input data patterns. Another part of the discussion below evaluates how permitting various numbers of multiple outputs affects the possibility that a certain randomizer feedback is usable. For purpose of this discussion, unusable randomizer feedback occur when too many input data patterns map to the same output, or when as a group, there are too many sets of input data patterns that map to different but common outputs. As an example, if 4000 input data patterns mapped to 2000 different outputs where there were two input data patterns for each output, and the system permitted only 1000 multiple outputs, the randomizer feedback is unusable.

Primary Randomizer Feedback Selection Probabilities

The primary randomizer in the system is used to perform the mapping of each input data pattern to an output value. Given a number of input data patterns, there are always certain randomizer feedback values that are unusable. The system has been designed to make sure that enough randomizer feedback are simultaneously evaluated so that a usable feedback is always available. For purposes of evaluation, the system evaluates the number of paired, tripled, and quadrupled output vectors in determining which randomizer feedback to use, as well as to determine when a randomizer feedback should be discarded.

For a given number of output states, a given number of input data patterns, and a given number of multiple outputs, it is possible to determine the probability that any specific randomizer feedback maps the input data patterns into a usable set of output states. The analysis below uses a total of 10000 input data patterns, 65536 (2^16) possible output states, and 1024 (2^10) possible multiple outputs. For this scenario, it can be calculated that any possible randomizer feedback has an 95% chance of producing a usable mapping of the input data patterns. By using a set of eight possible randomizer feedback, the odds of having a usuable mapping are 99.9999999961%.

The presently preferred embodiment of the system can use a total of 128 (2^7) possible randomizer feedback. When one or more of the eight randomizer feedback whose mapping has been evaluated becomes unusable, the system can use one of the remaining (128−8)=120 randomizer feedback. It should be noted, that from a practical standpoint, new feedback paths can be swapped in while the input data patterns are loaded into the system.

Secondary Randomizer Feedback Selection Probabilities

The secondary randomizer differentiates between input data patterns that have been mapped to the same output value. The calculations for the odds of having a usable secondary randomizer feedback value are shown below. The probability analysis for this operation is much different than for the primary randomizer because, in this case, it is only necessary to be sure that the entries in each multiple are different from each other.

Randomizer Scaling for Additional Inputs

If the user wants to support additional inputs using the system, it is possible to scale up the size of the randomizers to achieve functionality. If the number of inputs were scaled to 40,000 input data patterns, the number of outputs could be increased to 262,144 outputs, and the number of multiple outputs could be increased to 4096. This would require an increase in the length of the primary and secondary randomizers to 18 bits in length. In addition, the memory requirements for storing the randomizer feedback mappings would increase by a factor of four.

System Overview

The primary method of operation for the system is used for ultra-high speed packet classification of optical data that has been framed into a serial data stream. This method of operation is referred to herein as the serial mode of classification. The invention provides packet classification at the serial data stream level, as opposed to doing this after data has been put into a parallel format and transferred into a network processor system. This feature of the invention allows the system to produce extremely fast characterization in a predictable timeframe that exceed anything done in a traditional parallel form such as the example previously shown of a CAM based system. The serial mode of classification requires modifications to a standard data framer part in addition to the other components that make up the system.

A secondary method of operation for the system provides fast packet classification of data packets that have already been stored in memory as successive parallel words of data. This method of operation is referred to herein as the parallel mode of classification. The purpose of this method of operation is to provide a legacy mode of operation that can support on or more ports that may or may not have modified data framers supporting the system. A design in which all ports have modified data framers supporting the system does not require use of the parallel mode of classification.

For the primary mode of operation, the system incorporates unique features into a traditional optical data framer chip, and relies on a complex ASIC to permit the user to differentiate between thousands of different patterns at light speed. One reason for the general purpose system is to eliminate the need for costly and power consumptive content addressable memory systems, or customer pattern specific ASICs, to perform network packet classification. The system operates on a principle of adaptive programmable randomization to permit the differentiation between the input vectors to be made. The system can dramatically reduce the processing burden required by high-speed optical routers or switches.

Figure 2A:
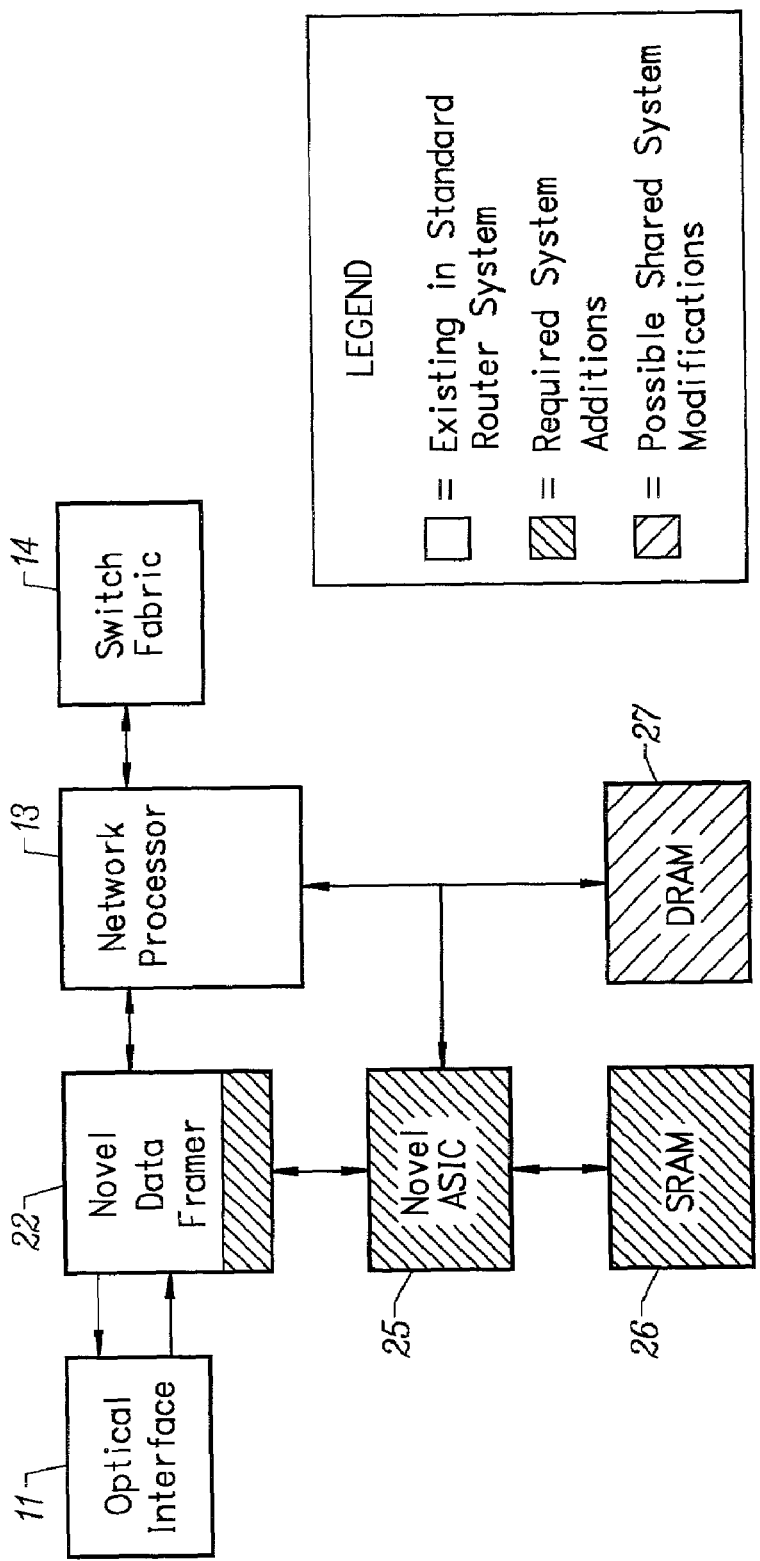
FIG. 2a is a block schematic diagram that shows an optical router or switch using the herein disclosed system.

FIG. 2a is a block schematic diagram that shows an optical router or switch 11 using the system. The modified data framer 22 that is used in the system is referred to as the novel data framer. The complex ASIC 25 that is used to control the adaptive programmable randomizer is referred to as the custom ASIC. In addition to these two parts, the system relies on a standard high speed SRAM 26 for internal processing, as well as a low speed DRAM 27 to store input patterns and other user values.

Figure 2B:
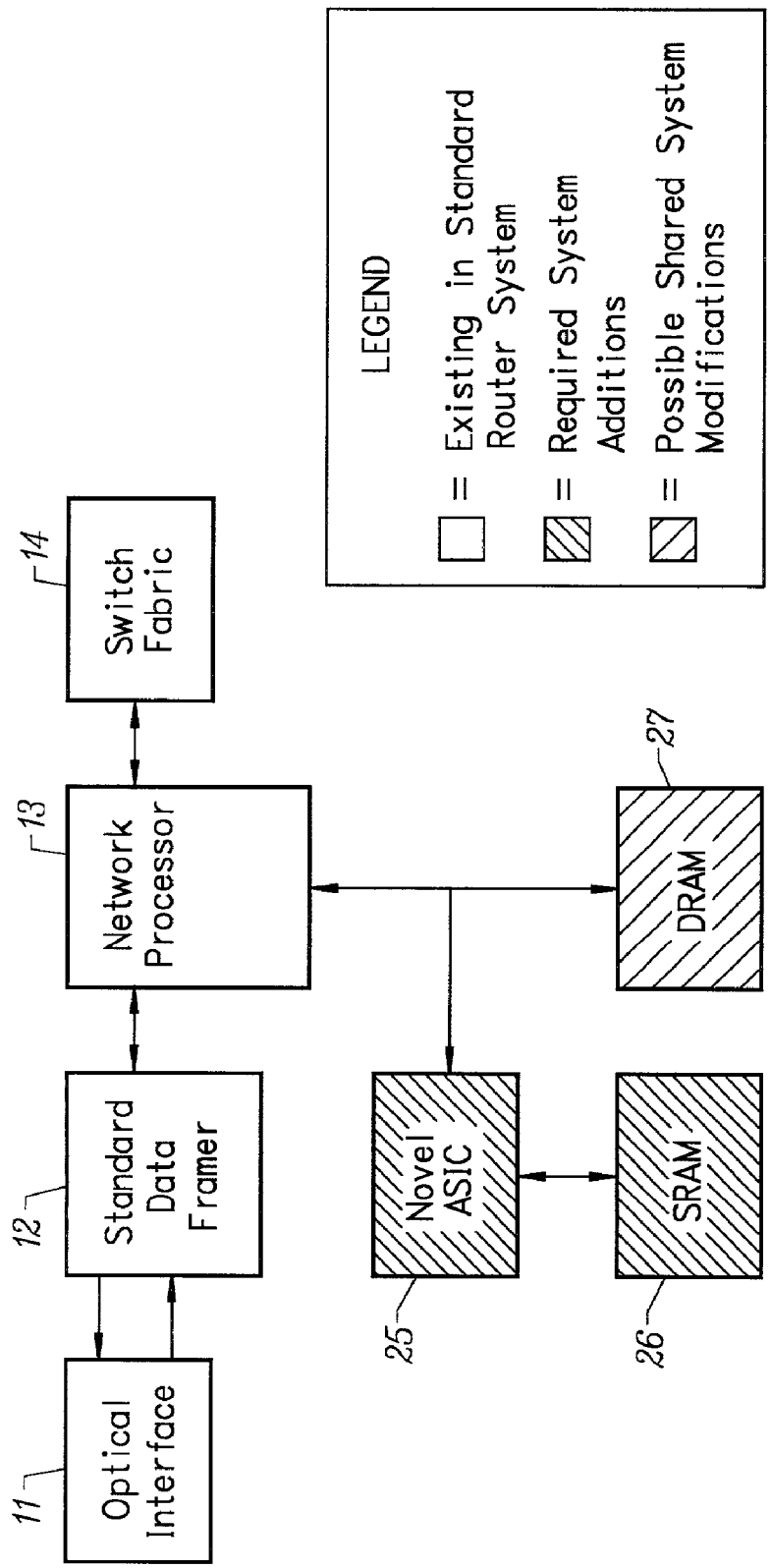
FIG. 2b is a block schematic diagram that shows an optical router or switch using the herein disclosed system in which the parallel mode of classification is used.

FIG. 2b is a block schematic diagram that shows an optical router or switch using the system in which the parallel mode of classification is used.

The presently preferred implementation of the herein disclosed architecture supports identification of up to 10,000 distinct input vectors that can be up to 1024 bits in length. Both the number of vectors and length of each vector can be modified should the situation require. Increasing the number of vectors beyond 10,000 would require increasing the length of the programmable randomizers and the width of the SRAM memory used by the custom ASIC. Increasing the length of the inputs results in a fairly linear increase in the overall size of the custom ASIC and would require slight modifications to the data framer ASIC.

Novel Data Framer

The novel data framer modifications are made to the serial data stream of a standard data framer chip. If a descrambling function is done, it is important that the data framer modifications be done after the descrambling function. The serial data stream must be the same as the parallel data that is going to be passed to the network processor. It is also important that the data framer be able to access the data framer outputs that byte align the start of the packet, as well as count the number of bytes received.

Figure 3:
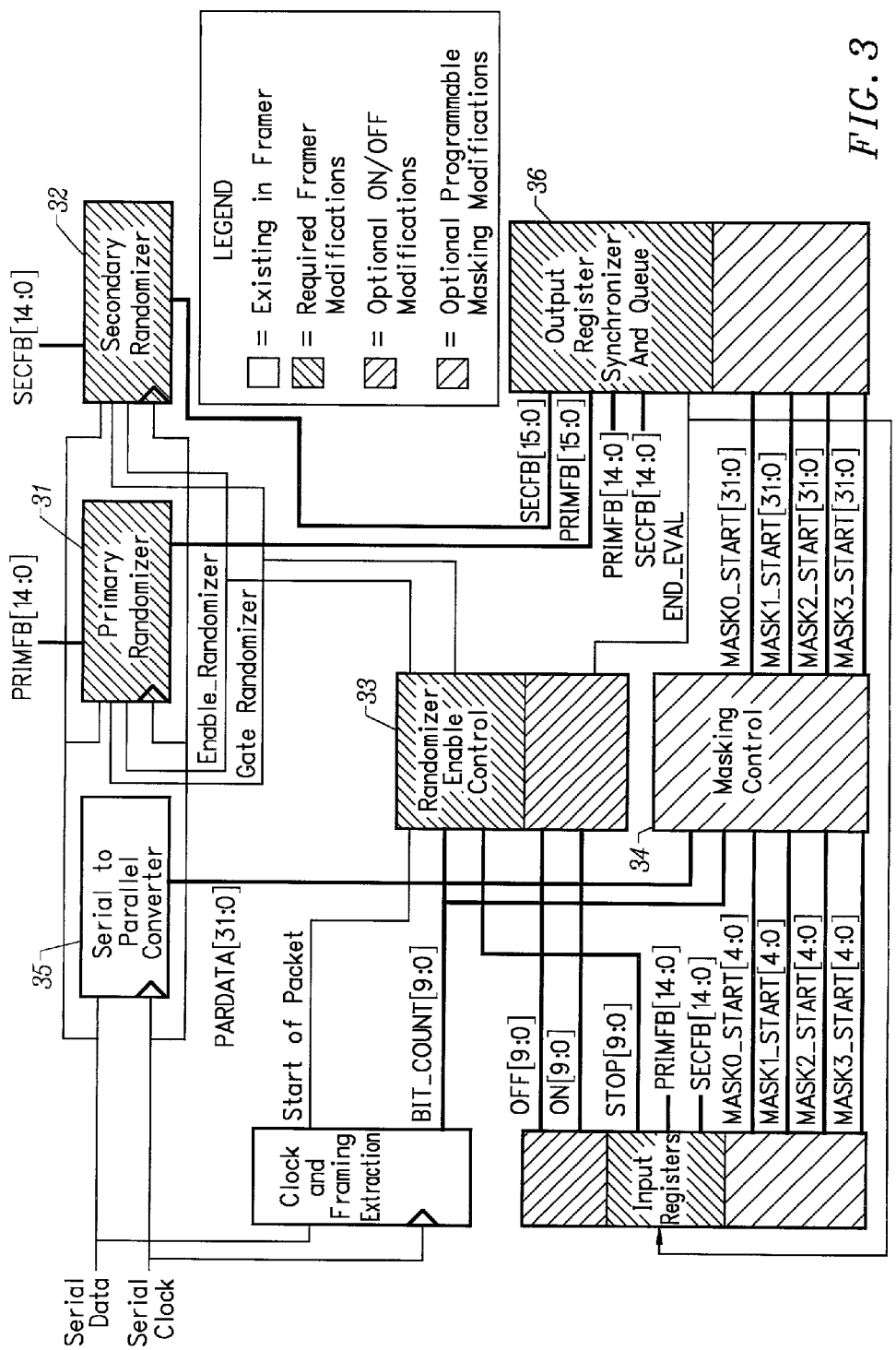
FIG. 3 is a block schematic diagram that shows a novel data framer according to the invention.

FIG. 3 is a block diagram that shows the novel data framer. The modifications to a standard data framer start with a primary and secondary randomizer, 31, 32 respectively, that are programmably configured by the custom ASIC. The PRIMFB[14:0] and SECFB[14:0] registers in the data framer are used to setup the feedback configurations for the randomizers, and it is important that they be modified only after the reception of a packet has been completed. These two randomizers are preferably compact circuits that operate at the full serial data rate. They should preferably operate at 40 Gbit/sec serial data rates and beyond.

The next change to a standard data framer part involves the addition of a randomizer enable control block 33. The clock to the primary and secondary randomizers are gated ON and OFF by the enable randomizer signal that is generated by this block. The enable randomizer signal is turned on at the start of a packet.

An optional implementation allows the data to the randomizers to be programmably turned OFF (Set to a 0) and then turned ON again to allow blanking out a portion of every packet received. This is done with the gate randomizer signal. The implementation shown in FIG. 3 allows a single block of bits to be blanked out, but this could be extended to multiple blanking periods should the application warrant this change. Finally, the enable randomizer signal is turned OFF after a user prescribed number of bits has been received. The system has been nominally designed to handle up to 1024 bits, but with modifications to the custom ASIC and the data framer it could be easily extended to a larger number of bits should the application warrant.

The optional masking control block 34 in the data framer allows programmable, sequential, user controlled masking of groups of user defined bits. The implementation that is shown allows four different 32-bit wide blocks of data to be captured for masking purposes. The user is able to configure with MASK0_START[4:0] to MASK3_START[4:0] four starting locations for 32-bit words to be sampled. The masking control block takes these four START values, in addition to the BIT_COUNT[9:0] register which is a count of the number of bits from the start of the packet, to determine when to sample the MASKING data.

The PAR_DATA[31:0] is parallel data from the serial to parallel converter 35 which is implemented within any data framer. This PAR_DATA[31:0] is sampled at the appropriate times to generate MASK0DATA[31:0] to MASK3DATA[31:0] which are four 32-bit wide masking registers that are associated with the packet, and can be read by the custom ASIC when they become available. The number of MASK registers can be modified with changes to the data framer as well as the custom ASIC should an application warrant this being done.

The output register synchronization and queue 36 assures that the primary randomizer, secondary randomizer, feedback registers, and MASKING registers are stored for each packet. If a queue of packets is implemented in the data framer, then these registers must be similarly queued so that they are associated with the appropriate data packets. Ideally, these registers should be available to the custom ASIC as soon as the number of bits identified by the STOP register are received, so that they can be used to determine the appropriate input pattern match.

Primary and Secondary Randomizers

The primary and secondary randomizers are two equivalent circuits, and are designed so that their physical layout can be done so as to minimize gate propagation delays and hence to permit extremely fast operating speeds. These randomizers are expected to easily operate at 10 Gbits/sec, and as technology improves in the coming years, the step up to 40 Gbit/sec should be possible.

Figure 8A:
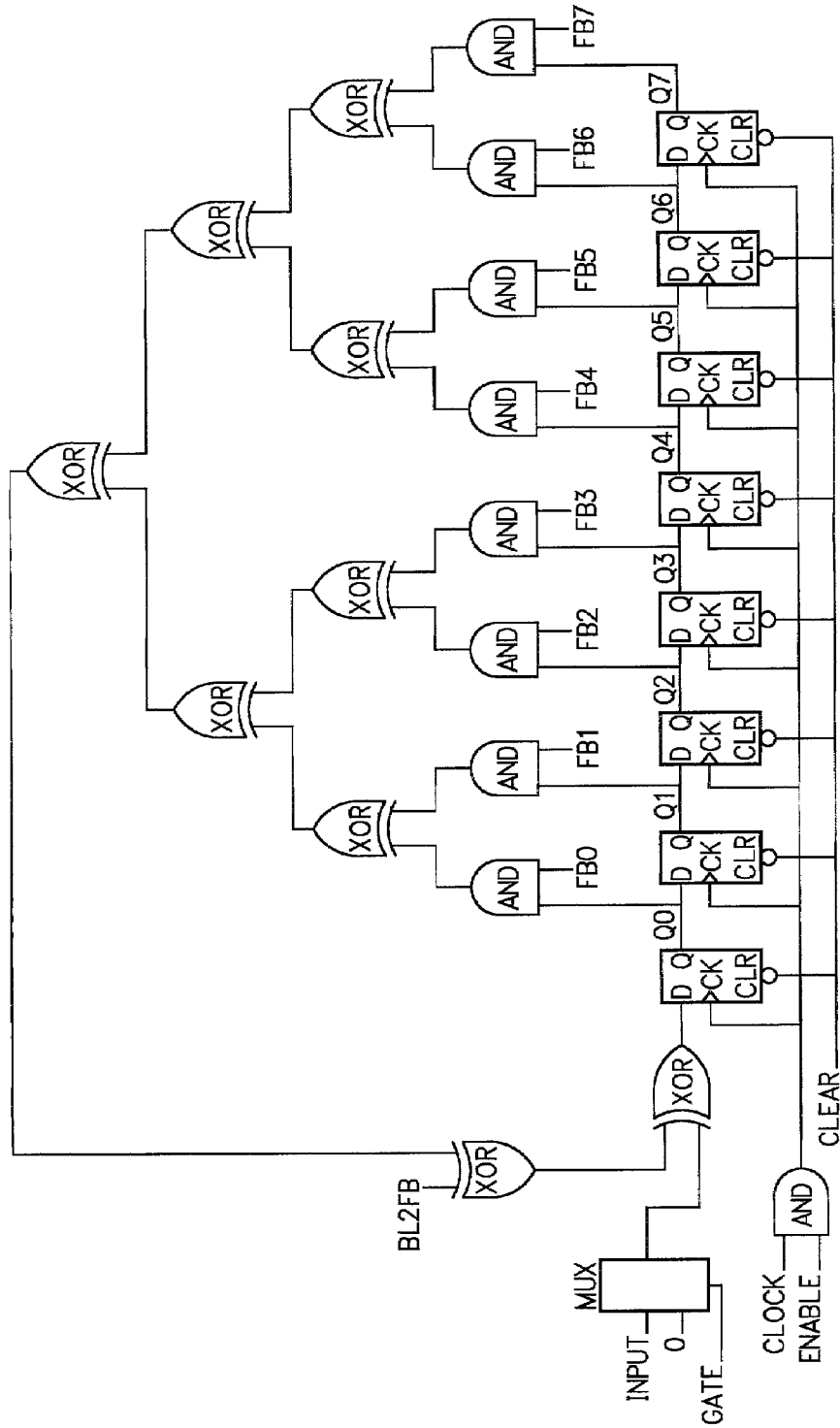
FIGS. 8a and 8b provide a block schematic diagram of a primary and secondary randomizer circuit according to the invention.
Figure 8B:
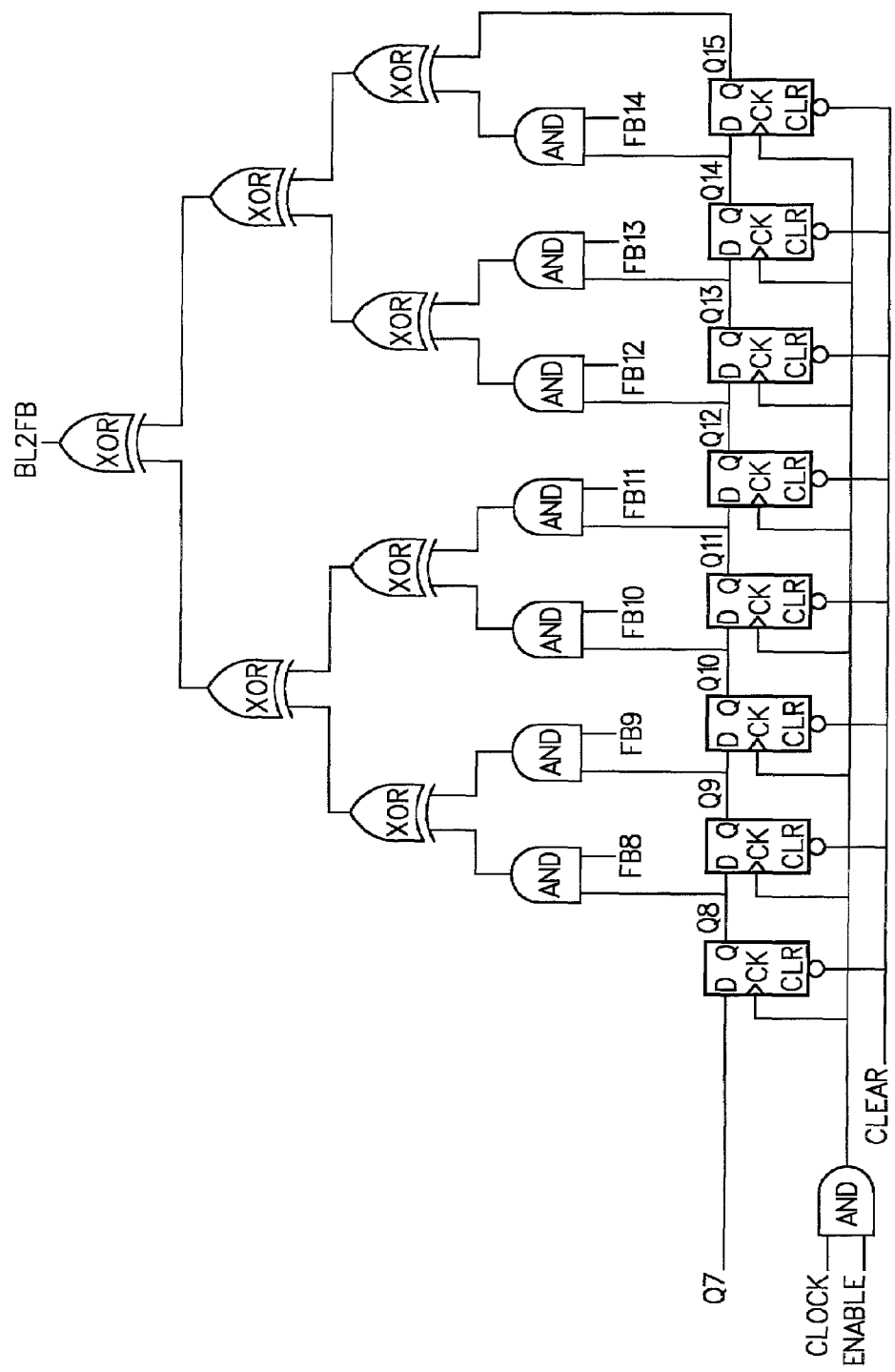

The randomizers for the system are sixteen bits in length. They are constructed using sixteen stages of D Flip/Flops in a serial shift register as shown in FIGS. 8a and 8b. The clocking of the serial shift register is qualified, and is done to all stages simultaneously. The Clock is gated with an Enable signal during the time periods between the start and end of a packet where a bit is to be clocked into the randomizers. During periods within the packet reception where the MASK ON/OFF functions is to be performed, the Clock to the randomizers is gated off. During periods within the packet reception where programmable mask bits are being captured, the Clock to the randomizers remains gated on.

A global Clear signal is also applied to the randomizers. This signal is used to initialize the randomizers to a known all 0's state between packet receptions. The Clear signal is not time critical so long as it is applied after the randomizer values have been latched, and prior to the start of reception of the next data packet.

The feedback for the randomizers is structured as an XOR tree that potentially sums up all sixteen of the serial shift register bits and adds them to the Input data bit. For the case of a 16-bit randomizer, this translates to five levels of exclusive-or logic. The randomizer feedback are turned on and off with the PRIMFB[14:0] and SECFB[14:0] registers. The last shift register bit is always applied to the feedback network, and hence the reason that there are only fifteen feedback selection bits. Each feedback bit is used to gate the output of its corresponding serial shift register stage using a two input AND gate. The PRIMFB[14:0] and SECFB[14:0] registers should only be written to between receptions of data packets. Changing these values does not affect the actual primary randomizer or secondary randomizer outputs if it is done while the randomizer clocks are gated off.

Enable and ON/OFF Circuitry

A key addition to a standard data framer is the generation of an Enable signal for the primary and secondary randomizers. At a minimum, this signal should enable the randomizers when a packet reception begins, and should disable the randomizers when a specified number of bits have been received. The optional ON/OFF circuitry in the custom ASIC handles gating off large blocks of data that are not desired to be analyzed, occurring in the middle of data fields the user wants to analyze with the system. This could consist of cyclic redundancy checks or other fixed blocks of data in the received packet that are not pertinent to the packet classification process. The purpose of the ON/OFF circuitry is to provide greater flexibility for use of the variable MASKING bits.

Figure 9:
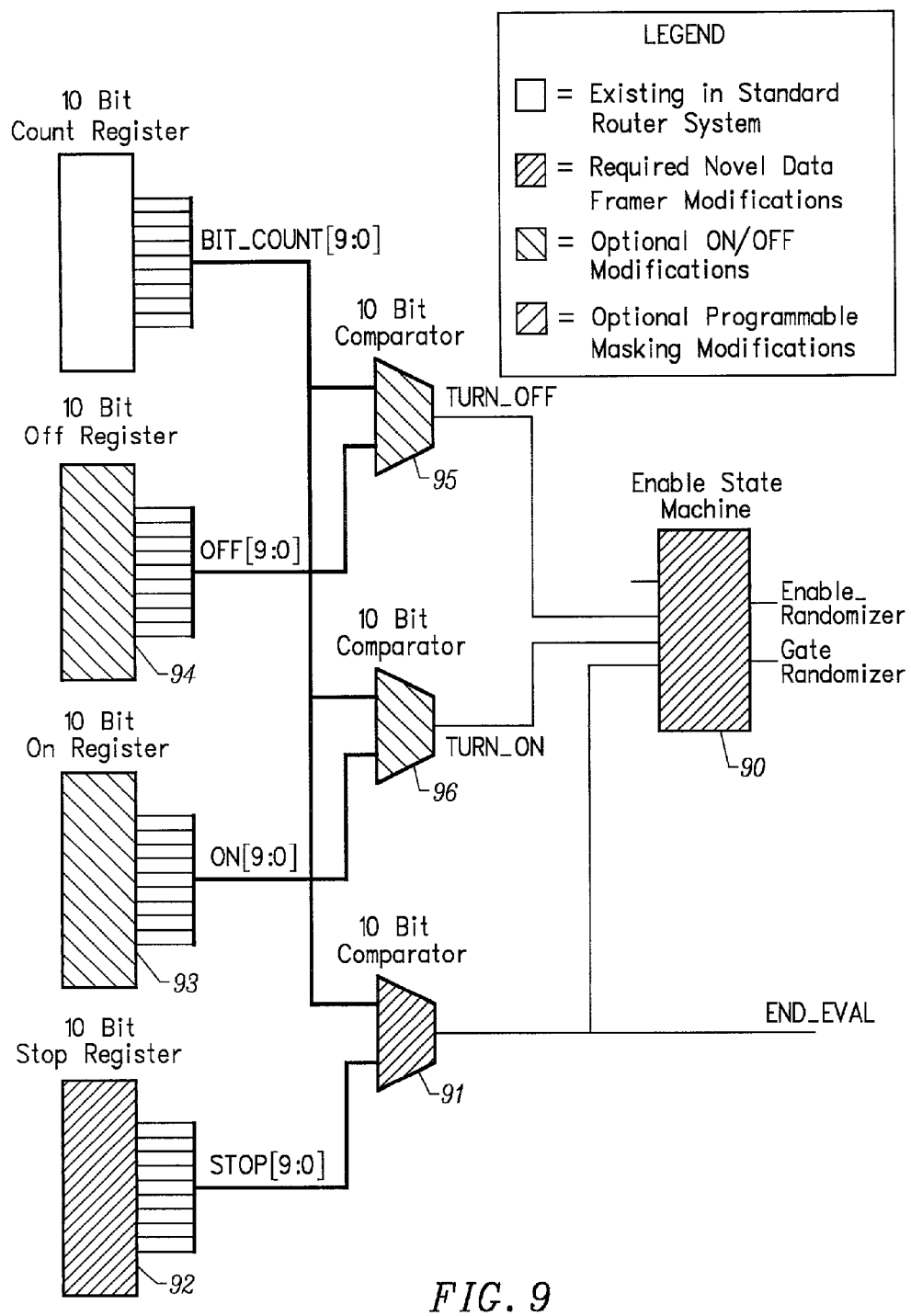
FIG. 9 is a block schematic diagram that shows enable and ON/OFF circuitry according to the invention.

FIG. 9 shows a block diagram for the Enable and ON/OFF circuitry. An enable state machine 90 is driven by inputs to turn the Enable signal ON or OFF. At the start of a packet, the Start of Packet signal from existing data framer circuitry is expected to go active, and the Bit Count is expected to be 0. This forces the Enable signal ON at the beginning of the packet. In a minimal configuration, when the Bit Count reaches the STOP value, the enable state machine turns the Enable signal OFF. A 10-bit comparator 91 is used to compare the status of the Bit Count value to the value stored in the STOP register 92, and when these two signals are equal, the END_EVAL signal is generated, followed by the Enable signal being turned OFF.

In the optional case where ON/OFF circuitry is implemented, additional registers and comparators are required. For each long blanking period that is desired, an additional two 10-bit registers 93, 94 are needed to store the ON and OFF bit periods. In addition, two 10-bit comparators 95, 96 are required to compare these ON and OFF values to the actual bit count. The outputs of all of the comparators drive the enable state machine. To increase the number of ON/OFF periods that are blanked requires additional logic and power consumption. The enable circuitry comparators are operating at the full clock rate of the system because they are driven by the bit count value.

Programmable Masking Circuitry

The ability to execute programmable masking in the data framer is entirely optional. In the world of content addressable memories, this feature is akin to a ternary CAM having three levels, i.e. one, zero, and don't care. The programmable masking circuitry permits blocks of data to be captured so that they can be programmably masked in the final output result. To reduce power consumption and chip area, the programmable mask registers have been defined to be on even 32-bit boundaries, and to be 32 bits in length. The size, boundary, and length of these registers could all be adjusted based on user requirements. The programmable masking circuitry performs a function similar to a logic analyzer, by capturing blocks of data at the appropriate time, and then permitting them to be analyzed in the future in the custom ASIC.

Figure 10:
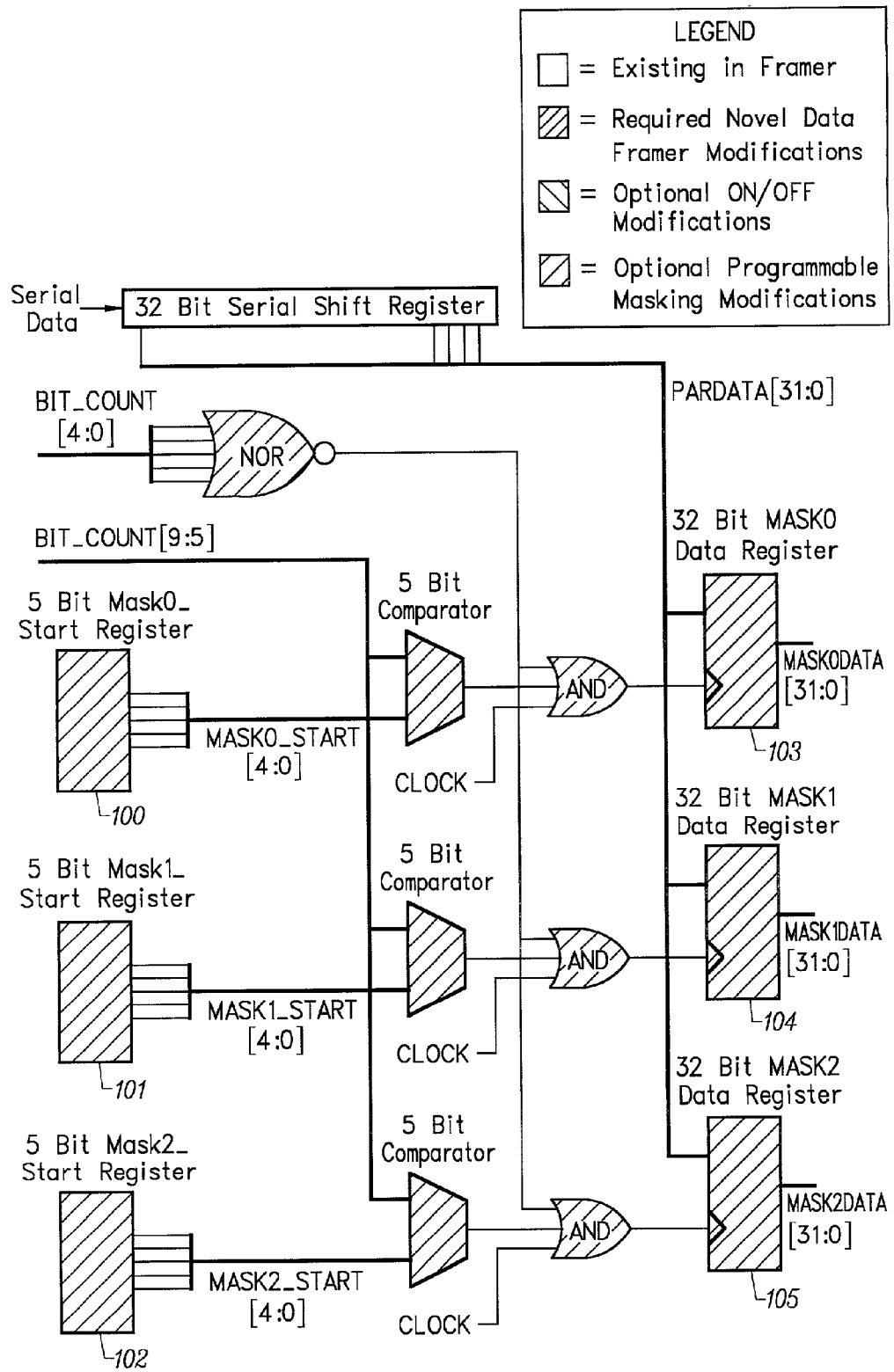
FIG. 10 is a block schematic diagram that shows programmable masking circuitry according to the invention.

In the implementation shown in FIG. 10, there are four masking start registers labeled: Mask_Start0 100, Mask_Start1 101, Mask_Start2 102, and Mask_Start3 (not shown). Because the total possible length of the data pattern being evaluated is 1024 bits, and the Mask_Start registers are intended to be on 32-bit boundaries, there are a total of 32 possible values for each mask start register. These 32 values can be stored in a 5-bit number, and hence the Mask_Start registers are 5-bit values. This reduces the comparison with the previously mentioned Bit Count register to only the upper five bits. The lower five bits of the Bit Count register are compared with 0 because the value must be on a 32-bit boundary.

The masking data are captured in a set of 32-bit registers labeled MASKDATA0 103, MASKDATA1 104, MASKDATA2 105, and MASKDATA3 (not shown). These registers are clocked when the Bit Count equals the value stored in the respective Mask_Start register. The data input to the MASKDATA registers is from the serial to parallel data converter that exists in a standard data framer part. Once masking data are captured, they must be read from the output registers prior to the next packet being received.

Output Register Synchronization and Queue

Figure 11:
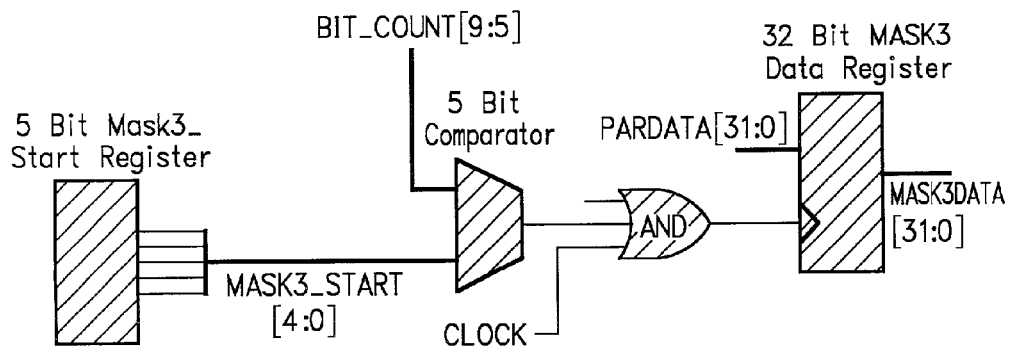
FIG. 11 is a block schematic diagram that shows programmable output register synchronization and queue according to the invention.

It is critical that the primary and secondary randomizer values be synchronized to the feedback values that were used in determining them (see FIG. 11). The other registers in the system including the Mask_Start, ON/OFF, etc. are not expected to be changed after initialization. If this is desired, then these need to be captured and stored with the primary and secondary randomizer values, and the received packet, so that they are correlated. It is the responsibility of the data framer to keep the randomizer values and associated feedback values with the correct received packets.

Custom ASIC Implementation

Figure 4:
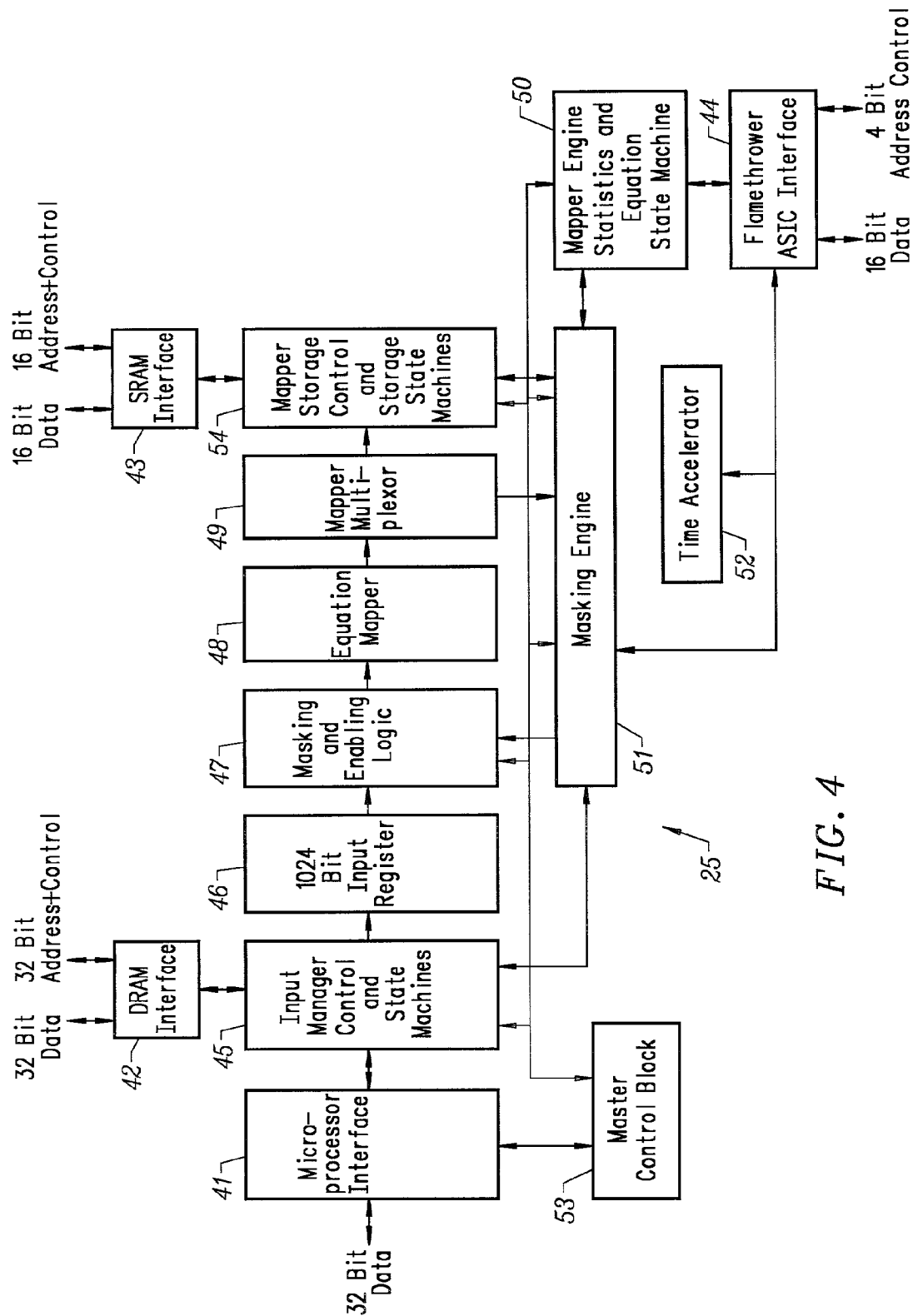
FIG. 4 is a block schematic diagram that shows a custom ASIC according to the invention.

FIG. 4 is a block schematic diagram that shows the custom ASIC. The custom ASIC contains the intelligence, algorithms, and adaptive functionality for the system. The custom ASIC is responsible for maintaining multiple input pattern mappings associated with different primary and secondary randomizer equations. It determines the best randomizer selection, and decides when to switch randomizer values. The custom ASIC must also determine when a randomizer value is no longer useful, and an entirely new mapping should be generated.

The preferred embodiment of the custom ASIC has four primary interfaces to the outside world, i.e. the microprocessor interface 41 is used to communicate to a host processor system, the DRAM interface 42 is used to communicate with either a standalone DRAM or shared dual port DRAM for storing data patterns to be matched, the SRAM interface 43 is used to communicate with a dedicated SRAM that contains mappings for various primary and secondary randomizer settings, and the interface 44 is used to communicate with the modified data framer part. Internally, the custom ASIC handles mapping user inputs into values that are stored in SRAM. Individual masking and mapping optimization functions are performed internal to the ASIC.

The following discussion views the custom ASIC from a data flow perspective:

For the custom ASIC to start it's process, the user is required to make various pointer and register configurations (see below). Next, the user must load input patterns into the custom ASIC. These patterns are made up of a combination of data and, in some cases, masking steps that should be done on the data in a potentially sequential fashion. For instance, the custom ASIC permits mapping a range of data values to a single mask step output, and when that mask step output is reached, additional programmable masking or verification can be executed. Input patterns are handled by the input manager control and state machines function 45 where they are directed into the input register 46. They are also loaded into external DRAM for use in cases where an equation mapping is discarded, and a new mapping must be generated from scratch. The input register is 1024 bits long to permit patterns up to 1024 bits to be analyzed. This length could be adjusted up or down in embodiments, and would not affect the data framer ASIC. Input data are manipulated in 32-bit words, and masking is permitted for 32-bit lengths on 32-bit word boundaries. Masking information is stored in conjunction with the input data so that an entire input pattern can be regenerated should new equation mappings need to be generated.

When the 1024 bit input register contains a complete data pattern, and when all masking information is loaded in the masking and enabling logic section 47, it is possible to use the 1024 equation mapper 48 to generate a related randomizer value. The masking and enabling logic 47 is responsible for enabling only those input register bits that the user is interested in examining. For instance, if the user is interested in reviewing only the first 200 bits of an incoming data packet, the last 824 bits are blanked out by the masking and enabling logic, and are not sent into the primary and secondary randomizers in the data framer. The masking function of the masking and enabling logic allows data bits within the input pattern to always be masked out and not analyzed, as well as permits bits to be masked selectively in a user programmable sequence.

The equation mapper 48 permits a randomizer value to be calculated in a single cycle. This is done by implementing the mapper in pure logic gates in hardware. It calculates randomizer mappings for 128 different equations simultaneously to permit extremely fast calculations and data storage of randomizer values generated by different randomizer equations. This feature permits the custom ASIC to adjust adaptively to select optimal randomizer settings based on the input and masking patterns that have been applied to the part. It allows many randomizer mappings to be stored at one time without adversely affecting the setup time for the part, and makes the action of generating entirely new mappings possible in the case where some of the mappings stored on the custom ASIC are no longer usable due to excessive randomizer output duplication.

The mapper multiplexer 49 is implemented in hardware to allow immediate selection between each of the possible 128 randomizer outputs associated with each of the 128 possible randomizer equations. This function preferably consists of sixteen individual 128:1 multiplexers, where there is a multiplexer associated with each of the sixteen output bits of the randomizer. If the length of the randomizer is increased, the size of this multiplexer increases in a linear fashion with the number of bits in the randomizer output. The number of equations used in the equation mapper and the mapper multiplexer can be adjusted up or down with a direct impact on the number of gates used in their implementation.

The mapper storage control and storage state machine 54 is responsible for saving and retrieving values from the various equation mapping tables. The state machines in this block handle determining whether the present location pointed to by a primary randomizer value contains 0, 1, 2, 3, or 4 entries. This state machine is responsible for handling the creation and destruction of multiple entries, and the adjustment of the multiple entry tables that dictate those entries that are used. This function works directly with the external SRAM in storing and retrieving these values. This function works closely with the masking engine, especially in those cases where mask steps are involved.

The masking engine 51 handles all aspects of permitting the user to setup sequential masking operations. This function takes user inputs that setup which, if any, 32-bit blocks of data are operated on in a masking fashion. The user is permitted to signify data bits as always being masked, or as selectively being masked when certain circumstances arise. Once the masking engine knows what bits may be masked, it is responsible for calculating the effect of each bit on the output vector. These effects are referred to as masking impact bits. To execute this operation, the masking engine injects a single "1" into the input vector stream at each bits location. The output primary randomizer value shows the impact of this input on the output vector. This value is then used by the masking engine, along with the masking data that is received from the data framer ASIC, to remove the effects of the masked data when a packet is received. The masking functions used in the system are described in greater detail below.

The time accelerator 52 is responsible for re-mapping a received randomizer value to generate the randomizer value that would have been received if zero values had been clocked into the randomizer for a fixed number of cycles after the received randomizer value was captured. This function is described below, and permits a flexible and fast way to skip forward to the end of the 1024 input bits that are always used to calculate randomizer values. As an example, if the user wishes to analyze only 200 bits of data, while the novel custom ASIC always calculates using an input vector length of 1024 bits, the time accelerator block generates the effect of having 824 trailing 0's shifted into the randomizer after the data of interest. This method reduces time latency, and permits the randomizers to be turned off much sooner to reduce power consumption.

The mapper engine, statistics and state machine 50 is responsible for determining the equations to be used by the system, and to determine when equations are no longer usable and need to be replaced. This function maintains statistics on all equation mappings that are maintained in memory. Using these statistics, it selects the best mapping and sends it to the data framer ASIC.

The master control block 53 is responsible for initializing the entire system at startup. It also handles communicating with other control blocks to execute system wide functions such as a hard reset.

SRAM Memory

Dedicated SRAM is required for the custom ASIC. The size of the SRAM memory is dictated by the size of the primary randomizer/secondary randomizer words, and the number of equations that are permitted. The speed of the SRAM is critical because it sets the performance of the system. As an example, a 16-bit primary randomizer value, in conjunction with a 16 bit secondary randomizer value, dictates that the core of the primary randomizer lookup table be $2*2^{16}=131,072$ entries long and sixteen bits wide. In addition, a multiple entry table of 1024 entries contains slightly more than 8,096 locations that are sixteen bits wide. In this example, it takes a total of approximately 140,000×16 bits of SRAM storage per equation. A 512K×16 SRAM handles approximately three and one-half equations worth of data.

DRAM Memory

A dual port DRAM could be used for the DRAM required in the system. The lowest cost configuration is a synchronous DRAM. The fact that the custom ASIC is the only device talking to the DRAM, unless a dual port approach is used, permits a purely synchronous approach to be simply implemented. The speed of the DRAM memory directly impacts how fast new input vectors can be stored in the system. The microprocessor interface to the ASIC is a 32-bit interface. If the DRAM is sixteen bits wide, then it's interface must be twice as fast. Burst operation is very critical because an entire input could be stored away at one time.

System Benefits

Fastest Packet Processing Possible.

As soon as the last serial data bit that is under analysis has been received, the system's primary randomizer, secondary randomizer and masking bit values are available from the data framer ASIC. These words can be read into the custom ASIC using high speed parallel 32 bit transfers (taking<5 nsec). Once these data are transferred to the novel custom ASIC, the time to match a pattern is a function of three variables, i.e. the number of masking operations that the user wants to perform, the speed of the SRAM used by the custom ASIC, and the distribution of multiple outputs within the search that is performed.

Multiple outputs are distributed in a probabilistic fashion throughout the search process. The odds described below assume that there are up to 968 paired outputs, up to 50 tripled outputs, and up to six quadrupled outputs within a 10000 input data pattern space. In this scenario, the odds of a pair are less than $2*968/10000=19.4\%$, the odds of a triple are less than $3*50/10000=1.5\%$, and the odds of a quadruple are less than $4*6/10000=0.24\%$. These are extremely conservative bounds because, in the example, all of the probability distribution is for cases that are less than or equal to the 968 pair, 50 triple, and six quadruple scenario. When a pair, triple, or quadruple output is hit, the system uses the secondary randomizer value to differentiate between the different input data patterns.

The speed of the SRAM used by the custom ASIC dictates the time associated with sequential SRAM access to determine the appropriate input data pattern. In addition, each sequential masking step, excluding a fixed masking of bits which does not entail SRAM cycle overhead, results in an additional search through SRAM memory.

The search time for a pairs, triples, and quadruples is shown in Tables I–L below. Each of these tables lists the average and maximum time to complete a search.

TABLE I

Time associated with Searching a Single Match

| SRAM Search Step | Action | Probability of Step |
|---|---|---|
| 1 | Read primary randomizer Value (Contains Input) | 1.0 |
| 2 | Check secondary randomizer Value | 1.0 |
|  | Average Search Steps | 2.0 |
|  | Maximum Search Steps | 2.0 |

TABLE J

Time associated with Searching a Pair Match

| SRAM Search Step | Action | Probability of Step |
|---|---|---|
| 1 | Read primary randomizer Value (Contains pointer to Multiple Structure) | 1.0 |
| 2 | Check First secondary randomizer Value in the Multiple Structure | 1.0 |
| 3 | Check Second secondary randomizer Value in the Multiple Structure | 0.5 |
| 4 | Read the input number for the correct secondary randomizer Value in the Multiple structure. | 1.0 |
|  | Average Search Steps | 3.5 |
|  | Maximum Search Steps | 4.0 |

TABLE K

Time associated with Searching a Triple Match

| SRAM Search Step | Action | Probability of Step |
|---|---|---|
| 1 | Read primary randomizer Value (Contains pointer to Multiple Structure) | 1.0 |
| 2 | Check First secondary randomizer Value in the Multiple Structure | 1.0 |
| 3 | Check Second secondary randomizer Value in the Multiple Structure | 0.67 |
| 4 | Check Third secondary randomizer Value in the Multiple Structure | 0.33 |
| 5 | Read the input number for the correct secondary randomizer Value in the Pair structure. | 1.0 |
|  | Average Search Steps | 4.0 |
|  | Maximum Search Steps | 5.0 |

TABLE L

Time associated with Searching a quadruple Match

| SRAM Search Step | Action | Probability of Step |
|---|---|---|
| 1 | Read primary randomizer Value (Contains pointer to Multiple Structure) | 1.0 |
| 2 | Check First secondary randomizer Value in the Multiple Structure | 1.0 |
| 3 | Check Second secondary randomizer Value in the Multiple Structure | 0.75 |
| 4 | Check Third secondary randomizer Value in the Multiple Structure | 0.50 |
| 5 | Check Fourth secondary randomizer Value in the Multiple Structure | 0.25 |
| 6 | Read the input number for the correct secondary randomizer Value in the Pair structure. | 1.0 |
|  | Average Search Steps | 4.5 |
|  | Maximum Search Steps | 6.0 |

In calculating the average search steps per mask step, the previous probabilities for multiple outputs can be used.

The SRAM speed, could be increased to improve the overall search time. The flexible masking steps are an additional feature that require additional searches in CAM solutions. It should be remembered that there is no additional overhead for a fixed masking of data bits. The search time provided by this embodiment of the invention is approximately five times faster than comparable CAM implementations, and is on par with the search time of a hardwired ASIC2 approach by Juniper Networks. The highlights with this approach are that it is extremely deep in it's search, it is flexible in terms of allowing multiple masking operations, and it has the lowest latency of any solution.

Lowest Possible Search Latency

The system has the lowest possible packet search latency that is presently known. This occurs due to the fact that the system operates on a serial data stream prior to any parallel operations of transferring the data into memory. Alternative CAM or ASIC based systems must transfer all appropriate data bytes from a data framer into either a processor memory or directly into a CAM or ASIC solution for evaluation. The time required to perform this function adds latency to the packet through either a router or switch product. Reducing this latency helps guarantee that higher level protocols do not time out as packets are routed over an entire link.

The system can produce a guaranteed upper bound on the time required to evaluate a received packet after the packet is received. This deterministic delay could be useful in an alternative system where optical routing is performed using a detection system and an optical delay line.

Figure 5:
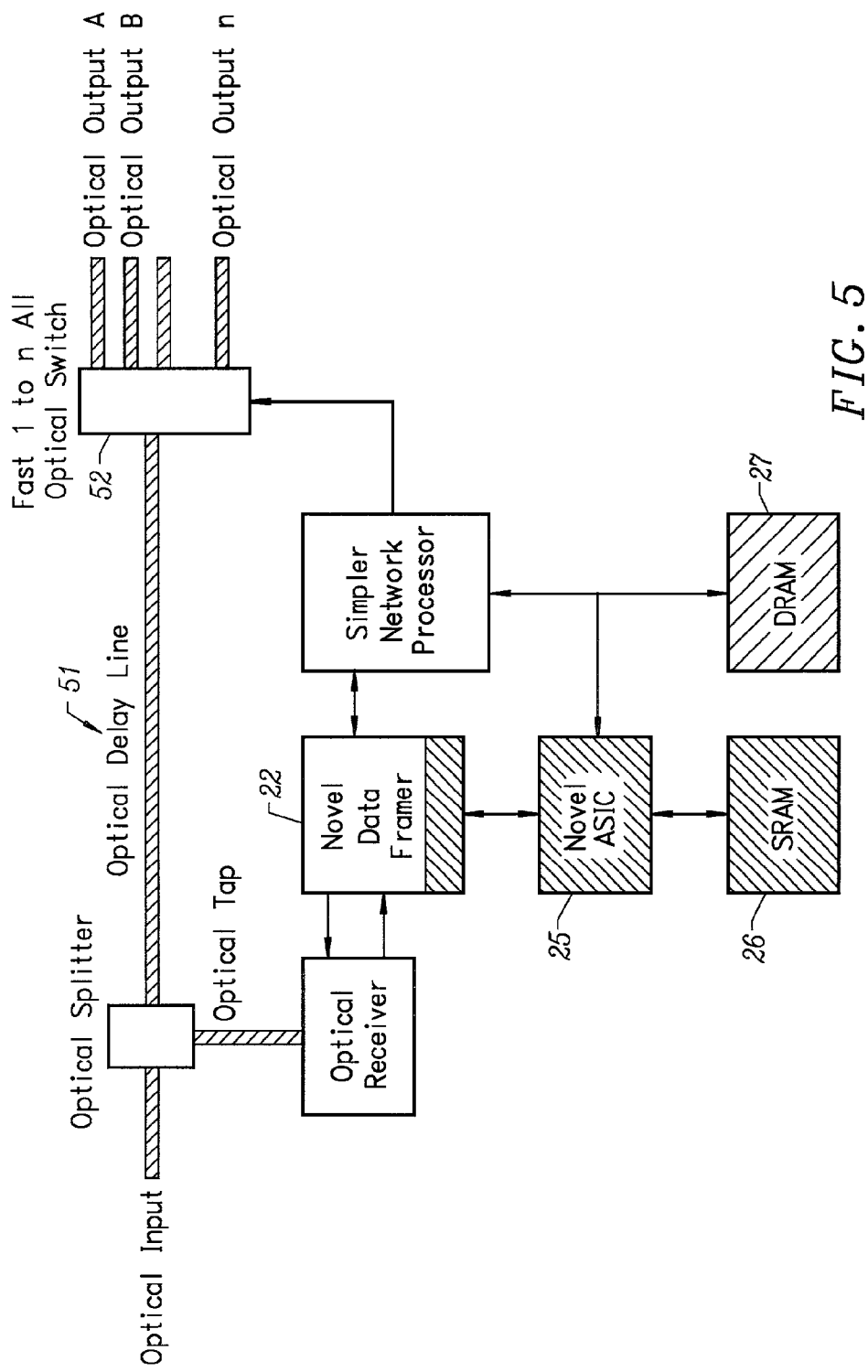
FIG. 5 is a block schematic diagram that shows an embodiment of the invention in which an optical delay line is used to make a decision as to where to route a packet prior to the packet arriving at the end of the delay line.

FIG. 5 is a block schematic diagram that shows an embodiment of the invention in which an optical delay line 51 is used to make a decision as to where to route a packet prior to the packet arriving at the end of the delay line. Using this capability, an optical switch 52 directs the data into the correct path without having to store and regenerate the optical signal.

The optical router architecture shown in FIG. 5 has some clear advantages and limitations. Light traveling down the optical delay line takes longer than the combination of the system's packet search time and the time to have the optical switch actually switch and settle out. The network processor is much simpler because it's basic function is to configure the system, and to set the selection signals for the all optical switch. If the system could guarantee a packet routing decision in 50 nsec, and the all optical switch could switch and settle in 50 nsec, then the optical delay line would have to be 100 nsec long. This would entail using over 100 feet of optical fiber within the router for each input that was to be sampled.

In addition to the physical challenges of the delay line, the signal protocol issues would have to be developed. All optical switches being developed today setup a connection and leave it there for a long period of time. This means that their switching time is not critical, and the connection is bi-directional.

Lower System Power Consumption

Power consumption is a critical parameter on line cards and in other networking gear. Reducing power consumption can have a ripple effect on overall system costs, and can also provide more degrees of freedom for the board and system designer. The system has been designed to take the most processing intensive burden away from the network processor. This permits designers to react by reducing clock speeds or decreasing memory bandwidths and achieve equivalent performance. Either of these choices reduces power consumption and cost.

The system has been designed for minimal power consumption. The data framer primary and secondary randomizers operate at full clock speeds, but are only driven during the portion of a receive data packet that is being evaluated. The design of these randomizers minimizes their power consumption. The remainder of the data framer consists of configuration or sampling registers that are read or written only once per packet, and hence draw very little power.

As with the data framer, the custom ASIC has also been designed for minimum power consumption. The custom ASIC and associated memory system are very active during configuration and draw higher power levels at that time. Once configuration is complete, the custom ASIC is fairly static. It executes SRAM cycles when primary and secondary randomizer words are read from the data framer, but these are limited in duration. Otherwise, the custom ASIC operates with little dynamic power consumption. In contrast to the system, both a prior art custom ASIC and a CAM system require extensive power consumption while they are active.

Flexible and Programmable Masking on the Fly.

Typical CAM based search engines permit global masking and bit specific masking of any bit in the data pattern. Generally, there are a limited number of bit patterns where this capability is required. The flexible and pre-programmable masking sequences that the system permits, offload additional processing work from the network processor. Based on the type of packet being received, the system can process the packet with different sequential masking operations.

Using the System on a Router Backbone

In the interest of cost savings, the system permits multiple data framers to be operated from a single custom ASIC. Many systems, such as the Juniper ASIC2 and prior art CAM based systems, can operate with the packet classification processing done on a network router backbone as opposed to on each channel. In the system, each input channel requires a data framer ASIC, but a performance tradeoff allows a single custom ASIC to be used for N data framers.

Figure 6:
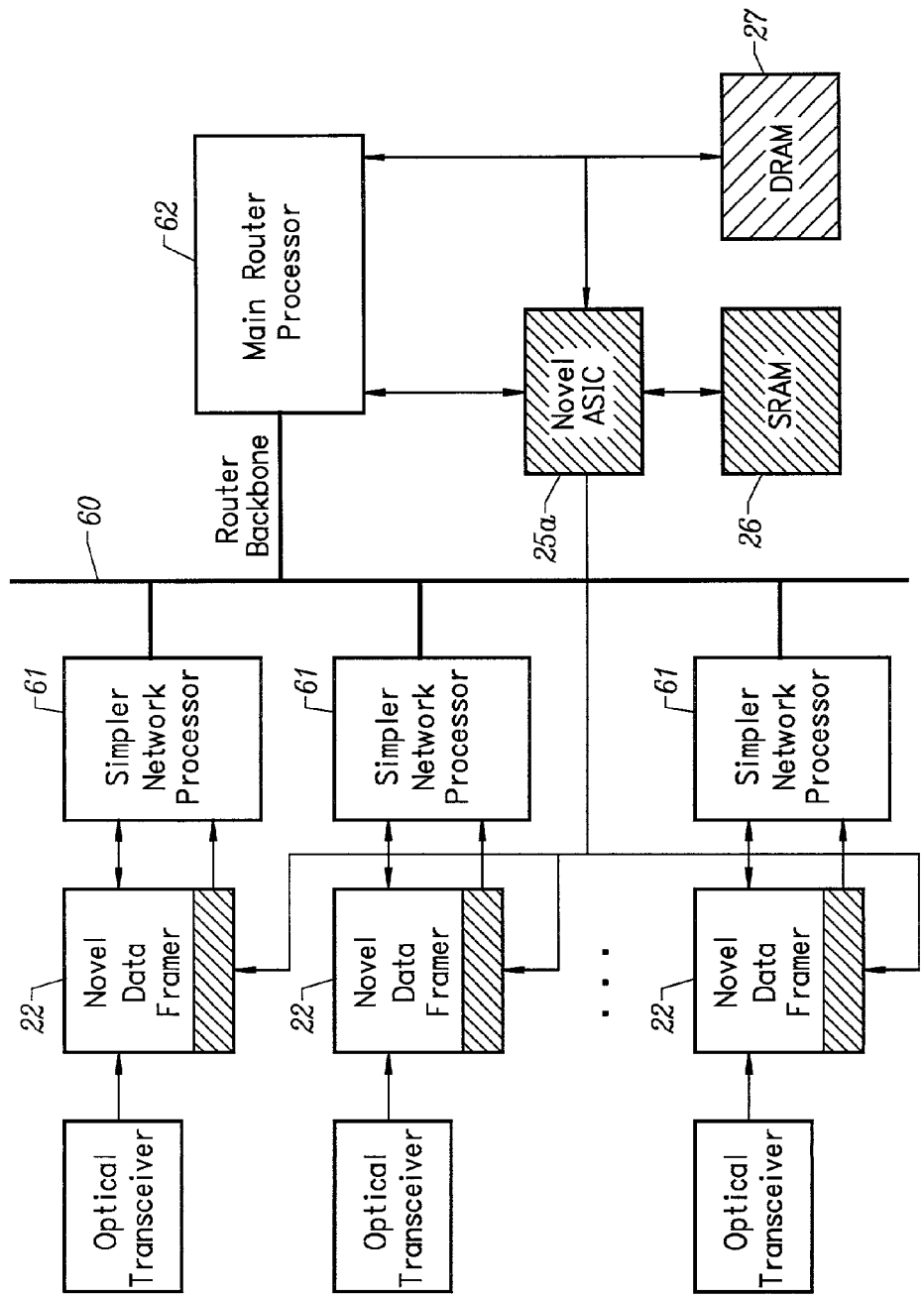
FIG. 6 is a block schematic diagram that shows the system on a router backbone.

FIG. 6 is a block schematic diagram that shows the system on a router backbone 60. The use of the system in the router backbone configuration does not have the latency improvement benefits of the implementation on each optical channel. In this configuration the system competes with large CAM based processing systems, and with Juniper Networks ASIC2 solution. The system is faster than the CAM based alternatives, and is at least as fast as the ASIC2 solution. It is also possible to use multiple custom ASICs to increase aggregate processing power in terms of packets/second.

In terms of implementation, the data framer interfaces are preferably all in parallel so that a single custom ASIC 25a could write to each data framer 22 at once. This entails setting up the randomizer feedback values. The randomizer outputs, masking registers, and feedback values used to analyze each packet are added on to each received packet. These packets are sent through each network processor 61 onto the router backbone. On the router backbone, a main router processor 62 is responsible for queuing the packets, stripping the data off and routing it into the custom ASIC, and using the custom ASIC outputs to determine how to route the packet.

Unsynchronized Data Pattern Extraction Capability

The architecture of the system provides a unique opportunity to perform ultra-high speed searching for many unsynchronized data patterns in a stream of high speed serial data. By the term unsynchronized data pattern, what is meant is a data pattern where the start of the pattern is not known, and the pattern is embedded in a stream of data. In the case of searching a data stream for specific text or other patterns, the system allows up to 10000 patterns of up to 1024 bits to be searched simultaneously in a rapid fashion. In the future of genetic research, if it was possible to take a sample of genetic information, and break it down into it's sequences while doing this in a brute force fashion on all chromosomes simultaneously, the following based approach would permit all of the genetic data to be scanned rapidly for matches with up to 10000 genetic sequences. In this way, an extremely rapid analysis of a genetic fingerprint for an individual could be made. Each base in a DNA strand can be represented with two bits of data, so the ASIC could find strands that are up to 512 bases in length. The length could be increased beyond 512 bases with a simple redesign to the novel custom ASIC.

Figure 7:
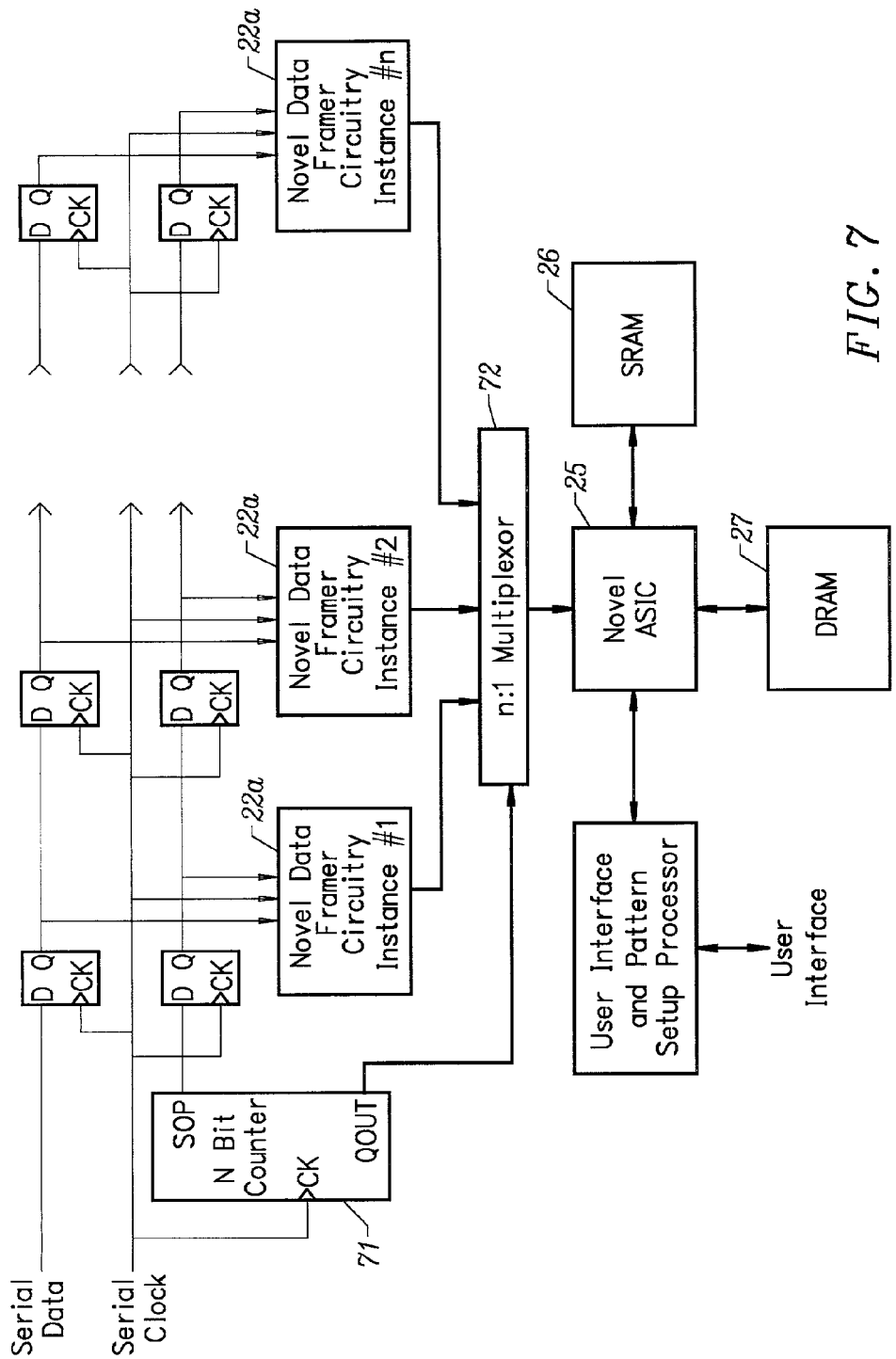
FIG. 7 is a block schematic diagram that shows an unsynchronized data pattern extraction system according to the invention.

The system for scanning random data for a match can be implemented using multiple novel style circuits as shown in FIG. 7. The total number of novel circuits 22a is equal to the number of bits that are to be analyzed in the receive data stream. An additional N bit counter 71 is used for two purposes, i.e. to generate a "Start of Pattern" signal, and to be used to select the appropriate novel circuitry output using a multiplexer 72. The "Start of Pattern" signal is shifted in one clock cycle increments so that each novel circuit begins checking the pattern at a position 1 bit shifted from the previous novel circuit. This offset means that regardless of where the start of the actual data pattern lies in the receive data stream, one of the novel circuits starts the primary and secondary randomizers on the first bit of the data pattern.

The single bit offset between novel data framers also means that one of the data framers produces an output each bit period. The n:1 multiplexer routes the correct data framer output into the novel custom ASIC 25 during each bit period. During this time, the primary and secondary randomizer outputs and any masking outputs must be transferred into the novel custom ASIC and used there. The serial speed of this system is limited by the search time of the system. The current worst case pattern match takes six SRAM cycles for the case of a quadruple output match. Using a worst case of 50 nsec for a match, the serial data rate can be up to 20 Mbits/sec if only fixed masking operations are used. A serial data rate of 20 Mbits/sec allows the data framer ASIC circuitry to be implemented easily in silicon.

One issue that affects the asynchronous data stream much more than the optical networking situation is the case of false detection. If sixteen bit primary and secondary randomizers are used, there is a one in 65,536 chance that a valid primary randomizer number has random data generate a matching secondary randomizer value. There are a variety of ways in which this can be handled. A first method is to check the data always to make sure that it was a match; a second method is to increase the size of the memory and hence reduce the odds of both valid primary and secondary values; and a third method is to use an offset pattern check to make sure that two successive readings point to the same value. The offset pattern check can be used if less than ¼ of the possible data patterns are being searched. In this case, the length of the search pattern can be increased by one bit. Every desired pattern is prepended by 0, prepended by 1, appended by 0, and appended by 1 to generate four new patterns that are each one bit longer than the desired pattern. When the system receives a match for a specific data pattern, there must always be a match for the very same specific data pattern on the very next bit period. If this does not occur, there was a false detection. This approach decreases the odds of a false detection by a factor of four billion ($2^16)2^$.

Another issue that could arise in searching the genome is the fact that input data patterns are of various lengths based on the gene. This requires there to be additional masking registers to permit a wide range in data lengths. As an example, if strands of 26, 52, 64, 78, 84, 100, 160, 220, and 330 bits in length were to be checked, the masking would have to be done sequentially, and would reduce the overall throughput. All strands would be verified for the first 26 bits, and the result would direct towards measuring the next (52−26)=26 bits for all cases that were not the 26 bit strand. At that point, the (52−26)=26 bits would be verified, and the result would direct towards measuring the next (64−52)=12 bits for those cases that were not the 52 bit strand. This would extend on until all the steps were taken.

Normally, if ten masking steps were used, the throughput of the system would be reduced by a factor of ten, but the throughput reduction could be greatly minimized through a variety of methods. In the case of genetic pattern matching, the frequency of cases where more than one mask step would be taken is extremely small, and usually would occur only if a valid pattern was correctly bit aligned. As a result, the system must handle extremely rare cases where multiple masking steps may be taken. This could be done efficiently by using a FIFO (first in first out) buffer in front of the novel custom ASIC to buffer the incoming randomizer values to handle the multiple masking cases, or by shutting off the serial data clock until a check has been completed. The important criteria here is that the most efficient searches occur when all of the data patterns to be checked are of the same length.

The novel data system opens up exciting opportunities in the arena of data mining and pattern matching. Table M identifies the time that this sort of an asynchronous data pattern detection system would take to search through the entire Human Genome. Printed text is not a good example of an asynchronous data stream because it is already framed at the character level, and can be easily translated to be framed at the word and/or sentence level.

TABLE M

Asynchronous data Search Times using Novel System

| Item | Search Time | Notes |
| --- | --- | --- |
| Entire Human Genome with no marker framing (3 Billion base pairs) | 300 seconds (5 Minutes) | This is a futuristic concept that relies on base pair sequencing without regard to markers. |
| | | Each Base Pair is 2 bits of information, and all elements being searched are the same length. |

Features of the System

Highly Specialized Programmable randomizer in a Serial Data Path

The programmable randomizer in the system is unique in a number of ways ranging from the method of programmability, the random nature of it's outputs, the simplicity of making predictive calculations as to it's value over a long stream of inputs, and the ease of predicting the affects of any specific input on the output state to effect rapid masking calculations.

Linear feedback shift registers have been used for decades in a variety of applications including cyclical redundancy check generators (CRCs), pseudo random bit sequence generators (PRBSs), and data scramblers. In most of the known applications, the feedback taps on these shift registers are selected at the point of design to maximize their randomization features. The pseudo random bit sequence generator and data scrambler applications use a linear feedback shift register to produce a serial data pattern that is as random as possible. The cyclical redundancy check generators operate on a serial data stream, and produce a parallel word at the completion of reception that is used to verify that the correct data stream has been received. In this respect, the system's use of a linear feedback shift register is similar to the application of a cyclical redundancy check generator.

The system differs dramatically from a CRC generator in the respect that it has programmable taps that allow $2^(n-1)$ different programmable feedback to be selected instead of a single fixed feedback. The "n−1" term arises because the final "nth" stage of the shift register must always be fedback in the preferred implementation. Further, the feedback are setup to exclusively-or the serial data with any combination of (n−1) shift register stages. The exclusive-or feedback allows a fixed tree of exclusive or gates to be used to exclusively-or all of the selected feedback outputs. Each output is gated with an "and" gate to control programmably whether or not it is used by the exclusive-or tree. A key feature of this approach is that it is extremely compact and easy to program. This dramatically reduces die size and power consumption because the circuitry is meant to operate at extremely high serial data rates, and the more logic that is toggling at these data rates, the more power that is consumed.

A purpose of the randomizers is to differentiate between input data patterns, and not to provide the most random possible pattern. What is more critical, is that each input affects outputs differently when switching between various feedback mechanisms. This orthogonality between how different outputs are impacted by each input, through a range of equation feedback, permits general random probability theory to be used in calculating output distributions.

The design and choice of the randomizer is critical to the ability to predict quickly in hardware the mapping from an input data stream to an output randomizer value. The sole use of exclusive-or gates in the feedback mechanism, as opposed to other forms of logic such as "AND," "NAND," "OR," or "NOR" gates greatly simplifies the predictive ability in hardware. In addition, the use of exclusive-or gates makes it possible to single out each individual input, and identify it's effect on each bit of the output pattern. This feature is critical for permitting simple masking to be performed. Finally, this approach is critical to permitting variable length packets to be easily analyzed. This is possible by the fact that any bit that is beyond the length of data to be evaluated, can be forced to a 0 in the analysis hardware tree, and the bit is effectively eliminated.

Single Cycle Hardware Calculation of Randomizer Values

The system operates on the ability to pick the best feedback mechanism for mapping input data patterns into output vectors in a rapid fashion. This requires that the system must be able to calculate output vectors in an extremely rapid fashion for a number of feedback selections. The system uses a hardware tree of exclusive-or gates to calculate output vectors for a large number of feedback selections (nominally 1000 feedback selections) in a single clock cycle. This is possible to implement by analyzing the effects of each and every input bit on the output pattern using a computer program in advance. Once these computer mappings are performed, they can be merged together for all of the possible feedback so that as many logic gates as possible are re-used. Finally, an output multiplexer allows the appropriate output vector to be selected for the feedback mechanism that is being evaluated.

Randomizer Gating Implementation

The primary and secondary randomizers in the system are gated on and off for three specific reasons, i.e. at the initiation of reception of a data packet they are turned on, at the completion of the reception of the data bits of interest they are turned off, and during any period in which the user always desires to blank out analysis of a sequence of data bits they are turned off and then back on at the end of the sequence. This ON/OFF gating of the randomizers, through user programmable control, is a unique feature to the system. This ON/OFF gating capability works in tandem with the single cycle hardware calculation of randomizers circuitry, where data bits during any "OFF" period are forced to a "0" from the perspective of randomizer calculations.

Programmable Masking Architecture

In CAM or ASIC implementations of packet classification systems, data bits can be masked off by essentially not considering them in a bit by bit comparison. The masking capability in the system is very unique. Instead of the traditional approach of blanking out or ignoring a data bit to mask it, the system calculates the effect of each data bit that the user desires to mask on the randomizer outputs, captures the actual masked data bits, and then effectively subtracts the masked data bits out of the randomizer output result using specialized hardware. The data framer incorporates the circuitry to capture the masked data bits, and the custom ASIC incorporates extensive circuitry to calculate the effects of each masked data bit on the output predictively, as well as the circuitry to subtract out the effects of the masked data bits.

Sequential Masking Capability

In addition to the ability to mask out data bits in a received packet stream, the system allows the user to setup programmed sequential masking of data bits where initial pattern matches can automatically drive subsequent masking operations without user intervention during the processing of the randomizer outputs. This sequential masking capability is normally done through processor intervention based on the outputs of various decisions. The system permits this decision driven masking to be setup proactively in advance of a packets reception. This reduces the overhead required of a network processor, and reduces the latency in making a routing decision.

Adaptive Randomizer Feedback Analysis and Selection

The architecture revolves around the ability to develop and maintain information regarding a number of randomizer feedback at any given instant in time, and to pick the best randomizer feedback adaptively using established criteria. The custom ASIC manages the memory (SRAM) tables associated with each feedback selections mappings. In addition, counters for the number of pairs, triples, quadruples, and overflow output vectors are maintained in hardware. These counters are used to identify the randomizer feedback that is least likely to need to be changed, as well as any randomizer feedback that are no longer viable. The evaluation and swapping of randomizer feedback is a real time and adaptive process based on the latest information as to the input data patterns being evaluated.

Input Manager Control and State Machines

In the preferred system, the user is allowed to provide up to 10000 different inputs that are up to 1024 bits long. This memory is a maximum of 10,240,000 bits of storage. The system returns a pointer to the data input that matches the incoming data stream. Therefore, the user should store the data in sequential locations. A single valid bit for each input is used to signify that the input data pattern is valid and should be used by the system. The external memory system is specified as using 32-bit wide memory. Therefore, it requires 32 memory accesses to read a maximum length data input. The user can write an input, and then activate that input by writing to it's associated valid bit.

External Memory Input Data and Input Valid Structures

The purpose of the external DRAM memory storage is to store input data patterns and masking information for potential future needs. If certain randomizer feedback must be eliminated due to excessive multiple structures or multiple structure overflows, it is necessary for the system to read all of the input data patterns back into the system from memory so that new patterns can be evaluated. Another reason for storing the input data is to permit users to read back any input data pattern that is being used in the custom ASIC system to evaluate the pattern, or to modify it to create another input data pattern.

The user can define the location in the external memory where the custom ASIC stores the input table. This table is called the INPUT_DATA array, and it's starting location is pointed to by the 32-bit pointer INPUT_DATA_BASE that is located on the custom ASIC. Thirty-two bits of width allows for an addressable memory size of 4.29 G.

The user must define the number of bits of data that each input data pattern contain, and this value is stored in INPUT_DATA_LENGTH that is located on the custom ASIC. This value can be in one bit increments, but from a storage perspective, input data patterns are stored in 32-bit words. Any data bits beyond this length value are masked out. In the case of an exclusive-or function, this is done by masking the input to a 0. For the custom ASIC, the maximum valid value is 1024 bits. In embodiments this value could be extended in length.

In addition to the input data pattern, the system must know what masking is required for the specified input. This information is referred to as the present masking step. Any bits in the pattern that are masked are ignored from the perspective of the stored input data pattern. If a masking step is performed after the present input data pattern with optional masking is evaluated, the next masking step must be specified. These two masking steps are stored after all of the input data pattern data words and are associated with the specific input data pattern (see Table N below).

TABLE N

Storage of Input data Pattern and Mask Step Information (Single INPUT_DATA entry)

| | Bits 31:24 | Bits 23:16 | Bits 15:8 | Bits 7:0 |
|---|---|---|---|---|
| Data Word 0 | Input Data Pattern[31:24] | Input Data Pattern[23:16] | Input Data Pattern[15:8] | Input Data Pattern[7:0] |
| Data Word 1 | Input Data Pattern[63:56] | Input Data Pattern[55:48] | Input Data Pattern[47:40] | Input Data Pattern[39:32] |
| . | . | . | . | . |
| . | . | . | . | . |
| . | . | . | . | . |
| Data Word n | Input Data Pattern [(n*32)+31: (n*32)+24)] | Input Data Pattern [(n*32)+23: (n*32)+16] | Input Data Pattern [(n*32)+15: (n*32)+8] | Input Data Pattern [(n*32)+7: (n*32)] |
| Masking Word | X | X | Next Mask Step | Present Mask Step |

The user must also signify which inputs are valid. This is done with the INPUT_VALID array, where a single bit is used to signify the validity of each user input. To conserve on data, this array is a 10000×1 bit array that can be accessed in 32-bit reads/writes. The first 32-bit location in the array signifies the status of inputs 0–31. The second 32 bit location in the array signifies the status of inputs 32–63, etc . . . Coverage of 10,000 Input data patterns requires a total of 313 32-bit words. The INPUT_VALID_BASE is used to indicate the location of the array that contains the valid status for each input location (see Table O below).

TABLE O

Storage of Input Valid Information (Entire INPUT_VALID array)

| | Bits 31:24 | Bits 23:16 | Bits 15:8 | Bits 7:0 |
|---|---|---|---|---|
| Input Valid Word 0 | Input Valid [31:24] | Input Valid [23:16] | Input Valid [15:8] | Input Valid [7:0] |
| Input Valid Word 1 | Input Valid [63:56] | Input Valid [55:48] | Input Valid [47:40] | Input Valid [39:32] |
| ... | ... | ... | ... | ... |
| Input Valid Word 312 | Input Valid [(n*32) + 31: (n*32) + 24)] | Input Valid [(n*32) + 23: (n*32) + 16] | Input Valid [(n*32) + 15: (n*32) + 8] | Input Valid [(n*32) + 7: (n*32) + 8] |

The shaded area includes valid entries for Inputs 10,000 to 10,015 which are unspecified.

The INPUT_DATA and INPUT_VALID information is all stored in external DRAM memory. Table P below describes the location of these arrays.

TABLE P

External Memory Input Structures (Entire DRAM Storage)

| Name | Length (in 32 Bit Words) | Starting Location | Notes |
|---|---|---|---|
| INPUT_VALID | 313 | INPUT_VALID_BASE | Each bit in this array signifies the validity of an input data pattern. Initialized as all zeros. |
| INPUT_DATA | 330,000 (maximum) 20,000 (minimum) | INPUT_DATA_BASE | The Maximum size per input data pattern is 33 × 32 bit words (1024 bits of Input data plus one Masking Word). The actual size will depend upon the INPUT_LENGTH. This array requires no initialization. |

Registers Associated with Input Data Structures

The following registers are located on the custom ASIC, and are used to write and clear user input data patterns located in the external INPUT_DATA array. In addition, they are used to modify the INPUT_VALID array appropriately. The INPUT_DATA_BASE and INPUT_VALID_BASE registers store the base addresses of the external structures as described herein, and the INPUT_DATA_LENGTH register stores the length of each input as previously described. The INPUT_DATA_WORD_COUNT is used as a counter to point to the individual words in the INPUT_DATA array. This value is automatically incremented after each word is written to, or read from, the INPUT_DATA array. The INPUT_DATA_NUMBER refers to the input data location that is being operated on, and falls in the range of 0 to 9,999. This location must be written to prior to operating on the INPUT_DATA array, and is stored in the USER_INPUT_DATA_NUMBER location. The INPUT_AUTO_LOCATION register is used by the system to identify the next available user input that has not been setup as valid. If the user wishes to use this input for the next Input data Pattern, the value should be read, and then written into the USER_INPUT_DATA_NUMBER register.

Within the input manager control and state machine, the necessary information regarding masking regards the masking required for the described input, and whether the randomizer results drive an additional mask step, or whether they are a final result. A later section on masking describes in detail how the masking is handled and calculated. The PRESENT_MASK_STEP value stores the masking step to be used on the present data inputs. Any bits that are covered by this masking operation are disregarded with respect to their storage in the INPUT_DATA array. The NEXT_MASK_STEP value dictates whether there is an additional masking step. A NEXT_MASK_STEP value of 0 indicates that this is a final value, and when reached, the user receives the INPUT_NUMBER for the corresponding INPUT_DATA pattern that has been matched. The two MASK registers are stored automatically by the system after all of the input data words have been loaded into DRAM.

In addition to the aforementioned registers, there are a group of registers within the input manager control and state machines (see Table Q below) that are used for internal operations. INPUT_STRUCT_PTR is a general purpose pointer used to manipulate data. INPUT_STRUCT_VALUE is a general purpose register used to store either INPUT_DATA or INPUT_VALID information. INPUT_VALID_ENCODE is used to store the result of a 32 to 1 priority encoder, and the INPUT_CONTROL_REG is described below.

TABLE Q

Storage Associated with User Inputs

| Address | Name | Size | R/W | Default | Notes |
|---|---|---|---|---|---|
| 0x00 | INPUT_VALID_BASE | 32 Bits | R/W | 0 | Points to the first entry in the INPUT_VALID data structure. |
| 0x01 | INPUT_DATA_BASE | 32 Bits | R/W | 313 | Points to the first entry in the INPUT_DATA Structure. |
| 0x02 | INPUT_DATA_LENGTH | 10 Bits | R/W | 1023 | This is the length in bits of the user input data pattern that is to be evaluated. |
| 0x03 | INPUT_DATA_WORD_COUNT | 5 Bits | R/W | X | This register stores the word count within the input data pattern. |
| 0x04 | USER_INPUT_DATA_NUMBER | 16 Bits | R/W | X | This is the number of the input data pattern that is being operated on. It is used for both writing and clearing input data patterns. |
| | SYS_INPUT_DATA_NUMBER | 16 Bits | | X | This is the number of an input data pattern that the system wishes to operate on. It is used when checking the validity of inputs, or loading inputs from the system. |
| | INPUT_NUM_SOURCE_SEL | 1 Bit | | X | This selects the user written USER_INPUT_DATA_NUMBER when set to a 0, and the System selected SYS_INPUT_DATA_NUMBER when set to a 1. The output of this register is referred to as the INPUT_DATA_NUMBER. |

TABLE Q-continued

Storage Associated with User Inputs

| Address | Name | Size | R/W | Default | Notes |
|---|---|---|---|---|---|
| 0x05 | INPUT_AUTO_LOCATION | 16 Bits | R | X | This is used by the system when it determines the next available input to write. |
| 0x06 | PRESENT_MASK_STEP | 4 Bits | R/W | X | This selects the Masking that should be done on this Input Pattern. A value of 0 indicates that this is not a masking step. |
| 0x07 | NEXT_MASK_STEP | 4 Bits | R/W | X | This dictates whether an additional MASK step will be taken when this pattern is detected. A value of 0 indicates that this is a final value. |
| 0x08 | INPUT_STRUCT_PTR | 32 Bits | X | X | This is a general purpose register to be used as a pointer into either the INPUT_DATA or INPUT_VALID structures. |
| 0x09 | INPUT_STRUCT_VALUE | 32 Bits | R/W | X | This is a general purpose register to be used to store values to be read or written to the INPUT_DATA array, or to the INPUT_VALID array. |
| 0x0A | INPUT_VALID_ENCODE | 5 Bits | | X | This is a general purpose register to be used to hold the output of a 32 bit priority encoder used for the INPUT_VALID structure. |
| 0x0B | INPUT_CONTROL_REG | 9 Bits | R/W | X | Control Register for Input data and Valid Manipulation. See detailed Description. |

INPUT_CONTROL_REG Details

The INPUT_CONTROL_REG (see Table R below) contains all of the control bits associated with modifications to the INPUT_DATA array and the INPUT_VALID array. These bits include those necessary to Initialize the INPUT_VALID array, to write new INPUT_DATA, and to read INPUT_DATA. The special AUTO_LOCATION feature is used to permit the system to determine the next available INPUT_DATA location. This is an option that is permitted in cases where the user does not want to keep track of this process in a tight fashion.

BITS [2:0] The Command field is used to select an input data pattern operation to perform. A command of 0 signifies that no operation should be done, and is the steady state for this register. A write of a non-zero value will start an operation, and immediately clear the Command Complete bit. When an operation has been totally completed, the Command Complete bit will be set. An operation can only be terminated with a Reset Command of all Ones. On Power-Up, the Command field will be set to "001" to Initialize the Input Valid

TABLE R

INPUT_CONTROL_REG

| BIT 9 | BIT 8 | BIT 7 | BIT 6 | BIT 5 | BIT 4 | BIT 3 | BIT 2 | BIT 1 | BIT 0 |
|---|---|---|---|---|---|---|---|---|---|
| Input Valid | I/O Ready | Buffer Full | Unused Input | Inputs Full | Wrap | Command Complete | Command | | | array. When the Initialization sequence completes, the Command Complete bit is set.

Code Command
"000" No-Operation
"001" Initialize Input Valid array
"010" Write/Load Input into DRAM
"011" Write Input into DRAM
"100" Read Input from DRAM
"101" Clear Input from DRAM
"110" Check Input Valid
"111" Reset Command BIT 3 The Command Complete bit is set to a "1" when the specified command has been completed. If the Command Complete bit is a "0", only the Reset Command can be written to the Command field.

BIT 4 The Wrap Bit is used to signify that the system has wrapped over the maximum value in the INPUT_VALID array. This is used in the process of searching an unused input.

BIT 5 The Inputs Full Bit is used to signify that there are no open inputs available in the structure.

BIT 6 The Unused Input bit is used to signify that the system has identified the next available input location, and the input number is stored in the INPUT_AUTO_LOCATION register.

BIT 7 The Buffer Full bit is used to indicate that either the Write Buffer when setting up a pattern, or the Read Buffer when reading back a pattern is full.

BIT 8 The I/O Ready bit is used to signify that the system is ready for a write or a read operation that has been previously setup.

BIT 9 The Input Valid bit is used to signify that an input being checked is storing a valid input that is being used by the system.

Inputs and Equation Correlation

It is critical that there be correlation between the inputs that are stored and the ones that have been mapped by various equations. As inputs are written or cleared, they are always calculated for all active equations at that time. The equation update generator uses an EQUATION_INPUT_UPDATE_PTR to cycle through all of the valid inputs. If a new input is stored in the middle of this process, or an input is cleared, the EQUATION_INPUT_UPDATE can be temporarily discontinued to allow that to occur. When equation updates are being made, it is necessary to initialize (clear) out the entire primary and secondary randomizer tables.

Processes Associated with Input Control

The processes shown in Table S below are used to manipulate the input array and the input valid databases.

TABLE S

Processes Associated with Input Control

| Process/Macro Name | Process Type | Description |
|---|---|---|
| INIT_INPUT_VALID | Internal | Used to initialize the Input Valid Array. |
| USER_CHECK_VALID | External | Used by the user to determine whether a specific Input Number is Valid and being used by the equation Mappers. |
| SYS_CHECK_VALID | Internal | Used by the system to determine whether a specific Input Number is Valid and being used by the equation Mappers. |
| SYS_GET_AVAIL_INPUT | Internal | Used to determine the next available input location in the user input array. |
| USER_INPUT_WR_LOAD | External | Used to write a user input into DRAM for storage, and loads it into the Input Register. |
| USER_INPUT_WRITE | External | Used to write a user input into DRAM for storage. This procedure does not load the input register. |
| USER_INPUT_READ | External | Used to read a user input from DRAM. This procedure does not load the input register. |
| USER_INPUT_CLEAR | External | Used to clear out a user input from DRAM. This process automatically involves loading it into the Input Register. |
| SYS_INPUT_LOAD | Internal | Used to read a user input from DRAM and load it into the Input Register without having the user read the value. This process is used for internal equation table regeneration. |

Input Register Arbitration and DRAM Access Arbitration

There are five processes that require access to the DRAM. Two of these processes, USER_INPUT_WR_LOAD, and USER_INPUT_CLEAR, also load the input register. The user should be accessing only one of the three user/external processes at a time because it is the user's responsibility to finish one action prior to starting another. From the perspective of the 1024-bit input register, there are three processes that result in it being loaded: USER_INPUT_WR_LOAD, USER_INPUT_CLEAR and SYS_INPUT_LOAD. The SYS_INPUT_LOAD and USER_SYS_INPUT_VALID procedures can be initiated by the system, as part of a full equation swap, and are less critical than an immediate change by the user with either the USER_INPUT_WR_LOAD or the USER_INPUT_CLEAR processes (see Table T below).

TABLE T

Input Register Arbitration

| Process | Priority | Rationale |
|---|---|---|
| USER_INPUT_WR_LOAD | Highest | When the user wishes to add a new input to the system, this should take the highest priority. |

TABLE T-continued

Input Register Arbitration

| Process | Priority | Rationale |
|---|---|---|
| USER_INPUT_CLEAR | Medium | Clearing an input is less critical than writing a new input into the system. |
| SYS_INPUT_LOAD | Lowest | This routine is called when refreshing an equation which should take the lowest priority. |

The DRAM memory can be accessed by a number of processes described above. It is necessary to have arbitration between these processes, so that any two do not conflict over the use of internal registers. The weights in the Table U below are meant to show how often one of the following actions should be taken when two actions are being requested. The real issue here is the relative weights. For example, a USER_INPUT_WR_LOAD occurs eight times for every USER_INPUT_LOAD if both are continually being requested.

TABLE U

DRAM Access Arbitration

| Process | Priority And Arbitration Weight | Rationale |
|---|---|---|
| INPUT_VALID_INIT | 10/10 | Must be done on initialization prior to any other operation on the user data. |
| USER_INPUT_WR_LOAD | 8/10 | High priority since new user writes are more critical than reads or clears. |
| USER_INPUT_WRITE | 2/10 | Lower priority since this write is not being presently used or mapped. |
| USER_INPUT_READ | 5/10 | Read may be needed to calculate a new value to write into the chip. |
| GET_AVAIL_INPUT | 4/10 | May be critical for a new write to occur. |
| SYS_INPUT_LOAD | 2/10 | Used by the system for equation updates. |
| USER_INPUT_LOAD | 1/10 | Should rarely take priority over user activities. |

Inter-Block Communication

It is necessary for the mapper engine, statistics, and equation state machine to be able to read input data values from DRAM into the input registers so that they can be mapped and stored. This is important for the equation update process.

The I/O ready bit in the input control register is used to hold-off read or writes to the custom ASIC until the proper internal function has been completed. In addition, the I/O ready bit is used to handle the larger issue of holding off the user while the system uses the input registers to recalculate an equation. A round robin arbiter is used to make sure that the system and the user get alternating preference on occasions where a conflict exists. As the user issues a command, the system determines whether the mapper engine, statistics, and equation state machine is also requesting access. If the internal mapper . . . " block has priority, the I/O ready bit is kept at a level until the internal operation completes (see Table V below).

TABLE V

Inter-Block Signals (Input Manager Control and State Machine <-> mapper Engine, Statistics and equation state machine)

| Signal | Input Manager Direction | Notes |
|---|---|---|
| Request Input Control | Input | Signifies that the mapper Engine wishes to perform an operation |
| Input Control Acknowledge | Output | Passes control of the Input Manager registers to the mapper Engine |
| Load Input Register | Input | Used by the mapper Engine to start a fetch from DRAM. The USER_INPUT_DATA_NUMBER must be previously loaded by the system. |
| Input Register Loaded | Output | Tells the mapper Engine that the data in the Input Register is for a complete input. |

1024-Bit Input Registers

There are four sources of data that need to be able to drive the equation mapper, i.e. a new user input that should be mapped and stored for future use, a previously stored user input that should be brought back for analysis with a new equation, special bit patterns required for input data masking analysis, and parallel data that is received and requires packet classification. The discussion above described how arbitration between new user inputs and previously stored user inputs is performed. Neither of these functions is time critical, but either requires significant overhead in setup and should not be interrupted prior to completion. The special bit patterns required for input data masking analysis are described herein, and they are independently generated and multiplexed into the source of the equation mapper. Finally, parallel data that are received and require packet classification have a time critical component. Due to the time criticality for parallel classification, an independent set of registers is used to store this data. This permits decisions to be made rapidly, and results in minimal disruption to the new user input and previous user input analysis that may be occurring concurrently.

1024-Bit Input Register for Analysis

There are 1024 input bits in the custom ASIC that store and operate on user defined input data patterns. The INPUT_

STRUCT_VALUE holding register routes to 32 different input data registers that are each 32 bits in length. The select for each bank of registers is cycled through from Bank0 to Bank31 as a total input vector is loaded into the custom ASIC. The input data registers are not externally readable or writeable by the user. The INPUT_DATA_WORD_COUNT register routes the INPUT_STRUCT_VALUE to the appropriate INPUT_REG_BANKn (see Table W below).

TABLE W

Input Register data Structure

| Name | Size | Notes |
|---|---|---|
| INPUT_REG_BANK0 | 32 Bits | Contains Input data Pattern Bits[31:0] |
| INPUT_REG_BANK1 | 32 Bits | Contains Input data Pattern Bits [63:32] |
| INPUT_REG_BANK2 | 32 Bits | Contains Input data Pattern Bits [95:64] |
| . | | |
| . | | |
| . | | |
| INPUT_REG_BANK31 | 32 Bits | Contains Input data Pattern Bits [1023:991] |

The user's access to input data patterns is through the INPUT_STRUCT_VALUE register. The user can indirectly load the input registers through writing a new input data pattern into the custom ASIC, by reading and modifying a value stored in DRAM, and by clearing a value stored in memory. The system also is responsible for loading these registers during the operation of generating new randomizer values for a new equation. Table X below describes operations that result in loading the 1024-bit input register.

TABLE X

Table of Operations that Load the 1024-Bit Input Register

| Process | Initiator | Data Source |
|---|---|---|
| USER_INPUT_WR_LOAD | User | INPUT_STRUCT_VALUE (Written by User) |
| USER_INPUT_CLEAR | User | DRAM |
| SYS_INPUT_LOAD | System | DRAM |

1024-Bit Input Register for Classification

There are 1024 input classification bits in the custom ASIC that analyze received data patterns for parallel classification. The INPUT_CLASS_VALUE holding register routes to 32 different input data registers that are each 32 bits in length. The select for each bank of registers is cycled through from Bank0 to Bank31 as a total input classification pattern is loaded into the custom ASIC. The input classification registers are not externally readable or writeable by the user. The INPUT_CLASS_WORD_COUNT register routes the INPUT_CLASS_VALUE to the appropriate INPUT_CLASS_REG_BANKn (see Tables X and Y below).

TABLE X

Registers Associated with Parallel Input Classification

| Name | Size | Note |
|---|---|---|
| INPUT_CLASS_VALUE | 32 Bits | Contains Input Classification bits |
| INPUT_CLASS_WORD_COUNT | 5 Bits | Selects one of 32 Input Classification Registers to direct the INPUT_CLASS_VALUE to. Automatically increments after write. When this exceeds the INPUT_DATA_LENGTH, it interrupts the Master Controller so that a Parallel Classification will be performed. |

TABLE Y

Input Classification Register data Structure

| Name | Size | Notes |
|---|---|---|
| INPUT_CLASS_REG_BANK0 | 32 Bits | Contains Input Classification Bits[31:0] |
| INPUT_CLASS_REG_BANK1 | 32 Bits | Contains Input Classification Bits[63:32] |
| INPUT_CLASS_REG_BANK2 | 32 Bits | Contains Input Classification Bits[95:64] |
| . | | |
| . | | |
| . | | |
| INPUT_CLASS_REG_BANK31 | 32 Bits | Contains Input Classification Bits[1023:991] |

The user's access to input classification patterns is through the INPUT_CLASS_VALUE register. The user directly loads the input classification registers through writing a new input data pattern into the custom ASIC Masking and Enabling Logic and Masking Engine Details The masking and enabling logic and the masking engine in the custom ASIC handle all aspects of the programmable masking function. The first major function is storage of user masking information including a description of the input data bits that are to be masked, as well as information identifying what bits are to be masked at what step of the sequential masking process. The second major function is the circuitry to generate the fixed masking of specified data bits. The third major function is the mask impact calculation circuitry. This circuitry drives the input data to determine the effect of each data bit on the output vector, so that when the bit is masked, it's effect can be cancelled out when interpreting a randomizer value. The fourth major function involves interpreting the outputs of the data framer to account for masking.

User Masking Information

The first level of masking information that must be stored by the system is the masking of all data bits beyond the length of data that the user desires to analyze, and the masking of data within a fixed OFF/ON period after the start of the input data pattern. To implement the length and OFF/ON period masking, a set of 1024 input enable bits is used to gate the input data bits to a zero in the cases where the bit is to be ignored. The INPUT_DATA_LENGTH register in the input section identifies the number of data bits that must be evaluated. The following registers identify the bit range that is to be masked by the OFF/ON period, and they are both user readable and writeable. The enable bits dictate whether the register are used and it's value is sent to the data framer (see Table Z below).

TABLE Z

| | Off/On Register Description | | |
|---|---|---|---|
| Address | Name | B10 | B9-B0 |
| 0x10 | MASK_OFF_CYCLE_REG | Enable | Mask Off Start Location |
| 0x11 | MASK_ON_CYCLE_REG | Enable | Mask On Start Location |

The user is supplied with four 32-bit input blocks that can be used for fixed and/or programmable bit masking. To achieve the effect of forced masking for bits covered by each enabled Programmable Mask register, the user must explicitly mask the bit pattern for each masking step pattern that is used. The 32 bit input blocks occur on 32-bit word boundaries, and can be described with simple five bit numbers (1024/32=32 or five bits). These 5-bit values identify bits in the received data pattern that are captured by the data framer in it's masking registers. In addition, a sixth bit is used to identify whether the mask register is to be enabled or disabled. This impacts whether the data framer captures the corresponding data. Disabling unnecessary masking conserves overall system power consumption. All of the mask register enable bits are set to 0 at power-up so that masking is disabled. All of the mask register start registers are both user writeable and user readable (see Table AA below).

TABLE AA

| | Programmable Mask Registers | | | | | | |
|---|---|---|---|---|---|---|---|
| Address | Name | B5 | B4 | B3 | B2 | B1 | B0 |
| 0x12 | MASK_REGISTER_0 | Enable | | Mask Start Value 0 | | | |
| 0x13 | MASK_REGISTER_1 | Enable | | Mask Start Value 1 | | | |
| 0x14 | MASK_REGISTER_2 | Enable | | Mask Start Value 2 | | | |
| 0x15 | MASK_REGISTER_3 | Enable | | Mask Start Value 3 | | | |

The custom ASIC provides up to eight selective masking steps, and permits the user to use any combination of these steps for a specific data circumstance. Selective Mask Step 0 is always used as the initial masking step when a packet is received. Selective Mask Steps 1–7 are used to handle occasions where the user wishes to mask subsets of data based upon specific packet types or parameters. Each of the 32×4=128 maskable bits have eight selective masking bits associated with them for a total of 1024 selective masking step bits. All selective masking step registers are both user readable and user write-able. If a MASK_REGISTER is disabled, the selective step bits are ignored (see Table AB below).

TABLE AB

| | Selective Masking Step Registers | | | | | | |
|---|---|---|---|---|---|---|---|
| Address | Name | B31:B5 | B4 | B3 | B2 | B1 | B0 |
| 0x20 | MASK_REG0_SMS0 | Forced Masking bits for Mask Register 0 | | | | | |
| 0x21 | MASK_REG0_SMS1 | Masking Bits for Mask Register 0 with Selective Masking Step 1. | | | | | |
| 0x22 | MASK_REG0_SMS2 | Masking Bits for Mask Register 0 with Selective Masking Step 2. | | | | | |
| 0x23 | MASK_REG0_SMS3 | Masking Bits for Mask Register 0 with Selective Masking Step 3. | | | | | |
| 0x24 | MASK_REG0_SMS4 | Masking Bits for Mask Register 0 with Selective Masking Step 4. | | | | | |
| 0x25 | MASK_REG0_SMS5 | Masking Bits for Mask Register 0 with Selective Masking Step 5. | | | | | |
| 0x26 | MASK_REG0_SMS6 | Masking Bits for Mask Register 0 with Selective Masking Step 6. | | | | | |
| 0x27 | MASK_REG0_SMS7 | Masking Bits for Mask Register 0 with Selective Masking Step 7. | | | | | |

TABLE AB-continued

Selective Masking Step Registers

| Address | Name | B31:B5 | B4 | B3 | B2 | B1 | B0 |
|---|---|---|---|---|---|---|---|
| 0x28 | MASK_REG1_SMS0 | Forced Masking bits for Mask Register 1 | | | | | |
| 0x29 | MASK_REG1_SMS1 | Masking Bits for Mask Register 1 with Selective Masking Step 1. | | | | | |
| 0x2A | MASK_REG1_SMS2 | . . . | 1 | 1 | 1 | 1 | 0 |
| 0x2B | MASK_REG1_SMS3 | . . . | 0 | 1 | 0 | 1 | 0 |
| 0x2C | MASK_REG1_SMS4 | . . . | 1 | 1 | 1 | 0 | 1 |
| 0x2D | MASK_REG1_SMS5 | Masking Bits for Mask Register 1 with Selective Masking Step 5. | | | | | |
| 0x2E | MASK_REG1_SMS6 | Masking Bits for Mask Register 1 with Selective Masking Step 6. | | | | | |
| 0x2F | MASK_REG1_SMS7 | Masking Bits for Mask Register 1 with Selective Masking Step 7. | | | | | |
| 0x30 | MASK_REG2_SMS0 | Forced Masking bits for Mask Register 2 | | | | | |
| 0x31 | MASK_REG2_SMS1 | Masking Bits for Mask Register 2 with Selective Masking Step 1. | | | | | |
| . . . | . . . | | | | | | |
| 0x3E | MASK_REG3_SMS6 | Masking Bits for Mask Register 3 with Selective Masking Step 6. | | | | | |
| 0x3F | MASK_REG3_SMS7 | Masking Bits for Mask Register 3 with Selective Masking Step 7. | | | | | |

In Table AB, the addresses 0x2A, 0x2B and 0x2C have been expanded for bits 0 to 4 for illustration purposes. In this example in selective masking pattern 2 for mask register 1, bits 1–4 are masked. In selective masking step 3 for mask register 1, bits 1 and 3 are masked. In selective masking step 4 for mask register 1, bits 0 and 2–4 are masked.

Forced Masking Circuitry

The custom ASIC includes 1024 bits that are used to enable or disable the bit from consideration. These bits are used to drive the selection of whether an input data bit drives the mapper circuitry, or whether a "0" value is switched in to mask out the value (see table AC below). All bits that are contained within the fields of enabled Programmable Mask Registers will automatically be enabled for purposes of driving the mapping circuitry.

TABLE AC

Input Enable Registers

| Name | Size | Notes |
|---|---|---|
| INPUT_ENAB_BANK0 | 32 Bits | Contains Enables for Input data Pattern Bits[31:0] |
| INPUT_ENAB_BANK1 | 32 Bits | Contains Enables for Input data Pattern Bits[63:32] |

TABLE AC-continued

Input Enable Registers

| Name | Size | Notes |
|---|---|---|
| INPUT_ENAB_BANK2 | 32 Bits | Contains Enables for Input data Pattern Bits[95:64] |
| . . . | | |
| INPUT_ENAB_BANK31 | 32 Bits | Contains Enables for Input data Pattern Bits[1023:991] |

Within the masking and enabling logic, there is a block of initialization circuitry that can load up the INPUT_ENAB_BANKn registers. The steps of this initialization include: setting all of the bits to enabled, clearing out all enables after the INPUT_DATA_LENGTH value, and disabling bits that occur between the MASK_OFF_CYCLE_REG and the MASK_ON_CYCLE_REG. The forced masking steps affect every input data pattern, and as such, it is expected that they are setup once upon initialization. If any of these registers are changed, the entire custom ASIC and respective mappings become invalid, and require recalculation. The forced masking state machine is started after the appropriate user setup sequence (see Table AD below).

TABLE AD

Forced Masking State Machine Registers

| Name | Size | Notes |
|---|---|---|
| SET_ENAB_BANK | 5 Bits | Counter to count through the 32 possible input banks |
| SET_ENAB_BIT | 5 Bits | Counter to count through the 32 bit locations within an input bank. |
| SET_ENAB_FROM_SMS0 | 1 Bit | Signifies that there has been a match with one of the four mask registers. |
| SET_ENAB_SMS0_SELECT | 2 Bits | Signifies the specific mask register that has been matched. |

TABLE AD-continued

Forced Masking State Machine Registers

| Name | Size | Notes |
|---|---|---|
| FORCE_MASK_ON | 1 Bit | When this bit is set, bits will be Force Masked as a result of a MASK ON/OFF function or exceeding the INPUT_DATA_LENGTH. |
| WRITE_BIT | 1 Bit | This is a bit that is ready to write into the appropriate enable register. |

Mask Impact Calculation Circuitry

The masking impact of each bit that is in one of the four 32-bit masking registers must be calculated for each equation that is used. As a new equation is swapped in, theses bits must be calculated prior to re-evaluating all of the available inputs. Each input bit can affect any of the sixteen output bits in the primary randomizer pattern. Therefore, there are a maximum of 16×4×32=2,048 bits that must be stored per each equation. With a set of eight equations, this translates to a total of 8×2048=16,384 masking impact bits. Because it is critical that the masking impact bits be available in real time for equation calculations, it is important that these mask impact registers be stored on the custom ASIC. The masking impact registers are internal, and are not user-readable (see Table AE below).

TABLE AE

Masking Impact Register Structure
(Internal to custom ASIC)

| Name | Description |
|---|---|
| EQ0_MASK_REG0_IMP_BIT0 | equation 0, Mask Register 0, Bit 0–16 Bit mask impact |
| EQ0_MASK_REG0_IMP_BIT1 | equation 0, Mask Register 0, Bit 1–16 Bit mask impact |
| . | . |
| . | . |
| . | . |
| EQ0_MASK_REG0_IMP_BIT31 | equation 0, Mask Register 0, Bit 31–16 Bit mask impact |
| EQ0_MASK_REG1_IMP_BIT0 | equation 0, Mask Register 1, Bit 0–16 Bit mask impact |
| EQ0_MASK_REG1_IMP_BIT1 | equation 0, Mask Register 1, Bit 1–16 Bit mask impact |
| . | . |
| . | . |
| . | . |
| EQ0_MASK_REG1_IMP_BIT31 | equation 0, Mask Register 1, Bit 31–16 Bit mask impact |
| EQ0_MASK_REG2_IMP_BIT0 | equation 0, Mask Register 2, Bit 0–16 Bit mask impact |
| EQ0_MASK_REG2_IMP_BIT1 | equation 0, Mask Register 2, Bit 1–16 Bit mask impact |
| . | . |
| . | . |
| . | . |
| EQ0_MASK_REG2_IMP_BIT31 | equation 0, Mask Register 2, Bit 31–16 Bit mask impact |
| EQ0_MASK_REG3_IMP_BIT0 | equation 0, Mask Register 3, Bit 0–16 Bit mask impact |
| EQ0_MASK_REG3_IMP_BIT1 | equation 0, Mask Register 3, Bit 1–16 Bit mask impact |
| . | . |
| . | . |
| . | . |
| EQ0_MASK_REG3_IMP_BIT31 | equation 0, Mask Register 3, Bit 31–16 Bit mask impact |
| EQ1_MASK_REG0_IMP_BIT0 | equation 1, Mask Register 0, Bit 0–16 Bit mask impact |
| EQ1_MASK_REG0_IMP_BIT1 | equation 1, Mask Register 0, Bit 1–16 Bit mask impact |
| . | . |
| . | . |
| . | . |
| EQ1_MASK_REG0_IMP_BIT31 | equation 1, Mask Register 0, Bit 31–16 Bit mask impact |
| . | |
| . | |
| . | |
| . | |
| . | |
| . | |
| EQ7_MASK_REG3_IMP_BIT0 | equation 7, Mask Register 3, Bit 0–16 Bit mask impact |
| EQ7_MASK_REG3_IMP_BIT1 | equation 7, Mask Register 3, Bit 1–16 Bit mask impact |
| . | . |
| . | . |
| EQ7_MASK_REG3_IMP_BIT31 | equation 7, Mask Register 3, Bit 31–16 Bit mask impact |

Figure 12:
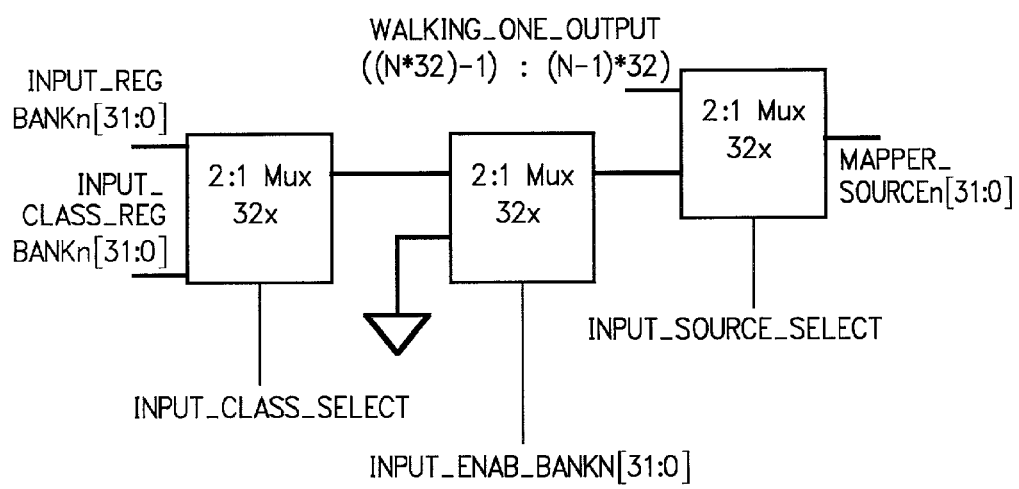
FIG. 12 is a block schematic diagram that shows forced masking and walking one's injection for INPUT_REG_BANKn according to the invention.

The calculation of the masking impact bits is done by injecting a single "1" pattern into every appropriate bit in the input data pattern. As an input of a "1" in a specific masked bit is applied, the output of the mapper circuit is a 16-bit mask impact that needs to be stored. This mask impact can then be calculated for each of the eight active equations before the walking "1"s pattern is advanced (see FIG. 12). The walking 1's pattern is generated by writing a 10-bit value into the WALKING_ONE_VALUE register, and having it drive a 10:1024 decoder. The output of the decoder is a single "1" in the location identified by the WALKING_ONE_VALUE register.

The input source select directs whether the input register or the walking one's pattern should be used to drive the mapping circuitry (see Tables AF and AG below).

TABLE AF

Internal Register associated with Masking Impact Calculation

| Register | Size | Notes |
| --- | --- | --- |
| WALKING_ONE_VALUE | 10 bits | Signifies the input that is to be set to a "1" for Masking Impact test purposes. |
| INPUT_SOURCE_SELECT | 1 bit | "1" selects the Input Register to drive the mapping circuitry. "0" selects the Walking One's pattern to drive the mapping Circuitry. |
| INPUT_CLASS_SELECT | 1 bit | "1" selects parallel input classification mode. "0" selects the input register pattern used to calculate mapping values. |
| EQUATION_STORE_ENTRY | 3 bits | Signifies the equation being used. Valid equations range from 0 to 7. |

TABLE AG

Output Signals from the 10 bit decoder

| Decoder Output Signals | Notes |
| --- | --- |
| WALKING_ONE_OUTPUT[1023:0] | Routes to multiplexers associated with each input data bit. |

The walking ones pattern must be driven by the system into the inputs that are associated with each MASK_REGISTER. A state machine sequences through the registers to accomplish this task (see Table AH below).

TABLE AH

Internal Signals driving the 1024 equation Mapper

| Signal | Size | Notes |
| --- | --- | --- |
| MAPPER_SOURCE0[31:0] | 32 Bits | Signal Bits[31:0] that drive the Mapper |
| MAPPER_SOURCE1[31:0] | 32 Bits | Signal Bits[63:32] that drive the Mapper |
| . | . | . |
| . | . | . |
| . | . | . |
| MAPPER_SOURCE31[31:0] | 32 Bits | Signal Bits[1023:991] that drive the Mapper |

The mapper outputs must be routed to the appropriate mask impact registers for the equation that is being addressed. For instance, when equation 1's mapping is being checked for MASK_REG0 and the system is looking at the impact of bit 31 in the register, the mapper value is written to the register EQ1_MASK_REG0_IMP_BIT31. The mapper outputs must be routed to a total of 1024=(8 equations*4 mask registers*32 bits) mask impact registers. The novel custom ASIC must be able to generate an enable for each of these registers that is based on the equation number, the bit number, and the MASK_REGISTER.

Output Mask Adjustments

When a randomizer value from the data framer is received, the system must adjust it by canceling out any bits that have been masked. This operation is done using the mask impact registers and effectively adding the appropriate values into the received word based on the equation being used at the time. In the case of the primary and secondary randomizer values, different equations are used to generate these numbers (see Table AI below).

TABLE AI

Randomizer Received Registers

| Address | Name | Size | Notes |
| --- | --- | --- | --- |
| 0x00 | PRIM_RANDOMIZER_RX | 16 Bits | Novel data framer ASIC primary randomizer received value |
| 0x01 | SEC_RANDOMIZER_RX | 16 Bits | Novel data framer ASIC secondary randomizer received value |

The storage registers for the mask capture data from the data framer are used in the calculation to cancel out the effect of masked bits (see Table AJ below).

TABLE AJ

Mask Register Capture Data

| Address | Name | Size | Notes |
| --- | --- | --- | --- |
| 0x02 | MASK_CAPTURE_DATA_0 | 32 Bits | Novel data framer ASIC Mask Capture data for MASK_REGISTER_0 |
| 0x03 | MASK_CAPTURE_DATA_1 | 32 Bits | Novel data framer ASIC Mask Capture data for MASK_REGISTER_1 |
| 0x04 | MASK_CAPTURE_DATA_2 | 32 Bits | Novel data framer ASIC Mask Capture data for MASK_REGISTER_2 |

TABLE AJ-continued

Mask Register Capture Data

| Address | Name | Size | Notes |
|---|---|---|---|
| 0x05 | MASK_CAPTURE_DATA_3 | 32 Bits | Novel data framer ASIC Mask Capture data for MASK_REGISTER_3 |

Parallel Classification Output Mask Adjustments

When a parallel data pattern is loaded into the system from the microprocessor interface for classification, the system must adjust it by canceling out any bits that have been masked. This operation is done using the mask impact registers and effectively adding the appropriate values into the received word based on the equation being used at the time. In the case of the primary and secondary randomizer values, different equations are used to generate these numbers (see Table AK below).

TABLE AK

Parallel Classification randomizer Registers

| Name | Size | Notes |
|---|---|---|
| PRIM_RANDOMIZER_PAR | 32 Bits | This value is latched from the output of the mapper Multiplexer. |
| SEC_RANDOMIZER_PAR | 32 Bits | This value is latched from the output of the mapper Multiplexer. |

The storage registers for the mask capture data from the data framer are used in the calculation to cancel out the effect of masked bits (see Table AL below).

TABLE AL

Parallel Classification Mask Register Capture Data

| Name | Size | Notes |
|---|---|---|
| MASK_CAPTURE_PAR_0 | 32 Bits | Mask Capture Register 0 for Parallel Classification mode. |
| MASK_CAPTURE_PAR_1 | 32 Bits | Mask Capture Register 1 for Parallel Classification mode. |
| MASK_CAPTURE_PAR_2 | 32 Bits | Mask Capture Register 2 for Parallel Classification mode. |
| MASK_CAPTURE_PAR_3 | 32 Bits | Mask Capture Register 3 for Parallel Classification mode. |

Illustration of Programmable Masking

To determine the post masking result for any bit in a randomizer pattern, there are a total of four values that must be considered, i.e. the non-masked randomizer output (PRIM_RANDOMIZER_RX or SEC_RANDOMIZER_RX), the sequential mask step for the specific bit for the specific equation being analyzed (MASK_REGm_SM-Sp_EQn), the mask impact for the specific bit (EQn_MASK_REGm_IMP_BITq), and the actual captured status of the masked bit (MASK_CAPUTURE_DATA_m). From a masking perspective, there are a total of 128 (32×4) bits that can be masked. At this point, the mask registers, the mask capture data registers, and the mask impact registers are all relative, and we are not concerned with the absolute location within the data word. What is important is whether a specific bit is being masked in a specific selective masking sequence, whether the bit impacts the output vector, and whether the bit was actually captured as a one. Due to the nature of the randomizer implementations, data bits that are 0 do not impact the output vector (see Table AM below).

TABLE AM

Internal Register to choose the Selective Masking Step Register

| Name | Size | Notes |
|---|---|---|
| SELECTIVE_MASK_SELECT | 3 Bits | This register is written by the system to choose the Selective Masking pattern to be used in calculations. |

The programmable masking function can operate on either the primary or the secondary randomizer value. The system must be able to switch between these between any two cycles because evaluation of the primary and secondary values must be done in successive operations when searching the database. The RANDOMIZER_SELECT register determines which of these two randomizer values is analyzed.

The novel custom ASIC permits analysis of either data (serial) or parallel data passed over from the microprocessor. The SOURCE_SER_PAR signal is used to select between these two sources of data. This signal permits the system to operate while receiving packet classification information through these two possible interfaces (see Table AO below).

TABLE AO

Internal Register to choose the randomizer Output to be analyzed

| Name | Size | Notes |
|---|---|---|
| RANDOMIZER_SELECT | 1 Bit | This register is written by the system to choose the randomizer to be analyzed by the Masking Analyzer. A "0" value selects the primary randomizer, while a "1" value selects the secondary randomizer value. |
| SOURCE_SER_PAR | 1 Bit | This register selects between classifying data from the Serial interface or the Parallel Microprocessor interface. A value of "0" selects the Novel interface, and a value of "1" selects the Parallel Interface. |

Figure 13:
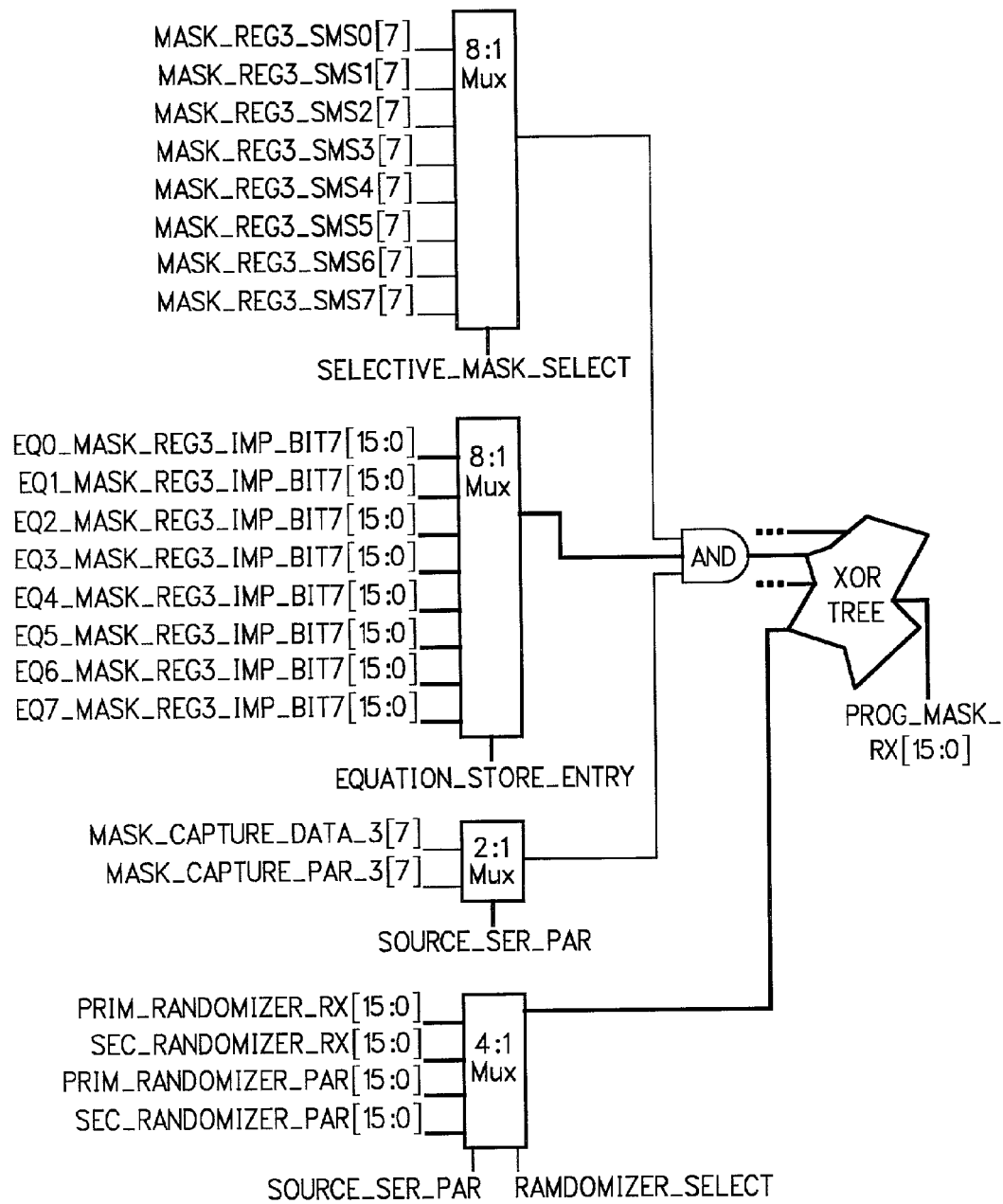
FIG. 13 is a block schematic diagram that shows programmable masking circuitry according to the invention.

To illustrate the programmable masking function, consider one of the possible 128 bits that can be masked (see FIG. 13). The use of buses in this example signify that there are parallel implementations of the logic for each of the data bits. The outputs for this bit must be sent through an exclusive-or tree to add them in with the remaining 127 mask bits and the initial randomizer value.

In this example, an XOR tree masks the 128 possible masked bits with the selected randomizer output. The system permits a sequential selective masking approach (see Table AP below). In a sequential masking approach, the output of the first masking must point to a location in memory.

The system allows the user to specify a sequence of masking steps that can be taken for a given data pattern. In other words, the primary randomizer output can be changed for bits 0–4 of one of the masking words in the first pass, and then bits 5–7 in the second pass. The masking steps are provided in the primary randomizer table entries. The custom ASIC could be developed for expansion of the ability to logic analyzer capture serial data in the event a simple change to the data framer is made.

TABLE AP

Sequential Masking Protocol

| Process Step | Action | Next Process Step Determination |
|---|---|---|
| Initial primary randomizer Read | Read the primary randomizer value from the Novel Data Framer. Mask Original primary randomizer value with SELECTIVE_MASK_STEP0 to generate an initial selective masking primary randomizer Output. This is done internal to the Novel 10K ASIC | 1) Use the Forced Masking primary randomizer Output value to index into the primary randomizer Table. 1.1) If this is a final entry, then verify the secondary randomizer value (if configured to do so). If there is a valid match, then report the input to the user. 1.2) If the entry is a Selective Masking Entry, then progress to the specified Selective Masking Level. |
| Selective Masking | Mask Original primary randomizer Pattern with the chosen Selective Masking Pattern to generate a new Selective Masking primary randomizer Output. This is done internal to the Novel 10K ASIC. | 1) Use the latest Selective Masking primary randomizer Output value to index into the primary randomizer Table. 1.1) If this is a final entry, then verify the secondary randomizer value (if configured to do so). If there is a valid match, then report the input to the user. 1.2) If the entry is a Selective Masking Entry, then progress to the specified Selective Masking Level. |

Processes Associated with the "Masking and Enabling Logic" Block

Table AQ below shows processes are used to setup the enable bits and to calculate the masking Impacts for each selected bit.

TABLE AQ

Processes Used to Setup Enable Bits

| Process/Macro Name | Process Type | Description |
|---|---|---|
| INIT_FORCED_MASK | Internal | Used to setup all of the bits that will be masked off from use in the randomizer Calculations. Requires INPUT_DATA_LENGTH, MASK_ON_CYCLE_REG, and MASK_OFF_CYCLE_REG be finalized. |
| INIT_PROG_MASK | Internal | Used to calculate the impact of all bits in each Programmable mask register that is enabled. This must be done any time a brought new equation is into the system. It should also be done on initialization, once all of the Selective Mask Registers have been initialized. |

Equation Mapper

The equation mapper takes the latest pattern in the input register, as post operated on by the masking logic, and maps it through a giant XOR gate logic tree to derive a corresponding randomizer value. On average, each randomizer output bit is made up of half the input data bits. In this case, each output is the XOR of 512 inputs. An XOR tree for 512 inputs takes a total of (256+128+64+32+16+8+4+2+1=) 511 two input XOR gates. Each mapping uses 16 bits, or a total of (16*511=) 8176 gates to produce the randomizer output. When more and more equations are used, there is significant redundancy in the logic gates making up this XOR tree.

The analysis shown in Tables AR and AS below breaks down the tree into levels. The first level operates on groups of two inputs from the input data pattern. If these inputs are referred to as A and B, there is a single XOR term possible (A XOR B), and there are two single terms that flow through to the next level: A and B. At the second level of the tree, one can view the combinations of the groups (A,B) and (C,D). There are a total of six inputs for this block at the second level (A, B, A XOR B, C, D and C XOR D). When working with the tree, each of the inputs from the A,B group can be XOR'd with each of the inputs from the C,D group. This results in a total of nine possible XOR terms at this level. The output terms from each higher level=(Output Terms from previous level $^{\wedge}2+2*$Output terms from previous level). The 2*Output terms from previous level accounts for the pass through values.

TABLE AR

Size for 1024 Equations

| Level | Inputs per Block | Output Terms from each Block | Maximum XOR Terms Per Block | Number of Blocks for 1024 Inputs | Max Output Terms limited by Equations | Max XOR Terms Per Block Limited by Equations | XOR Gates/Level (*Number of Blocks for 1024 Inputs) |
|---|---|---|---|---|---|---|---|
| 1 | 2 | 3 | 1 | 512 | 3 | 1 | 512 |
| 2 | 4 | 15 | 9 | 256 | 15 | 9 | 2304 |
| 3 | 8 | 255 | 225 | 128 | 255 | 225 | 28800 |
| 4 | 16 | 65535 | 65025 | 64 | 1024 | 1024 | 65536 |
| 5 | 32 | 4.29E9 | 4.29E9 | 32 | 1024 | 1024 | 32768 |
| 6 | 64 | 1.84E+19 | 1.84E+19 | 16 | 1024 | 1024 | 16384 |
| 7 | 128 | 3.40E+38 | 3.40E+38 | 8 | 1024 | 1024 | 8192 |
| 8 | 256 | 1.16E+77 | 1.16E+77 | 4 | 1024 | 1024 | 4096 |
| 9 | 512 | 1.34E+154 | 1.34E+154 | 2 | 1024 | 1024 | 2048 |
| 10 | 1024 | Overflow | Overflow | 1 | 1024 | 1024 | 1024 |
| Total Number of XOR Gates in Tree per Output Bit | | | | | | | 161,664 |
| Total Number of XOR Gates for Entire Tree | | | | | | | 2,586,624 |

TABLE AS

Size for 128 Equations

| Level | Inputs per Block | Output Terms from each Block | Maximum XOR Terms Per Block | Number of Blocks for 1024 Inputs | Max Output Terms limited by Equations | Max XOR Terms Per Block Limited by Equations | XOR Gates/Level (*Number of Blocks for 1024 Inputs) |
|---|---|---|---|---|---|---|---|
| 1 | 2 | 3 | 1 | 512 | 3 | 1 | 512 |
| 2 | 4 | 15 | 9 | 256 | 15 | 9 | 2304 |
| 3 | 8 | 255 | 225 | 128 | 128 | 128 | 16384 |
| 4 | 16 | 65535 | 65025 | 64 | 128 | 128 | 8192 |
| 5 | 32 | 4294967295 | 4294836225 | 32 | 128 | 128 | 4096 |
| 6 | 64 | 1.84467E+19 | 1.84467E+19 | 16 | 128 | 128 | 2048 |
| 7 | 128 | 3.40282E+38 | 3.40282E+38 | 8 | 128 | 128 | 1024 |
| 8 | 256 | 1.15792E+77 | 1.15792E+77 | 4 | 128 | 128 | 512 |
| 9 | 512 | 1.3408E+154 | 1.3408E+154 | 2 | 128 | 128 | 256 |
| 10 | 1024 | Overflow | Overflow | 1 | 128 | 128 | 128 |
| Total Number of XOR Gates in Tree per Output Bit | | | | | | | 35,456 |
| Total Number of XOR Gates for Entire Tree | | | | | | | 567,296 |

Mapper Multiplexer

The mapper multiplexer circuitry must take equation mapper outputs and select the appropriate randomizer bit pattern for the equation that is being used. The size of the mapper multiplexer is dependent upon the number of equations being used. The register sown in Table AT below is used to signify the mapping that is to be selected.

TABLE AT

Internal Register to Select the equation Mapping

| Name | Size | Notes |
|---|---|---|
| EQUATION_MAP_SELECT | 10 Bits | This register is written by the system to choose the equation mapping pattern to be used. |

The mapper multiplexer size can be calculated using the formula that a multiplexer tree for $2^n$ bits contains $2^n-1$ 2:1 multiplexers. Table AU below shows the number of multiplexers that are needed as a function of the number of equations that are implemented.

TABLE AU

Calculation of 2:1 Multiplexers needed as a function of Equations

| Number of Equations | Multiplexers per randomizer Bit | Total 2:1 Multiplexers Required |
|---|---|---|
| 128 | 127 | 2032 |
| 256 | 255 | 4080 |
| 512 | 511 | 8176 |
| 1024 | 1023 | 16368 |

The output of the equation multiplexer corresponds to the calculated randomizer value for the selected equation, and it is used to drive the mapper storage control block.

TABLE AV

Internal Signal name for the equation Multiplexer Output

| Name | Size | Notes |
|---|---|---|
| CALC_RANDOMIZER_VALUE | 16 Bits | This output is the calculated randomizer value for the selected equation. |

Mapper Storage Control and Storage State Machine

The mapper storage control and storage state machine handles storing and retrieving randomizer values and associated table information. When new inputs are provided, the system must calculate and store randomizer values for all equations of interest. When the system receives a randomizer value from the data framer, it must access these tables to identify the proper input.

Primary Randomizer Output Vectors

The output of the primary randomizer is a 16-bit number that maps to an input. For instance, if Input #5356 produces a value of 24593 in the primary randomizer, then whenever the primary randomizer value of 24593 is received, the system returns input #5356. Tables AW and AX below show how inputs map when randomized by different equations (A, B, C, . . . n).

TABLE AW

Primary randomizer mapping Table

| Input # | Primary randomizer A Output | Primary randomizer B Output | Primary randomizer C Output | . . . | Primary randomizer "n" Output |
|---|---|---|---|---|---|
| 1 | 1A | 1B | 1C | | 1n |
| 2 | 2A | 2B | 2C | | 2n |
| 3 | 3A | 3B | 3C | | 3n |
| 4 | 4A | 4B | 4C | | 4n |
| 5 | 5A | 5B | 5C | | 5n |
| 6 | 6A | 6B | 6C | | 6n |
| 7 | 7A | 7B | 7C | | 7n |
| . | | | | | |
| . | | | | | |
| 10,000 | 10000A | 10000B | 10000C | | 10000n |

TABLE AX

Primary randomizer Decoder Table

| Output Vector | Primary randomizer A Map | Primary randomizer B Map | . . . | Primary randomizer "n" Map |
|---|---|---|---|---|
| 0 | 5356A | x | | 4678n |
| | x | x | | 8888n |
| | x | x | | 589n |
| | x | x | | 6688n |
| 1 | 234A | 3256B | | x |
| | 3678A | x | | x |
| | x | x | | x |
| | x | x | | x |
| 2 | x | 7890B | | x |
| | x | 576B | | x |
| | x | x | | x |
| | x | x | | x |
| 3 | 9735A | x | | 2222n |
| | 121A | x | | x |
| | 5678A | x | | x |
| | x | x | | x |
| . | | | | |
| . | | | | |
| 65,535 | 7764A | 125B | | x |
| | x | 987B | | x |
| | x | x | | x |
| | x | x | | x |

In the above Table AX, there are six example locations with no inputs that map into a specific state: A map 2, B map 0, B map 3, n map 1, n map 2, and n map 65535. There are four example locations with one input that maps to a specific state: A map 0, A map 65535, B map 1, and n map 3. There are three locations with two inputs that map to a specific state: A map 1, B map 2, and B map 65535. There is one location where three inputs map into a specific state: A map 3. There is one location where four inputs map into a specific state: n map 0.

The example in the above Table AX has a much higher rate of one, two, three, or four inputs being mapped into a specific state than would be found in an actual implementation. This has been done for illustrative purposes only.

Primary Randomizer Table Entries

This discussion describes all of the entries in the primary randomizer table for the various possibilities of: no match, single match, pair match, triple match, quadruple match, overflow and masking (see Tables AY, AZ, and BA below).

TABLE AY primary randomizer Decoder Table Entry

| OFFSET | BIT 15 | BIT 14 | BIT 13 | BIT 12 | BIT 11 | BIT 10 | BIT 9 | BIT 8 | BIT 7 | BIT 6 | BIT 5 | BIT 4 | BIT 3 | BIT 2 | BIT 1 | BIT 0 |
|---|---|---|---|---|---|---|---|---|---|---|---|---|---|---|---|---|
| 0 | STAT1 | STAT0 | Input Number | | | | | | | | | | | | | |
| 1 | secondary randomizer Value | | | | | | | | | | | | | | | |

STAT Bits
- 00 There is not a valid input that matches this value.
- 01 There is one valid match for this input, and it's secondary Randomization pattern is contained in bits 0–13.
- 10 There are two valid matches for this input, and they are stored in the Multiple Location found in bits 0–9.
- 11 There are three (or more) valid matches for this input, and they are stored in the Multiple location found in bits 0–9.

TABLE AZ primary randomizer Decoder Table Entry for No Match

| OFFSET | BIT 15 | BIT 14 | BIT 13 | BIT 12 | BIT 11 | BIT 10 | BIT 9 | BIT 8 | BIT 7 | BIT 6 | BIT 5 | BIT 4 | BIT 3 | BIT 2 | BIT 1 | BIT 0 |
|---|---|---|---|---|---|---|---|---|---|---|---|---|---|---|---|---|
| 0 | 0 | 0 | XXX | | | | | | | | | | | | | |
| 1 | XXX | | | | | | | | | | | | | | | |

TABLE BA primary randomizer Decoder Table Entry for Single Match

| OFFSET | BIT 15 | BIT 14 | BIT 13 | BIT 12 | BIT 11 | BIT 10 | BIT 9 | BIT 8 | BIT 7 | BIT 6 | BIT 5 | BIT 4 | BIT 3 | BIT 2 | BIT 1 | BIT 0 |
|---|---|---|---|---|---|---|---|---|---|---|---|---|---|---|---|---|
| 0 | 0 | 1 | Input Number | | | | | | | | | | | | | |
| 1 | secondary randomizer Number | | | | | | | | | | | | | | | |

The determination as to where to check the secondary randomization pattern is left to a later time. This is due to the fact that the user could chose to ignore the secondary randomization pattern. Of special interest is the case where a single match occurs that is a masking value and not a final input value. This case is handled in the Triple/Overflow/Mask case, where there are sufficient bits to encode the situation. In many ways, the MASK situation can be viewed as a multiple input situation (see Table BB below).

TABLE BB

Primary randomizer Decoder Table Entry for Pair Match

| OFFSET | BIT 15 | BIT 14 | BIT 13 | BIT 12 | BIT 11 | BIT 10 | BIT 9 | BIT 8 | BIT 7 | BIT 6 | BIT 5 | BIT 4 | BIT 3 | BIT 2 | BIT 1 | BIT 0 |
|---|---|---|---|---|---|---|---|---|---|---|---|---|---|---|---|---|
| 0 | 1 | 0 | XXX | | | | Multiple Match Table Entry | | | | | | | | | |
| 1 | XXX | | | | | | | | | | | | | | | |

The Multiple Match Table Entry points to one of 1024 multiple match table entries (see Table BG below).

TABLE BC

Primary randomizer Decoder Table Entry for Triple Match

| OFFSET | BIT 15 | BIT 14 | BIT 13 | BIT 12 | BIT 11 | BIT 10 | BIT 9 | BIT 8 | BIT 7 | BIT 6 | BIT 5 | BIT 4 | BIT 3 | BIT 2 | BIT 1 | BIT 0 |
|---|---|---|---|---|---|---|---|---|---|---|---|---|---|---|---|---|
| 0 | 1 | 1 | 0 | 0 | XXX | | Multiple Match Table Entry | | | | | | | | | |
| 1 | XXX | | | | | | | | | | | | | | | |

The Multiple Match Table Entry points to one of 1024 multiple match table entries (see Table BG below).

TABLE BD

Primary randomizer Decoder Table Entry for quadruple Match

| OFFSET | BIT 15 | BIT 14 | BIT 13 | BIT 12 | BIT 11 | BIT 10 | BIT 9 | BIT 8 | BIT 7 | BIT 6 | BIT 5 | BIT 4 | BIT 3 | BIT 2 | BIT 1 | BIT 0 |
|---|---|---|---|---|---|---|---|---|---|---|---|---|---|---|---|---|
| 0 | 1 | 1 | 0 | 1 | XXX | | Multiple Match Table Entry | | | | | | | | | |
| 1 | XXX | | | | | | | | | | | | | | | |

The Multiple Match Table Entry points to one of 1024 multiple match table entries (see Table BG below).

TABLE BE

Primary randomizer Decoder Table Entry for Overflows

| OFFSET | BIT 15 | BIT 14 | BIT 13 | BIT 12 | BIT 11 | BIT 10 | BIT 9 | BIT 8 | BIT 7 | BIT 6 | BIT 5 | BIT 4 | BIT 3 | BIT 2 | BIT 1 | BIT 0 |
|---|---|---|---|---|---|---|---|---|---|---|---|---|---|---|---|---|
| 0 | 1 | 1 | 1 | 0 | #Over | | Multiple Match Table Entry | | | | | | | | | |
| 1 | XXX | | | | | | | | | | | | | | | |

The multiple match table entry points into the multiple match table, with the exception that the table format changes so that only the input numbers are stored and not the secondary randomizer numbers. This allows up to eight inputs to be stored. Because an overflow table entry evolves from a quadruple table entry, one does not move the four inputs that were previously stored, but the new inputs overwrite the existing secondary randomizer values in the structure.

The number of overflows(#Over) value specifies how many inputs are stored in what is normally the secondary randomizer section of the multiple match table entry structure. If there is a single overflow, this value is '01'. If there are two overflows this value is '10', if there are three overflows this value is '11', and if there are four overflows this value is '00' (see Table BF below).

Multiple Match Table

The custom ASIC uses a 1024 entry multiple match table (see Table BG below) to handle the cases where two, three, four, or the overflow case of (5–8) input vectors map to the same primary randomizer output. For each possible pair, there are two possible inputs and associated secondary randomizer values that need to be stored. For each possible triple, there are three possible inputs and associated secondary randomizer values that need to be stored. For each possible quadruple, there are four possible inputs and associated secondary randomizer values that need to be stored. In cases of 5–8 inputs which are signified as being overflow cases, the secondary randomizer values are dropped.

The primary randomizer table entry dictates the inputs and secondary randomizer values in the multiple match table entry that are valid.

TABLE BF

Primary randomizer Decoder Table Entry for Masking

| OFFSET | BIT 15 | BIT 14 | BIT 13 | BIT 12 | BIT 11 | BIT 10 | BIT 9 | BIT 8 | BIT 7 | BIT 6 | BIT 5 | BIT 4 | BIT 3 | BIT 2 | BIT 1 | BIT 0 |
|---|---|---|---|---|---|---|---|---|---|---|---|---|---|---|---|---|
| 0 | 1 | 1 | 1 | 1 | XXX | | | | | | Next Mask Step | | | | | |
| 1 | secondary randomizer Value | | | | | | | | | | | | | | | |

TABLE BG

Multiple Match Table Entry

| OFFSET | B15 | B14 | B13 | B12 | B11 | B10 | B9 | B8 | B7 | B6 | B5 | B4 | B3 | B2 | B1 | B0 | |
|---|---|---|---|---|---|---|---|---|---|---|---|---|---|---|---|---|---|
| 0 | First Value secondary randomizer Output | | | | | | | | | | | | | | | | |
| 1 | Second Value secondary randomizer Output | | | | | | | | | | | | | | | | |
| 2 | Third Value secondary randomizer Output | | | | | | | | | | | | | | | | |
| 3 | Fourth Value secondary randomizer Output | | | | | | | | | | | | | | | | |
| 4 | 0 | X | | First Value Input Pointer (Final Value) | | | | | | | | | | | | | |
|   | 1 | XXX | | | | | | | | | | | | | | | First Value Next Mask Step |
| 5 | 0 | X | | | | Second Value Input Pointer (Final Value) | | | | | | | | | | | |
|   | 1 | XXX | | | | | | | | | | | | | | | Sec Value Next Mask Step |
| 6 | 0 | X | | | | Third Value Input Pointer (Final Value) | | | | | | | | | | | |
|   | 1 | XXX | | | | | | | | | | | | | | | Th Value Next Mask Step |
| 7 | 0 | X | | | | Fourth Value Input Pointer (Final Value) | | | | | | | | | | | |
|   | 1 | XXX | | | | | | | | | | | | | | | Fth Value Next Mask Step |

Multiple Match Table Valid Entries

The VALID_MULT_ARRAY (see Table BH below) stores information as to which multiple match table entries have been used by a particular mapping. There are 1024 multiple match table entries associated with each mapping, and the VALID_MULT_ARRAY is therefore 1024/16=64 values long to identify where there are open multiple entries. In addition, a second step of having four 16-bit values to signify where there are available entries that are used. One could conceivably use a pointer or pair of pointers in the ASIC to keep track of the next available inputs.

TABLE BH

Valid Multiple Match Entry Array Table

| Offset | 16 Bit Value Description | Comments |
|---|---|---|
| 0 | First Block of Valid Multiple Entry Tags (0–15) | 0=Unused Table Entry Bit 0=Multiple Entry 0 |
| 1 | Second Block of Valid Multiple Entry Tags (16–31) | 0=Unused Table Entry Bit 0=Multiple Entry 0 |
| 63 | Sixty Fourth Block of Valid Multiple Entry Tags) (1007–1023) | 0=Unused Table Entry Bit 0=Multiple Entry 0 |
| 64 | Super Block Descriptor for Blocks (0–15) | 0=Unused Table Entry in Block |
| 65 | Super Block Descriptor for Blocks (16–31) | " |
| 66 | Super Block Descriptor for Blocks (32–47) | " |
| 67 | Super Block Descriptor for Blocks (48–63) | " |

Storage Required for Each Equation

Table BI below shows the memory storage required for each mapping that is stored.

TABLE BI

Storage Associated with Each primary Mapping

| Offset | Block | Length | Comments |
|---|---|---|---|
| 0 | primary randomizer Decoder Table | 131072 | Two 16 Bit words per primary randomizer State. |
| 131072 | Multiple Match Table | 8192 | Eight 16 Bit words per Multiple Match Table Entry |
| 139264 | Valid Pair Array Table | 68 | Identifies entries in the Multiple Match Table that are used. |
| 139332 | | | mapping End |

Registers Used in Storing and Reading a New Randomizer Entry

Table BJ below lists the registers used to access and modify the randomizer table. The output of the mapper is the CALC_RANDOMIZER_VALUE. The selection of the equation mapper uses the EQUATION_MAP_SELECT register. The storage value is EQUATION_STORE_ENTRY which dictates where the value is stored in the primary randomizer table. In the case of storing a new value into the randomizer table, the INPUT_DATA_NUMBER is the output of a multiplexer that selects between the USER_INPUT_DATA_NUMBER and the SYS_INPUT_DATA_NUMBER and it contains the input number for the value while the PRESENT_MASK_STEP and NEXT_MASK_STEP store the necessary masking information.

When interpreting a randomizer value from the data framer, the RANDOMIZER_SELECT value is used to determine whether to analyze the primary or secondary randomizer values. The PRIM_RANDOMIZER_RX register contains the primary randomizer value, and the SEC_RANDOMIZER_RX register contains the secondary randomizer value. The PROG_MASK_RX signal is the masked value of the received primary or secondary randomizer signal (see Table BJ below).

TABLE BJ

Randomizer Control Registers

| NAME | SIZE | COMMENTS |
|---|---|---|
| PRIM_RAND_TABLE_BASE | 32 Bits | Located on Fire-Hose 10K ASIC. User Read/Writeable. This is the base address in SRAM of the primary randomizer Table. It is variable to permit the user the set it up at any location in memory. |
| PRIM_RAND_LENGTH | 32 Bits | Located on Fire-Hose 10K ASIC. User Readable. This is the length in bytes of a primary randomizer Table for a single equation |
| PRIM_RAND_LOCATION | 32 Bits | Located on Fire-Hose 10K ASIC. This register stores the location in the primary randomizer table that is being addressed by the primary randomizer Value |
| PRIM_RAND_ENTRY | 16 Bits | The value that is stored in a primary randomizer Location. |
| MULT_TABLE_OFFSET | 32 Bits | The Offset from the base primary randomizer Table Entry for the Multiple Entry Table. This is a fixed constant. |
| MULT_VALID_OFFSET | 32 Bits | The Offset from the base primary randomizer Table Entry for the Multiple Entry Valid Table. This is a fixed constant. |
| TEMP_POINTER0 | 32 Bits | This pointer is used as a second pointer for creating new inputs in the primary Randomization Table. |
| TEMP_POINTER1 | 32 Bits | This pointer is used as a third pointer for creating new inputs in the primary Randomization Table |
| TEMP_VALUE0 | 16 Bits | This register is used as a temporary 16 bit storage for SRAM reads. |
| TEMP_VALUE1 | 16 Bits | This register is used as a temporary 16 bit storage for SRAM reads. |
| TEMP_ENCODE0 | 5 Bits | This is an encoded value showing the lowest unused position in a 16 bit word. The $5^{th}$ bit is used to signify that there are none available. |
| TEMP_ENCODE1 | 5 Bits | This is an encoded value showing the lowest unused position in a 16 bit word. The $5^{th}$ bit is used to signify that there are none available. |
| TEMP_COUNT | 16 Bits | This is a temporary counter used to help walk through the Multiple Tables. |

Registers Associated with Initializing all Randomizer Mappings

The following registers are associated with clearing out a randomizer table and with clearing out the multiple table entries for any equation. Due to the fact that the system may be dynamically clearing out an equation entry in the middle of updating new equations, it is important that there be independent registers to point into the SRAM for the initialization process (see Table BK below).

TABLE BK

Randomizer Initialization Registers

| NAME | SIZE | COMMENTS |
|---|---|---|
| RAND_INIT_VALUE | 16 Bits | This is the value that will be stored into memory for the randomizer table during initialization. |
| RAND_INIT_ADDRESS | 32 Bits | This is the present address in the randomizer table that initialization values are being stored into. |
| RAND_INIT_COUNT | 16 Bits | This is a counter variable used in clearing out a randomizer Table Value. |
| RAND_INIT_EQ | 8 Bits | This is used to maintain the equation number of a randomizer Table that is being cleared. |

Processes for Randomizer Table Manipulations

There are a number of independent operations to manipulate the primary randomizer tables. These involve initialization, storage and retrieval of data (see Table BK below).

TABLE BK

Processes for randomizer Table Manipulations

| Process Name | Type | Description |
|---|---|---|
| RAND_INIT | Internal | Used to Initialize and clear out a randomizer Table for one specific equation. |
| PRAND_ADD_ENTRY | Internal | Adds a randomizer Table Entry for a single equation and mapping. |
| GET_NEW_MULT_ENTRY | Internal | Used to find and tag the next available Multiple Table Entry for the specific equation that is being operated on. |
| PRAND_SUB_ENTRY | Internal | Subtracts an input value from the primary randomizer Table for a single equation and mapping. |
| CLEAR_MULT_ENTRY | Internal | Used to free up a Multiple Table Entry location. |
| IDENTIFY_MULT_INPUT | Internal | Used to identify the position in a Multiple Table Entry where the specific input or mask step is located. |

Mapper Engine, Statistics and Equation State Machine

The purpose of the mapper engine, statistics, and equation state machine is to cycle through the various equation mappings for new inputs, maintain statistics for each equation mapping, select the appropriate equations to use, and initiate swapping out equations that do not produce appropriate mappings. This block has a state machine that operates on inputs across all equations. It implements counters in hardware to maintain statistics for each equation.

Primary Randomizer Equation Analysis

The system maintains data for a total window of eight primary randomizer equations on-chip. The system selects between these eight mappings to pick the best one using a variety of characteristics. Each of these equations have counters associated with the number of triples, quadruples, or overflow values that they contain. Based upon programmable criteria (values written into registers), the user can decide how often an equation is deemed to be non-usable and a search is initiated for a replacement. This directly affects power consumption because any time a search for a better equation is done, there are a large number of accesses to DRAM. On the flip side of the equation, when the equation set is static, there is extremely low power consumption from the custom ASIC.

Equation Status Counters

The following set of counters (Table BL below) is maintained for each equation on the custom ASIC. The output of these registers is used to determine the best equation for use, and whether certain equations need to be switched out.

TABLE BL

Equation Status Counters/Registers

| Register Name | Bits | Description |
|---|---|---|
| EQ0_TRIPS | 8 | Counts the number of triples for equation 0 A value of 255 disables the equation from use. |
| EQ0_QUADS | 6 | Counts the number of quadruples for equation 0 A value of 63 disables the equation from use. |
| EQ0_MULTS | 10 | Counts the number of Multiple Entries for equation 0 A value of 1023 disables the equation from use. |
| EQ0_OVERFLOW | 2 | Counts the number of Overflow Entries for equation 0. A value of 3 disables the equation from use. |
| EQ0_COMPLETE | 1 | Register bit to indicate whether the equation is complete in terms of implementing all inputs. |
| . | . | . |
| . | . | . |
| . | . | . |
| EQ7_TRIPS | 8 | Counts the number of triples for equation 7 |
| EQ7_QUADS | 5 | Counts the number of quadruples for equation 7 A value of 32 disables the equation from use. |
| EQ7_MULTS | 10 | Counts the number of Multiple Entries for equation 7 A value of 1023 disables the equation from use. |
| EQ7_OVERFLOW | 2 | Counts the number of Overflow Entries for equation 7. A value of 3 disables the equation from use. |
| EQ7_COMPLETE | 1 | Register bit to indicate whether the equation is complete in terms of implementing all inputs. |

The following error conditions are serious for a specific equation, and must be handled quickly by the custom ASIC:

The number of Overflow Entries (EQn_OVERFLOW) exceeds 0

The number of Multiple Entries (EQn_MULTS) exceeds 1024

In the worst case, a serious error results in an incoming packet not being identified by the custom ASIC. Any of the errors listed above would result in a vector not being found in the primary mapping table. A large majority of packets, i.e. 9999/10000, would still continue to be received as expected, and quickly, the chip would change the primary mapping equation to handle the serious fault.

Optimal Primary Equation Selection

The issues associated with picking the optimal primary equation are numerous. The greater the number of multiple entries, the longer the average lookup time is for the equation and the greater the probability that the multiple table entries is exceeded. The number of quadruples is an early indicator of possible problems because a quadruple is a single new input vector away from creating a serious error condition. Any equation that has reached an overflow condition for must be eliminated out of hand if possible. If no equation meets these criteria, then it is critical that the least offensive of the remaining equations be used. It is also critical that only equation mappings that contain all inputs be considered in this evaluation. This is necessary because there are times when equations are swapped out, and new ones are evaluated.

The following equation shows how the EQm_DISABLE bit is calculated. This bit is necessary to be able to shut down the use of equations that are inappropriate. The thresholds for quadruples and triples have been set to very high levels that have an extremely low probability of occurrence in real life, and that pose a added burden to the receiver should they be used.

EQm_DISABLE=(EQm_OVERFLOW==3)||

(EQm_MULTS==1023)||

(EQm_QUADS==63)||(EQm_TRIPS==255))

The equation optimization comparator input word for each of the eight possible equations has been designed so that the best equation is the one with the lowest word. This way, the eight equation optimization comparator input words can be sent through a 4->2->1 tree of 2:1 comparators to determine the optimal equation. In looking at the word, the highest priority for disqualification occurs when the equation table is incomplete. The second highest priority is that the equation has been disabled due to either overflow conditions or an excessive number of quadruple or triple matches. Next, the number of overflow conditions is used, which it is hoped is zero. The number of multiple inputs comes next in the priority structure, followed by the number of quadruples and triples in that order.

The equation optimization comparator produces the OPTIMAL_EQUATION output that signifies the best equation mapping at the present time (see Table BM).

TABLE BM

Equation Optimization Comparator Inputs
(equation 0 Example)

| Word Section | MSB | | | | | LSB |
|---|---|---|---|---|---|---|
| EQm_INPUT | EQm_INCOMPLETE | EQm_DISABLE | EQm_OVERFLOW | EQm_MULTS | EQm_QUADS | EQm_TRIPS |

The system identifies equations that are not usable, i.e. EQm_DISABLE==1, and determines when they reach a threshold programmed by the user (EQ_UPDATE_THRESH). When this threshold is reached, the system sets the EQm_INCOMPLETE bit for each disabled equation, clears out the disabled equations, and then updates the disabled equation (see Table BN below). This decision process also relies on equation aging which is described below.

TABLE BN

Registers associated with Updating Equations

| Address | Register Name | Bits | Notes |
|---|---|---|---|
| 0xA0 | EQ_UPDATE_THRESH | 3 | When this threshold is reached, the system will update all equations that have been disabled |
| | OPTIMAL_EQUATION | 3 | This is the output of the equation Optimization Comparator, and tells which of the equations is the best. |
| | SECOND_BEST_EQUATION | 3 | This is an output of the equation Optimization Comparator, and tells which of the equations is the second best. |
| | EQ_INPUT_COUNT | 16 | Used to count through the inputs when updating a set of equations |
| | EQ_POINTER | 3 | Points to the equation being operated on presently. |
| | PRIM_RAND_VALUE | 16 | primary randomizer value that is a latched value of the CALC_RANDOMIZER_VALUE |
| | SEC_RAND_VALUE | 16 | secondary randomizer value that is a latched value of the CALC_RANDOMIZER_VALUE |

Method to Track Mappings to Equation Values

There are eight different primary equation mappings that are used at any time by the custom ASIC. These equations map to one of 128 equations that are implemented in the mapper, which in turn map to one of the 32768 possible feedback paths for the randomizers. Actually, the important thing is that one stores a secondary mapping with each table for reference, and a way to determine whether there are duplicates. Storing whether a secondary mapping produced a duplicate would require a new bit. Primary and secondary randomizer values must be stored in the equation map for use because it is necessary to have their mask impact bits available on custom ASIC. Therefore, one needs to make sure that recently used primary and secondary randomizer equations are available.

Table BO below lists the registers associated with storing the mapping information. These values can be directly applied to the mapper multiplexer to determine the value. The system has 128 possible mappings, and uses a total of eight equations that each correspond to one of the mappings. Any time that an equation is found to be bad, a value of eight is added to the equation number. This guarantees that one will never have two equations that map to the same value. At any given time, one should use the best available mapping as the secondary randomizer equation value for new equations. The odds of this equation going bad is significantly less than other equations in the table, and the problem of being forced to keep it around has similarly less impact.

When a user is using the data framer, it is presumed that there is a time critical nature to the analysis of data packets. For this reason, it is possible to use a set of timers for each equation to indicate how long ago the equation was used in a data framer. These timers are a maximum of one second in length, and once one second has expired, the equation is considered as having been aged out. In the future, it may be valuable to permit a programmably variable shorter time to indicate that an equation has been aged out.

The equation aging registers are clocked at a 4 msec rate. When new primary and new secondary randomizer equations are written into the data framer, their equation aging registers are set to 0. The primary and secondary randomizer equations that are used for the data framer are be the ones used for parallel classification. All other equation aging registers are permitted to count upward. When an equation aging register counts up to a value of 255, it stops to signify that the counter has aged out (see Table BP below).

TABLE BP

Registers Associated with equation Aging

| Register Name | Bits | Notes |
|---|---|---|
| EQ0_AGING | 8 | 8 bits of counter, and the MSB bit shows that the equation has aged out. |
| EQ1_AGING | 8 | 8 bits of counter, and the MSB bit shows that the equation has aged out. |
| . | . | . |
| . | . | . |
| . | . | . |

TABLE BO

Registers that Store the Relation between mapper values and Equations

| Register Name | Bits | Notes |
|---|---|---|
| EQ0_PRIM_MAP | 8 | Value of 0–127 corresponding to the primary randomizer mapping used for equation 0. |
| EQ0_SEC_EQ_NUM | 4 | Identifies which of the 8 primary map Equations is being used as the secondary randomizer equation for equation 0. The MSB signifies that the equation is no longer valid when it is set to a 1. |
| EQ1_PRIM_MAP | 8 | Value of 0–127 corresponding to the primary randomizer mapping used for equation 0. |
| EQ1_SEC_EQ_NUM | 4 | Identifies which of the 8 primary map Equations is being used as the secondary randomizer equation for equation 1. The MSB signifies that the equation is no longer valid when it is set to a 1. |
| . | . | . |
| . | . | . |
| . | . | . |
| EQ7_PRIM_MAP | 8 | Value of 0–127 corresponding to the primary randomizer mapping used for equation 7. |
| EQ7_SEC_EQ_NUM | 4 | Identifies which of the 8 primary map Equations is being used as the secondary randomizer equation for equation 7. The MSB signifies that the equation is no longer valid when it is set to a 1. |

Maintenance of Equation Mappings

It is critical to maintain primary randomizer equation mappings that have been sent to the data framer for a reasonable time period. This is necessary to avoid a problem where an equation is swapped out and a value is read from the data framer that has no corresponding table for evaluation. In the case of parallel modes of operation, it is possible to use any of the equations and this is not a problem.

TABLE BP-continued

Registers Associated with equation Aging

| Register Name | Bits | Notes |
|---|---|---|
| EQ7_AGING | 8 | 8 bits of counter, and the MSB bit shows that the equation has aged out. |

Processes Used for Mapping Analysis

There are a number of processes associated with initializing and maintaining information regarding the equations used by the system (see Table BQ below).

TABLE BQ

Processes used for mapping Analysis

| Process/Macro Name | Type | Description |
| --- | --- | --- |
| INITIALIZE_ONE_EQ | Internal | Initializes the mapping and Statistics registers used for a single equation |
| INITIALIZE_ALL_EQ | Internal | Initializes all of the equations being used in the system. |
| ADD_INPUT_ALL_EQ | Internal | Handles mapping and storing an input for all sets of equations. |
| SUB_INPUT_ALL_EQ | Internal | Handles mapping and removing an input for all sets of equations. |
| UPDATE_DISABLED_EQS | Internal | This process is used to update equations that are no longer valid. It is not called until a certain programmable threshold of equations are disabled. |

Time Accelerator Block

Figure 16:
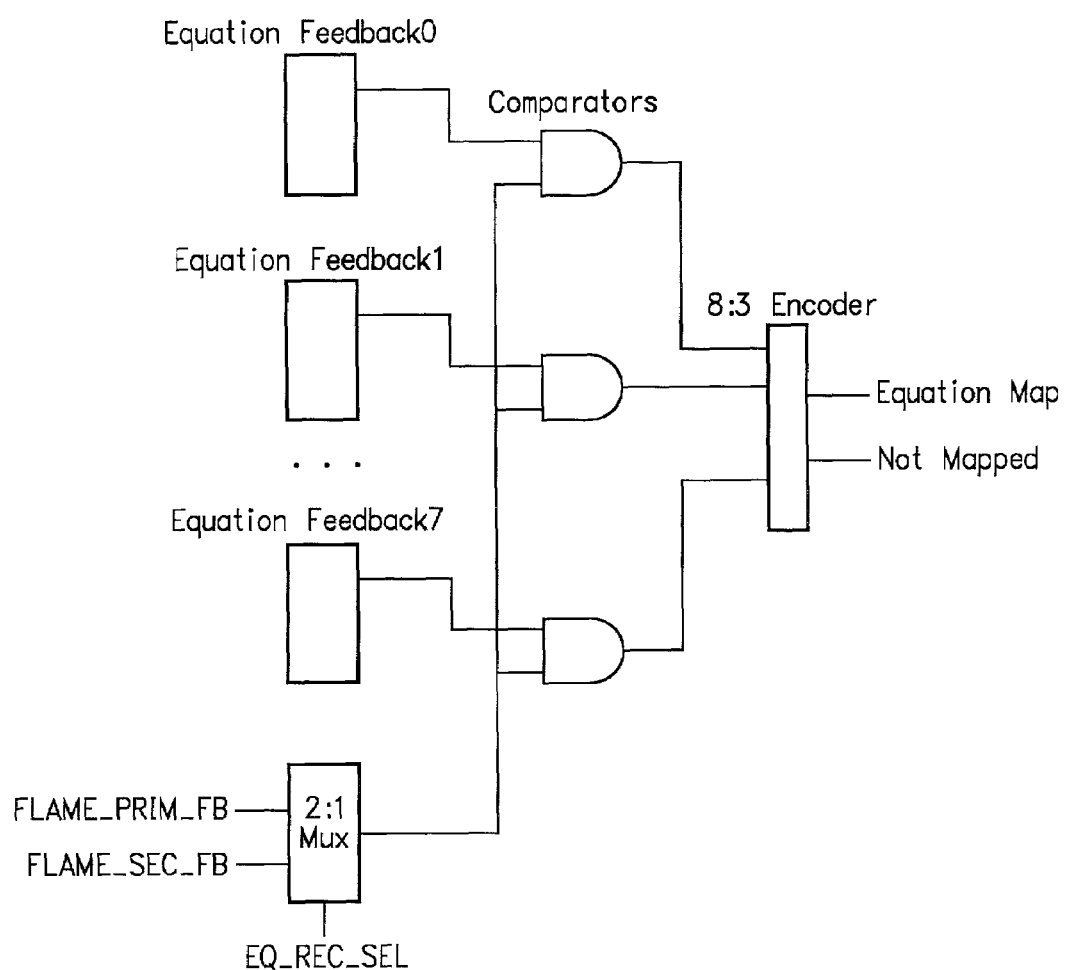
FIG. 16 is a block schematic diagram that shows recovery of an equation number from feedback values according to the invention.

The purpose of the time accelerator block is to advance a received randomizer value through "n" cycles of time in a single hardware cycle on the custom ASIC. The custom ASIC is running at extremely high speeds, and it is desirable to shut down the randomizers whenever possible to avoid power consumption. The calculated randomizer values in the custom ASIC are based upon a 1024-bit input word being used for the calculations, with all 1024 input bits being shifted into the randomizer. The custom ASIC has been structured such that bits occurring after the user selected data length are set to zero in the calculation (see FIG. 16). Therefore, to produce an equivalent result the data framer would be required to clock in the equivalent number of trailing zeros to it's randomizer. This clocking of trailing zeros could result in significant power consumption, and would result in additional latency between the reception of the packet header and identification of the matching input.

To solve this problem, the time accelerator block has been added to the custom ASIC. This block is able to take a randomizer value and shift it forward by the equivalent of "n" cycles of zero clocked input data all within a single cycle. The theory behind this time acceleration revolves around the fact that any shift of "n" cycles can be viewed as a remapping of the initial state of the randomizer stage values (qinit0, qinit1, . . . qinit15). To shift forward by a specific time of "n" cycles requires a specific remapping of the initial values to the final values. To accomplish a variable shift of any chosen value of "n" cycles, the novel custom ASIC implements a binary weighted programmable shifter. To accomplish a variable shift of from 1 to 1024 bits in length, the system implements a 512-bit shifter, a 256-bit shifter, a 128-bit shifter, a 64-bit shifter, a 32-bit shifter, a 16 bit -shifter, an 8-bit shifter, a 4-bit shifter, a 2-bit shifter, and a 1-bit shifter. Based on the selected shift value "n", each of these fixed shifter stages is either switched into the data path or bypassed. Each shifter stage relies entirely on its own inputs to produce a direct mapping to its own outputs. There is no interaction between groups of stages other than the fact that the individual stages are producing a one-to-one mapping of inputs to outputs. To simplify this block, and the time associated with making calculations, the time accelerator may be modified to advance in 32-bit increments only. This would permit 512-bit shifts, 256-bit shifts, 128-bit shifts, 64-bit shifts, and 32-bit shifts only, but does nothing to affect the theory of operation for this block.

Time Accelerator Register

The TIME_ACC_CYCLE is used to setup the number of cycles of acceleration to be applied to a received randomizer value. The source of the time accelerator block is chosen by the RANDOMIZER_SELECT value that chooses between the primary and secondary randomizer values that have been received. The equation that is being used in the analysis of the randomizer is critical for determining the mapping, and it is stored in the EQUATION_STORE_ENTRY register (see Table BR below).

TABLE BR

Registers associated with Time Acceleration

| Register Name | Bits | Notes |
| --- | --- | --- |
| TIME_ACC_CYCLE | 10 | Value of 0 to 1023 that contains the number of cycles that the primary and secondary randomizers need to be advanced through under the condition of having a zero input. |

Time Accelerator Logic Stage

Figure 14:
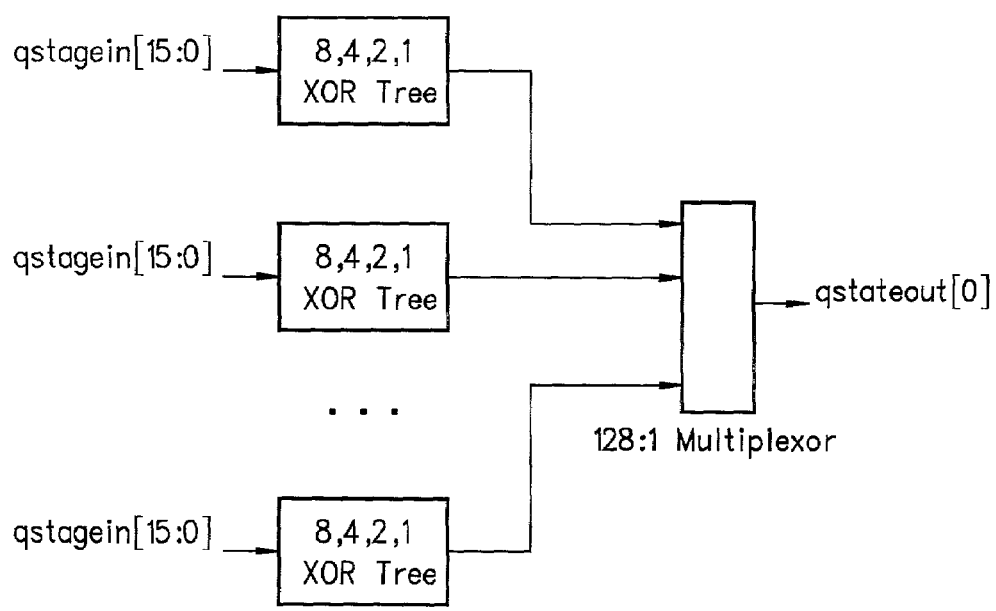
FIG. 14 is a block schematic diagram that shows an example of qstateout[0] generation for an individual stage for the MEGA XOR approach according to the invention.

The preferred implementation of one of the time accelerator stages using a large number of XOR gates and a smaller number of multiplexers (see FIG. 14). The input to the stage is qstagein[15:0] which can be either the output of a previous stage, or an actual randomizer value. The stage consists of 128 mappings of qstagein[15:0] to qstageout[15:0] to handle each of the possible equation mappings. Each of the bits in qstageout[15:0] is a function of qstagein[15:0], and can be implemented with an XOR tree of all of the applicable bits. For instance, qstageout[0] may be qstagein[0]+qstagein[3]+qstagein[7]+qstagein[1] which can be implemented with XOR gates. Each of the possible outputs is a function of qstagein[n], and uses half of the inputs on average. Once the outputs for all 128 equations have been calculated, a 128:1 multiplexer chooses the correct output for the equation being considered.

The example above shows how an individual bit in the output is calculated. This is multiplied by sixteen to handle each output bit in the remapping situation. The benefit of this approach is that the XOR trees for all of the equations, and for all of the output bits are shared. There is a limit to how many XOR gates can be used when there are a total of only sixteen inputs.

TABLE BS

Size for 16 Bits

| Level | Inputs per Block | Output Terms from each Block | Maximum XOR Terms Per Block | Number of Blocks for 16 Inputs | Max Output Terms limited by Equations | Max XOR Terms Per Block Limited by Equations | XOR Gates/Level (*Number of Blocks for 16 Inputs) |
|---|---|---|---|---|---|---|---|
| 1 | 2 | 3 | 1 | 8 | 3 | 1 | 8 |
| 2 | 4 | 15 | 9 | 4 | 15 | 9 | 36 |
| 3 | 8 | 255 | 225 | 2 | 128 | 128 | 256 |
| 4 | 16 | 65535 | 65025 | 1 | 128 | 128 | 128 |
| Maximum Total XOR Gates Per Stage | | | | | | | 428 |

This approach uses a maximum of 428 XOR gates in it's implementation for the entire stage, and it uses only 16×128:1 multiplexers which each contain 127 2:1 multiplexers. This is a total of 2,460 gates per timing accelerator stage.

Overall Timing Accelerator Architecture

Figure 15:
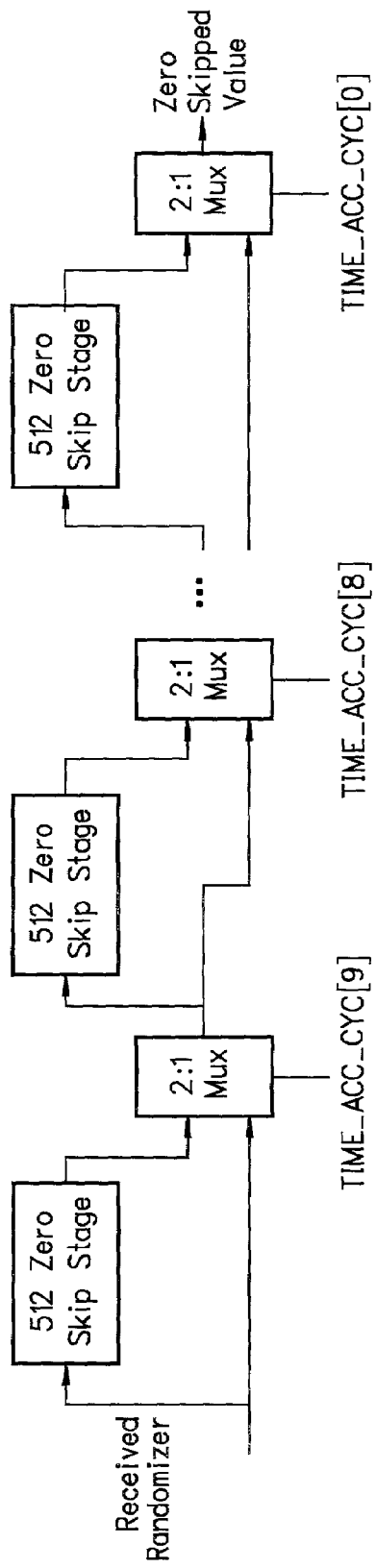
FIG. 15 is a block schematic diagram that shows overall time accelerator architecture according to the invention.

The timing accelerator (See FIG. 15) uses a total of ten programmable shifter stages to calculate it's output. Each of these stages must be either passed through or bypassed to achieve the desired result.

Interface

The interface provides the functions of configuring the data framer and reading and interpreting data when a packet is received.

In configuring the data framer, the data length must be provided. The INPUT_DATA_LENGTH register described herein must be transferred to the data framer upon initialization In configuring the data framer, a set of masking registers need to be initialized. The MASK_OFF_CYCLE_REG and MASK_ON_CYCLE_REG registers are described herein. In addition, MASK_REGISTER_0, MASK_REGISTER_1, MASK_REGISTER_2 and MASK_REGISTER_3 are described in the context of their start values. These six masking registers have associated enable bits to determine whether or not they must be loaded into the data framer. All masking registers are expected to be loaded into the data framer upon initialization or reset, but are not expected to be changed during operation.

In addition to the MASK and length registers, the data framer randomizer feedback registers must be configured. These are described in Table BT below, and their calculation is described later in this discussion.

TABLE BT

Additional Registers to be written into the data framer for Configuration

| Address | Register Name | Bits | Notes |
|---|---|---|---|
| 0x00 | PRIME_RAND_FEEDBACK | 16 | Value to be latched into the data framer ASIC for the primary randomizer Feedback. |
| 0x01 | SEC_RAND_FEEDBACK | 16 | Value to be latched into the data framer ASIC for the secondary randomizer Feedback. |

In receive mode, the custom ASIC latches data from the data framer so that it can be analyzed. A FIFO structure may be necessary to permit packets to back up if necessary. With the new parallel mode of operation, it becomes more likely that an operation may preclude immediate access to the randomizer state machines because many channels could be using the same custom ASIC. Ideally, the interface always has the highest priority because it is the high performance interface. The implementation that is listed below supports storing a single register snapshot, but it could be easily increased to being a set of FIFOs.

In receive mode, the received randomizer values must be read from the data framer. The discussion herein describes the PRIM_RANDOMIZER_RX and the SEC_RANDOMIZER_RX registers that contain these two values. In addition, mask capture data must be received from the data framer, and this is stored in the MASK_CAPTURE_DATA_0, MASK_CAPTURE_DATA_1, MASK_CAPTURE_DATA_2 and MASK_CAPTURE_DATA_3 registers that are described herein.

Finally, the custom ASIC must know the randomizer feedback values that were used in calculating the primary and secondary randomizer values. If the feedback values have changed because the last packet, then a flag is set in the interface to show that these should be read. Otherwise, the custom ASIC can chose not to read these values. The description of these registers is found in Table BU below.

TABLE BU

Additional Registers to be read from the data framer

| Address | Register Name | Bits | Notes |
|---|---|---|---|
| 0x02 | FLAME_PRIM_FB | 16 | randomizer feedback from the data framer ASIC that was used to calculate the primary randomizer value. |
| 0x03 | FLAME_SEC_FB | 16 | randomizer feedback from the data framer ASIC that was used to calculate the secondary randomizer value. |

Equation Recovery Section

The feedback value that is returned from the data framer must be converted into a relative equation number from 0 to 7 that points to a primary randomizer table. To execute this feature, eight feedback register values must be stored along with their equation mapping (see Table BV below and FIG. 16).

TABLE BV

Registers associated with equation Recovery

| Register Name | Bits | Notes |
|---|---|---|
| EQ0_FEEDBACK | 16 | EQ0 primary randomizer Feedback |
| EQ1_FEEDBACK | 16 | EQ1 primary randomizer Feedback |
| . | | |
| . | | |
| . | | |
| EQ7_FEEDBACK | 16 | EQ7 primary randomizer Feedback |
| EQ_REC_SEL | 1 | Selects the randomizer feedback source to be used to determine the original equation. |
| PRIM_RAND_EQ_NUM | 4 | The equation Number for the primary randomizer in the data framer ASIC. MSB indicates validity. |
| SEC_RAND_EQ_NUM | 4 | The for the secondary randomizer in the data framer ASIC. MSB indicates validity. |

Randomizer Setup Section

Figure 17:
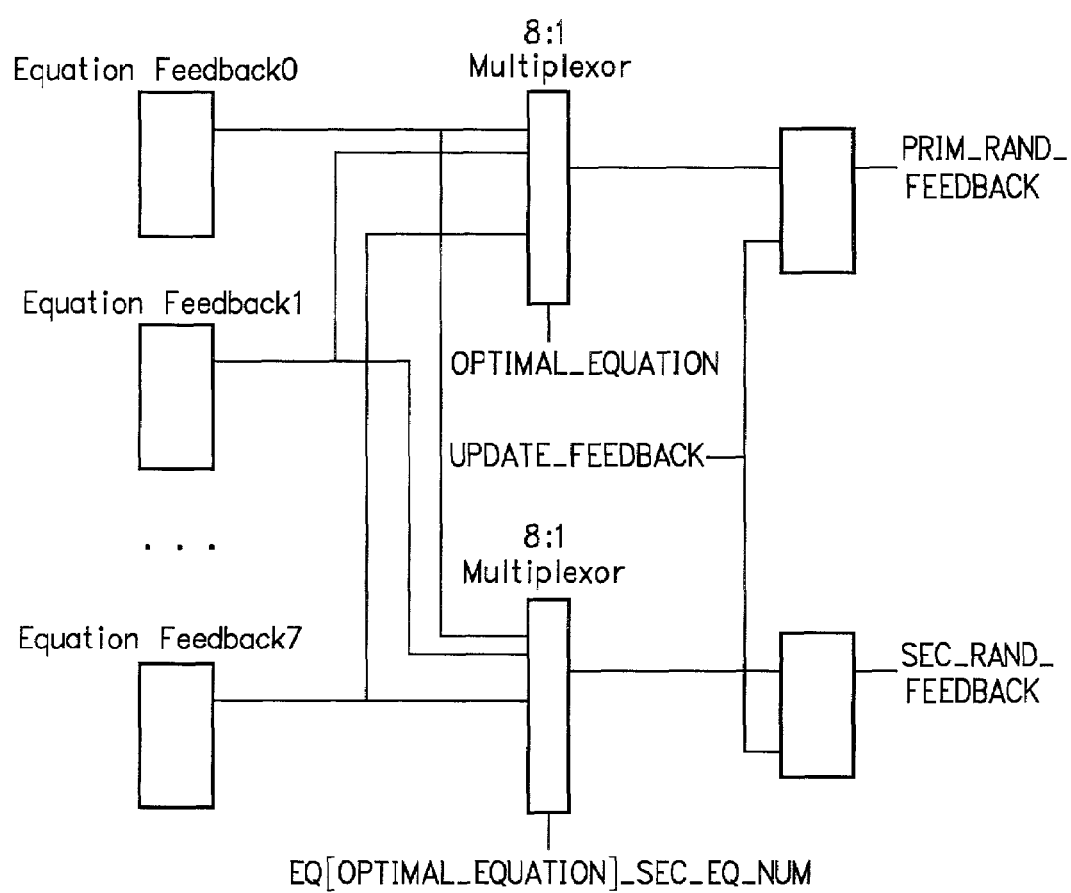
FIG. 17 is a block schematic diagram that shows configuration of randomizer feedback according to the invention.

Given the equation number, the proper EQn_FEEDBACK register can be selected to drive the data framer. This section shares the equation feedback registers with the equation recovery section. The OPTIMAL_EQUATION is driven in logic, and it is used to select the PRIM_RAND_FEEDBACK (see FIG. 17). At the time that the primary randomizer table is stored for the OPTIMAL_EQUATION, a specific secondary randomizer is used, and this is stored in the EQ[OPTIMAL_EQUATION]_SEC_EQ_NUM register. The frequency that the PRIM_RAND_FEEDBACK and SEC_RAND_FEEDBACK is updated with the UPDATE_FEEDBACK signal is no faster than the time required to load, calculate, and store or remove an input value. The feedback values only need to be updated when a change is made to the randomizer tables.

Processes Associated with the Interface

The updating of the interface registers should be done as infrequently as possible to avoid churning. When a new equation is desired, new feedback registers must be latched into the data framer. On initialization, it is also necessary to load masking registers into the data framer.

Detailed State Diagrams

In all cases below, the process implementation tables are organized in the form: State name—activity—next state, whether or not status indicated in a Table heading.

State Machines for the "Input Manager Control and State Machines" Block

The following state machines are used to manage the user inputs in the system (see Tables BW-CN below).

TABLE BW

INPUT_VALID_INIT - Process Description

| | |
|---|---|
| Process Name | INPUT_VALID_INIT |
| Process Function | This Process is called to initialize the Input Valid Table so that all entries are 0. This reflects the fact that at power up, there are no input values stored in the system. |
| Return Value(s) | none |
| Required Inputs | none |
| Modified Registers | INPUT_STRUCT_PTR INPUT_VALID array INPUT_CONTROL_REG |
| Error Conditions | None |

TABLE BX

INPUT_VALID_INIT - Process Implementation

| STATE NAME | ACTIVITY | NEXT STATE |
|---|---|---|
| IDLE | If the Input Control Register Command field is set to "Initialize Input Valid Array". Set the "Command Complete" bit to a 0 to signify that the system is Initializing. | START_PROCESS |
| | Else | IDLE |
| START_PROCESS | Load the INPUT_VALID_BASE into INPUT_STRUCT_PTR. The INPUT_STRUCT_PTR now points to the first location in the INPUT_VALID array. | CLEAR_ARRAY |
| CLEAR_ARRAY | Write a 0 into the 32 bit location addressed by the INPUT_STRUCT_PTR. | INCREMENT_SEARCH |
| INCREMENT_SEARCH | Add a value of 4 to the INPUT_STRUCT_PTR. | CONDITION_PTR |
| CONDITION_PTR | Check the value that is stored in the INPUT_STRUCT_PTR location. If INPUT_STRUCT_PTR>= {INPUT_VALID_BASE+313} Set the "Command Complete" bit in the INPUT_CONTROL_REG to a 1 to show that the initialization is completed. | IDLE |
| | Else This is a valid value, and the system will continue initializing | CLEAR_ARRAY |

TABLE BY

USER_CHECK_VALID - Process Description

| | |
|---|---|
| Process Name | USER_CHECK_VALID |
| Process Function | This Process is called by the user to determine whether an input location contains a valid input. |
| Return Value(s) | INPUT_CONTROL_REG, "Input Valid" bit |
| Required Inputs | USER_INPUT_DATA_NUMBER |
| Modified Registers | INPUT_STRUCT_PTR |
| | INPUT_STRUCT_VALUE |
| | INPUT_CONTROL_REG, "Input Valid" bit |
| Error Conditions | Invalid Input. |

TABLE BZ

USER_CHECK_VALID - Process Implementation

| STATE NAME | ACTIVITY | NEXT STATE |
|---|---|---|
| IDLE | If the INPUT_CONTROL_REG "Command" field is set to "Check Input Valid", set the "Command Complete" bit to 0. Set INPUT_NUM_SOURCE_SEL=0 {Selects user Input} | CHECK_INPUT_VALUE |
| | Else | IDLE |
| CHECK_INPUT_VALUE | If (INPUT_DATA_NUMBER>10,000) | INVALID_INPUT |
| | Else | CALC_POINTER |
| CALC_POINTER | Load INPUT_VALID_BASE+ INPUT_DATA_NUMBER >>5 into the INPUT_STRUCT_PTR. This will contain the address of the appropriate Valid word. | GET_VALID_ENTRY |
| GET_VALID_ENTRY | Read the value in DRAM that is addressed by INPUT_STRUCT_PTR and store it in INPUT_STRUCT_VALUE. | CALC_VALID_MASK |
| CALC_VALID_MASK | The INPUT_STRUCT_VALUE now contains information on 32 different inputs. INPUT_DATA_NUMBER[4:0] distinguishes which of these inputs is being addressed. Apply INPUT_DATA_NUMBER[4:0] to the 32 bit decoder. AND INPUT_STRUCT_VALUE with the 32 bit decoder output, and make a decision based upon the output. If Result=1, then there is a "1" stored in the location and the input is valid. If Result=0, then there is a "0" stored in the location and the input is not valid. Store the result in the INPUT_CONTROL_REG "Input Valid" bit. | IDLE |
| INVALID_INPUT | Set an interrupt to tell the user that the input was not valid. Write a "0" to the INPUT_CONTROL_REG "Input Valid" bit because this is not a valid input. | IDLE |

TABLE CA

SYS_CHECK_VALID - Process Description

| | |
|---|---|
| Process Name | SYS_CHECK_VALID |
| Process Function | This Process is called by the system to determine whether an input location contains a valid input. |
| Return Value(s) | INPUT_STRUCT_VALUE - 1=Valid Input, 0=Unused Input |
| Required Inputs | SYS_INPUT_DATA_NUMBER {contains the input to be checked} |
| Modified Registers | INPUT_STRUCT_PTR |
| | INPUT_STRUCT_VALUE |
| Error Conditions | None {System is assumed to generate a valid input} |

TABLE CB

SYS_CHECK_VALID - Process Implementation

| STATE NAME | ACTIVITY | NEXT STATE |
|---|---|---|
| BEGIN | INPUT_NUM_SOURCE_SEL=1 {Selects the SYS_INPUT_DATA_NUMBER} | START_PROCESS |
| START_PROCESS | Load INPUT_VALID_BASE+ INPUT_DATA_NUMBER >>5 into the INPUT_STRUCT_PTR. This will contain the address of the appropriate Valid word. | GET_VALID_ENTRY |
| GET_VALID_ENTRY | Read the value in DRAM that is addressed by INPUT_STRUCT_PTR and store it in INPUT_STRUCT_VALUE. | CALC_VALID_MASK |
| CALC_VALID_MASK | The INPUT_STRUCT_VALUE now contains information on 32 different inputs. INPUT_DATA_NUMBER[4:0] distinguishes which of these inputs is being addressed. Apply INPUT_DATA_NUMBER[4:0] to the 32 bit decoder. AND INPUT_STRUCT_VALUE with the 32 bit decoder output, and make a decision based upon the output. If Result=1, then there is a "1" stored in the location and the input is valid. If Result=0, then there is a "0" stored in the location and the input is not valid. Write Result into INPUT_STRUCT_VALUE as a return value. | END |

TABLE CC

SYS_GET_AVAIL_INPUT - Process Description

| | |
|---|---|
| Process Name | SYS_GET_AVAIL_INPUT |
| Process Function | This Process is called by the system to determine the next open input location within the input structure. |
| Return Value(s) | INPUT_AUTO_LOCATION - Next available input. INPUT_CONTROL_REG - "Unused Input" bit. |
| Required Inputs | none |
| Modified Registers | INPUT_STRUCT_PTR INPUT_STRUCT_VALUE INPUT_VALID_ENCODE INPUT_AUTO_LOCATION INPUT_CONTROL_REG - "Unused Input", "Inputs Full" and "Wrap" bits. |
| Error Conditions | "Inputs Full" - There are no available inputs. Pointer conditioning for overflow and underflow. |

TABLE CD

SYS_GET_AVAIL_INPUT - Process Implementation

| STATE NAME | ACTIVITY | NEXT STATE |
|---|---|---|
| IDLE | If the "Unused Input" bit in the INPUT_CONTROL_REG is a 0 which shows that there is not an available input. Set the Wrap bit in the Input Control Register to 0 to signify that the system has not wrapped around in it's search. Else | START_PROCESS<br><br>IDLE |
| START_PROCESS | Load INPUT_VALID_BASE into the INPUT_STRUCT_PTR The INPUT_STRUCT_PTR now points to the first location in the INPUT_VALID array. | GET_VALID_ENTRY |
| GET_VALID_ENTRY | Read the value in DRAM that is addressed by INPUT_STRUCT_PTR and store it in INPUT_STRUCT_VALUE | CHECK_VALID_ENTRY |
| CHECK_VALID_ENTRY | The INPUT_STRUCT_VALUE is applied to a Priority Encoder which will determine the lowest entry in the word that is non-one (available) if such a value exists. If No Valid Entries in this word If Valid Entry, then store the prioritized value in INPUT_VALID_ENCODE. | INCREMENT_SEARCH CALC_OPEN_LOCATION |

TABLE CD-continued

SYS_GET_AVAIL_INPUT - Process Implementation

| STATE NAME | ACTIVITY | NEXT STATE |
|---|---|---|
| CALC_OPEN_LOCATION | INPUT_AUTO_LOCATION=(INPUT_STRUCT_PTR-INPUT_VALID_BASE)*32+INPUT_VALID_ENCODE<br>Set the "Unused Input" bit to a 1 in the Input Control Register to signify that the INPUT_AUTO_LOCATION register has the next available input. | IDLE |
| INCREMENT_SEARCH | Add a 1 to the INPUT_STRUCT_PTR to prepare to search the next entry. | CONDITION_PTR |
| CONDITION_PTR | Check the value that is stored in the INPUT_STRUCT_PTR location to make sure that it is a valid pointer for the Input Valid array. | |
| | If INPUT_STRUCT_PTR<INPUT_VALID_BASE<br>INPUT_STRUCT_PTR=INPUT_VALID_BASE<br>This is an underflow error condition. That should never happen and indicates something is seriously wrong. | UNDERFLOW_ERROR |
| | If INPUT_STRUCT_PTR>=(INPUT_VALID_BASE+313)<br>and the Wrap bit in the Input Control Register=0.<br>Set INPUT_STRUCT_PTR=INPUT_VALID_BASE<br>(The system has overflowed the array pointer and it has not wrapped around, so the array pointer will be set back to the beginning of the array and start searching again) | GET_VALID_ENTRY |
| | If INPUT_STRUCT_PTR>=(INPUT_VALID_BASE+313)<br>and the Wrap bit in the Input Control Register==1<br>(The system has overflowed the array pointer and it has wrapped around, so the system will stop searching because there are no available openings.) | FULL_ARRAY |
| | If (INPUT_STRUCT_PTR>=INPUT_VALID_BASE) &&<br>(INPUT_STRUCT_PTR<(INPUT_VALID_BASE+313*4))<br>(This is a valid value, and processing will continue) | GET_VALID_ENTRY |
| UNDERFLOW_ERROR | This is a critical problem because a counter has clearly been corrupted. One possibility is that the INPUT_STRUCT_PTR has been changed in the middle of operation. If this is the case, the routine will generate an error interrupt and stop processing.<br>Interrupt the host to signify that an error has occurred. | IDLE |
| FULL_ARRAY | Set the "Inputs Full" bit in the Input Control Register to "1".<br>Interrupt the host to signify that an error has occurred. | IDLE |

TABLE CE

USER_INPUT_WR_LOAD - Process Description

| | |
|---|---|
| Process Name | USER_INPUT_WR_LOAD |
| Process Function | This Process is called by the user to write a new input into the system and to have the input be loaded into the Input Register. |
| Return Value(s) | |

TABLE CE-continued

USER_INPUT_WR_LOAD - Process Description

| | |
|---|---|
| Required Inputs | USER_INPUT_DATA_NUMBER<br>INPUT_STRUCT_VALUE<br>PRESENT_MASK_STEP<br>NEXT_MASK_STEP |
| Modified Registers<br>(This Process) | INPUT_STRUCT_PTR<br>INPUT_DATA_WORD_COUNT<br>INPUT_CONTROL_REG —"Command", "Buffer Full", "Unused Input" and "I/O Ready" bits.<br>INPUT_VALID_ENCODE |
| Modified Registers<br>(Sub-Processes) | From ADD_INPUT_ALL_EQ Process |
| Error conditions | Invalid INPUT_DATA_NUMBER |

TABLE CF

USER_INPUT_WR_LOAD - Process Implementation

| STATE NAME | ACTIVITY | NEXT STATE |
|---|---|---|
| IDLE | If the Command field in the Input Control Register is for a Write/Load Input, and the Command Complete bit is a 0.<br>INPUT_NUM_SOURCE_SEL=0 {Selects USER_INPUT_DATA_NUMBER as source} | CHECK_INPUT_NUM |
| | Else | IDLE |
| CHECK_INPUT_NUM | If (INPUT_DATA_NUMBER>=10000)<br>If (INPUT_AUTO_LOCATION==INPUT_DATA_NUMBER)<br>Set the "Unused Input" bit in the INPUT_CONTROL_REG to a 0 to show that there is not an available input. This handles the case where the user has written to an auto detected input. | INVALID_INPUT |
| | Otherwise | CALCULATE_PTR |
| INVALID_INPUT | Set an error bit, and assert an interrupt. Stop Processing at that point. | IDLE |
| CALCULATE_PTR | INPUT_STRUCT_PTR=<br>INPUT_DATA_BASE+<br>(INPUT_DATA_LENGTH/32+(1 if Remainder)+1)*<br>INPUT_DATA_NUMBER<br>INPUT_DATA_WORD_COUNT=0 {To route the write to the appropriate INPUT_REG_BANKn} | WAIT_FOR_WRITE |
| WAIT_FOR_WRITE | Set the I/O Ready bit to a 1 to signify that the system is waiting for a write to the INPUT_STRUCT_VALUE register. | |
| | If a Write occurs to the INPUT_STRUCT_VALUE register, the "Buffer Full" bit in the Input Control Register will be set.<br>Set the I/O Ready bit to a 0 to signify that the Buffer is full and that the system is not ready for a write. | STORE_INPUT |
| | If the "Command" field of the Input Control Register is set to '111' for a Reset Command, the user wants to forcibly abandon the write. | IDLE |
| | If no activity then the system will wait | WAIT_FOR_WRITE |
| STORE_INPUT | Write the INPUT_STRUCT_VALUE to the location addressed by the INPUT_STRUCT_PTR.<br>Clear the "Buffer Full" bit in the Input Control Register.<br>Clear the "I/O Ready" bit in the Input Control Register. | INCREMENT_PTR |
| INCREMENT_PTR | Add 1 to the INPUT_STRUCT_PTR<br>Add 1 to INPUT_DATA_WORD COUNT | CONDITION_PTR |
| CONDITION_PTR | If INPUT_STRUCT_PTR>=INPUT_DATA_BASE+ (INPUT_DATA_LENGTH/32+(1 if Remainder)+1)*<br>INPUT_DATA_NUMBER<br>{Calculate the Masking word to write in the | WRITE_MASK |

TABLE CF-continued

USER_INPUT_WR_LOAD - Process Implementation

| STATE NAME | ACTIVITY | NEXT STATE |
|---|---|---|
| | next step}<br>INPUT_STRUCT_VALUE[7:0]=PRESENT_MASK_STEP<br>INPUT_STRUCT_VALUE[15:8]=NEXT_MASK_STEP<br>Else | WAIT_FOR_WRITE |
| WRITE_MASK | Write the value in INPUT_STRUCT_VALUE into the memory location pointed to by INPUT_STRUCT_PTR. | END_WRITE |
| END_WRITE | Set the "Command Complete" bit in the Input Control Register to a 1 to show that the system has completed the write operation. Set the "Calculate randomizer" Bit which will allow that process to get started. | ADD_INPUT_ALL_EQ |
| ADD_INPUT_ALL_EQ | Process to map the Input Register for all of the active equations, and to store the values in the randomizer Registers. | SET_VALID |
| SET_VALID | The system needs to calculate the INPUT_STRUCT_PTR value that points to the correct Valid word.<br>INPUT_STRUCT_PTR=<br>INPUT_VALID_BASE+<br>(USER_WRITE_INPUT_NUMBER/32) with no remainders. | CALCULATE_OFFSET |
| CALCULATE_OFFSET | The sytstem needs to calculate the Offset within the 32 bit word of the INPUT_VALID array. At the same time, the system needs to read the value of the present INPUT_VALID array location.<br>INPUT_VALID_ENCODE=INPUT_DATA_NUMBER-(INPUT_DATA_NUMBER/32)<br>Read the location in DRAM pointed to by INPUT_STRUCT_PTR and store it in the INPUT_STRUCT_VALUE register. | CALCULATE_VALUE |
| CALULATE_VALUE | The INPUT_VALID_ENCODE value will be applied to a 5:32 decoder that produces a "1" in the desired location that corresponds to the input being written. This value will be OR-ed with the value in INPUT_STRUCT_VALUE, and the result will be stored in INPUT_STRUCT_VALUE. | WRITE_VALUE |
| WRITE_VALUE | The value in INPUT_STRUCT_VALUE will be written to the memory location pointed to by INPUT_STRUCT_PTR. | IDLE |

TABLE CG

USER_INPUT_WRITE - Process Description

| | |
|---|---|
| Process Name | USER_INPUT_WRITE |
| Process Function | This Process is called by the user to write a new input into the system memory, but not have it loaded into the Input Register and reflected in the Randomizer Tables. |
| Return Value(s) | |
| Required Inputs | USER_INPUT_DATA_NUMBER<br>INPUT_STRUCT_VALUE<br>PRESENT_MASK_STEP<br>NEXT_MASK_STEP |
| Modified Registers | INPUT_STRUCT_PTR |
| (This Process) | INPUT_DATA_WORD_COUNT<br>INPUT_CONTROL_REG—"Command", "Buffer Full", "Unused Input" and "I/O Ready" bits. INPUT_VALID_ENCODE |
| Modified Registers (Sub-Processes) | none |
| Error Conditions | Invalid USER_INPUT_DATA_NUMBER |

TABLE CH

USER_INPUT_WRITE - Process Implementation

| STATE NAME | ACTIVITY | NEXT STATE |
|---|---|---|
| IDLE | If the Command field in the Input Control Register is for a Write Input, and the Command Complete bit is a 0. INPUT_DATA_NUM_SOURCE=0 {Source is USER_INPUT_DATA_NUMBER} | CHECK_INPUT_NUM |
| | Else | IDLE |
| CHECK_INPUT_NUM | If (INPUT_DATA_NUMBER>=10000) | INVALID_INPUT |
| | If (INPUT_AUTO_LOCATION==INPUT_DATA_NUMBER) Set the "Unused Input" bit in the INPUT_CONTROL_REG to a 0 to show that there is not an available input. This handles the case where the user has written to an auto detected input. | |
| | Otherwise | CALCULATE_PTR |
| INVALID_INPUT | Set an error bit, and assert an interrupt. Stop Processing at that point. | IDLE |
| CALCULATE_PTR | INPUT_STRUCT_PTR= INPUT_DATA_BASE+ (INPUT_DATA_LENGTH/32+(1 if Remainder)+1)* INPUT_DATA_NUMBER Set INPUT_DATA_WORD_COUNT=0 to signify that the system is pointing to the first part of the input word. | WAIT_FOR_WRITE |
| WAIT_FOR_WRITE | Set the I/O Ready bit to a 1 to signify that the system is waiting for a write to the INPUT_STRUCT_VALUE register. | |
| | If a Write occurs to the INPUT_STRUCT_VALUE register, the "Buffer Full" bit in the Input Control Register will be set. Set the I/O Ready bit to a 0 to signify that the Buffer is full and that the system is not ready for a write. | STORE_INPUT |
| | If the "Command" field of the Input Control Register is set to '111' for a Reset Command, the user wants to forcibly abandon the write. | IDLE |
| | If no activity then the system will wait | WAIT_FOR_WRITE |
| STORE_INPUT | Write the INPUT_STRUCT_VALUE to the location addressed by the INPUT_STRUCT_PTR. Clear the "Buffer Full" bit in the Input Control Register. Clear the "I/O Ready" bit in the Input Control Register. | INCREMENT_PTR |
| INCREMENT_PTR | Add 1 to the INPUT_STRUCT_PTR | CONDITION_PTR |
| CONDITION_PTR | If INPUT_STRUCT_PTR>=INPUT_DATA_BASE+ (INPUT_DATA_LENGTH/32+(1 if Remainder)+1)* INPUT_DATA_NUMBER {Calculate the Masking word to write in the next step} INPUT_STRUCT_VALUE[7:0]=PRESENT_MASK_STEP INPUT_STRUCT_VALUE[15:8]=NEXT_MASK_STEP | WRITE_MASK |
| | Else | WAIT_FOR_WRITE |
| WRITE_MASK | Write the value in INPUT_STRUCT_VALUE into the memory location pointed to by INPUT_STRUCT_PTR. | END_WRITE |
| END_WRITE | Set the "Command Complete" bit in the Input Control Register to a 1 to show that the system has completed the write operation. Set the "Calculate randomizer" Bit which will allow that process to get started. | SET_VALID |
| SET_VALID | The system needs to calculate the INPUT_STRUCT_PTR value that points to the correct Valid word. INPUT_STRUCT_PTR= | CALCULATE_OFFSET |

TABLE CH-continued

USER_INPUT_WRITE - Process Implementation

| STATE NAME | ACTIVITY | NEXT STATE |
|---|---|---|
| CALCULATE_OFFSET | INPUT_VALID_BASE+ (USER_WRITE_INPUT_NUMBER/32) with no remainders. The system needs to calculate the Offset within the 32 bit word of the INPUT_VALID array. At the same time, the system needs to read the value of the present INPUT_VALID array location. INPUT_VALID_ENCODE=INPUT_DATA_NUMBER−(INPUT_DATA_NUMBER/32) Read the location in DRAM pointed to by INPUT_STRUCT_PTR and store it in the INPUT_STRUCT_VALUE register. | CALCULATE_VALUE |
| CALULATE_VALUE | The INPUT_VALID_ENCODE value will be applied to a 5:32 decoder that produces a "1" in the desired location that corresponds to the input being written. This value will be OR-ed with the value in INPUT_STRUCT_VALUE, and the result will be stored in INPUT_STRUCT_VALUE. | WRITE_VALUE |
| WRITE_VALUE | The value in INPUT_STRUCT_VALUE will be written to the memory location pointed to by INPUT_STRUCT_PTR. | IDLE |

TABLE CI

USER_INPUT_READ - Process Description

| | |
|---|---|
| Process Name | USER_INPUT_READ |
| Process Function | This Process is called by the user to read an input from DRAM. It does not load the value into the Input Register. |
| Return Value(s) | INPUT_STRUCT_VALUE |
| | PRESENT_MASK_VALUE |
| | NEXT_MASK_VALUE |
| Required Inputs | USER_INPUT_DATA_NUMBER |
| Modified Registers | INPUT_STRUCT_PTR |
| (This Process) | INPUT_STRUCT_VALUE |
| | PRESENT_MASK_VALUE |
| | NEXT_MASK_VALUE |
| | INPUT_CONTROL_REG—"Command", "Command Complete" and "I/O Ready" bits. |
| Modified Registers (Sub-Processes) | N/A |
| Error Conditions | Invalid USER_INPUT_DATA_NUMBER |

TABLE CJ

USER_INPUT_READ Process Implementation

| STATE NAME | ACTIVITY | NEXT STATE |
|---|---|---|
| USER_INPUT_READ | If the "Command" bits in the Input Control Register are for a "Read Input", and the "Command Complete" bit is ==0. INPUT_DATA_NUM_SOURCE=0 {USER_INPUT_DATA_NUMBER is the source} | CHECK_INPUT_NUM |
| | Else | IDLE |
| CHECK_INPUT_NUM | The input number is stored in the INPUT_DATA_NUMBER register, and it needs to be verified as being a valid input. If (INPUT_DATA_NUMBER>=10000) | INVALID_INPUT |
| | Else | CALCULATE_PTR |
| INVALID_INPUT | Set an error bit, and assert an interrupt. Stop Processing at that point. | IDLE |
| CALCULATE_PTR | Calculate the Pointer into memory: INPUT_STRUCT_PTR= INPUT_DATA_BASE+ (INPUT_DATA_LENGTH/32+(1 if Remainder)+1)* INPUT_DATA_NUMBER INPUT_DATA_WORD_COUNT=0 | READ VALUE |

TABLE CJ-continued

USER_INPUT_READ Process Implementation

| STATE NAME | ACTIVITY | NEXT STATE |
|---|---|---|
| READ_VALUE | Read the value addressed by INPUT_STRUCT_PTR and place it into the INPUT_STRUCT_VALUE register. | INCREMENT |
| INCREMENT | If there is a read to the INPUT_STRUCT_VALUE register, INPUT_STRUCT_PTR=INPUT_STRUCT_PTR+1 | CONDITION |
|  | Else | INCREMENT |
| CONDITION | {Check to see if the system has reached the MASK value. If INPUT_STRUCT_PTR==(INPUT_DATA_BASE+ (INPUT_DATA_LENGTH/32+(1 if Remainder)))* INPUT_DATA_NUMBER | READ_MASK |
|  | Otherwise | READ_VALUE |
| READ_MASK | Read the value addressed by INPUT_STRUCT_PTR. Bits[7:0] of the value being read should be directed to the PRESENT_MASK_VALUE register. Bits[15:8] of the value being read should be directed to the NEXT_MASK_VALUE register. | FINISH_READ |
| FINISH_READ | Set the "Command Complete" bit in the Input Control Register. | IDLE |

TABLE CK

USER_INPUT_CLEAR - Process Description

| | |
|---|---|
| Process Name | USER_INPUT_CLEAR |
| Process Function | This Process is called by the user to remove an Input from the system. The process loads the input into the Input Register so that it can be taken out of all the equation mappings. In addition, it clears the Input Valid bit. |
| Return Value(s) | INPUT_CONTROL_REG—"Command Complete" |
| Required Inputs | USER_INPUT_DATA_NUMBER |
| Modified Registers | INPUT_STRUCT_PTR |
| (This Process) | INPUT_STRUCT_VALUE INPUT_DATA_WORD_COUNT PRESENT_MASK_STEP NEXT_MASK_STEP INPUT_CONTROL_REG—"Command", "Command Complete" and "I/O Ready" bits. |
| Modified Registers (Sub-Processes) | SUBTRACT_INPUT_ALL_EQ |
| Error Conditions | Invalid USER_INPUT_DATA_NUMBER |

TABLE CL

USER_INPUT_CLEAR - Process Implementation

| STATE NAME | ACTIVITY | NEXT STATE |
|---|---|---|
| USER_INPUT_CLEAR | If the "Command" bits in the Input Control Register are for a "Read Input", and the "Command Complete" bit is ==0. INPUT_DATA_NUM_SOURCE=0 {Source is the USER_INPUT_DATA_NUMBER} | CHECK_INPUT_NUM |
|  | Else | IDLE |
| CHECK_INPUT_NUM | The input number is stored in the INPUT_DATA_NUMBER register, and it needs to be verified as being a valid input. If (INPUT_DATA_NUMBER>=10000) | INVALID_INPUT |
|  | Else | CALCULATE_PTR |
| INVALID_INPUT | Set an error bit, and assert an interrupt. Stop Processing at that point. | IDLE |
| CALCULATE_PTR | Calculate the Pointer into memory: INPUT_STRUCT_PTR= INPUT_DATA_BASE+ (INPUT_DATA_LENGTH/32+(1 if | READ VALUE |

TABLE CL-continued

USER_INPUT_CLEAR - Process Implementation

| STATE NAME | ACTIVITY | NEXT STATE |
|---|---|---|
| READ_VALUE | Remainder)+1)* INPUT_DATA_NUMBER Set INPUT_DATA_WORD_COUNT=0 Read the value addressed by INPUT_STRUCT_PTR and place it into the INPUT_REG_BANKn that is selected by the INPUT_DATA_WORD_COUNT. | INCREMENT |
| INCREMENT | INPUT_STRUCT_PTR=INPUT_STRUCT_PTR+1 | CONDITION |
| CONDITION | {Check to see if the system has reached the MASK value. If INPUT_STRUCT_PTR==(INPUT_DATA_BASE+ (INPUT_DATA_LENGTH/32+(1 if Remainder)))* INPUT_DATA_NUMBER Otherwise | READ_MASK<br><br><br><br><br><br><br>READ_VALUE |
| READ_MASK | Read the value addressed by INPUT_STRUCT_PTR. Bits[7:0] of the value being read should be directed to the PRESENT_MASK_STEP register. Bits[15:8] of the value being read should be directed to the NEXT_MASK_STEP register. | SUBTRACT_INPUT_ALL_EQ |
| SUBTRACT_INPUT_ALL_EQ | This Process removes the input in the Input Register from all of the equation Maps. | CLEAR_VALID |
| CLEAR_VALID | Calculate the Offset into the INPUT_VALID array for the value that is encoded here. INPUT_STRUCT_PTR= INPUT_VALID_BASE+ INT(INPUT_DATA_NUMBER/32) | GET_VALID_WORD |
| GET_VALID_WORD | Read the value pointed to by INPUT_STRUCT_PTR, and write it into the INPUT_STRUCT_VALUE register. | GENERATE_NEW_VALID |
| GENERATE_NEW_VALID | Take INPUT_DATA_NUMBER[4:0] and apply it to a 5 to 32 decoder. And the Inverse of this operation with INPUT_STRUCT_VALUE and store the result in INPUT_STRUCT_VALUE. {This clears out the bit that is selected.} | WRITE_VALID_BACK |
| WRITE_VALID_BACK | Write INPUT_STRUCT_VALUE into the location pointed to by INPUT_STRUCT_PTR. | IDLE |
| INVALID_CLEAR | An Error Interrupt will be generated for an Invalid Input Clear that is out of range. | IDLE |

TABLE CM

SYS_INPUT_LOAD - Process Description

| | |
|---|---|
| Process Name | SYS_INPUT_LOAD |
| Process Function | This Process is called by the system to retrieve an input value from DRAM and load it into the Input Register. |
| Return Value(s) | INPUT_CONTROL_REG—"Command Complete" |
| Required Inputs | SYS_INPUT_DATA_NUMBER |
| Modified Registers (This Process) | INPUT_STRUCT_PTR INPUT_STRUCT_VALUE INPUT_DATA_WORD_COUNT PRESENT_MASK_STEP NEXT_MASK_STEP INPUT_CONTROL_REG—"Command", "Command Complete" and "I/O Ready" bits. |
| Modified Registers (Sub-Processes) | |
| Error Conditions | None |

TABLE CN

SYS_INPUT_LOAD - Process Implementation

| STATE NAME | ACTIVITY | NEXT STATE |
|---|---|---|
| USER_INPUT_CLEAR | Driven by the System INPUT_DATA_NUM_SOURCE=1 {Source is the SYS_INPUT_DATA_NUMBER} | CALCULATE_PTR |
|  | Else | IDLE |
| CALCULATE_PTR | Calculate the Pointer into memory: INPUT_STRUCT_PTR= INPUT_DATA_BASE+ (INPUT_DATA_LENGTH/32+(1 if Remainder)+1)* INPUT_DATA_NUMBER Set INPUT_DATA_WORD_COUNT=0 | READ VALUE |
| READ_VALUE | Read the value addressed by INPUT_STRUCT_PTR and place it into the INPUT_REG_BANKn that is selected by the INPUT_DATA_WORD_COUNT. | INCREMENT |
| INCREMENT CONDITION | INPUT_STRUCT_PTR=INPUT_STRUCT_PTR+1 {Check to see if the system has reached the MASK value. If INPUT_STRUCT_PTR==(INPUT_DATA_BASE+ (INPUT_DATA_LENGTH/32+(1 if Remainder)))* INPUT_DATA_NUMBER Otherwise | CONDITION READ_MASK READ_VALUE |
| READ_MASK | Read the value addressed by INPUT_STRUCT_PTR. Bits[7:0] of the value being read should be directed to the PRESENT_MASK_STEP register. Bits[15:8] of the value being read should be directed to the NEXT_MASK_STEP register. Set a bit to signify that this process is complete. | IDLE |

State Machines for the "1024 Bit Input Register" Block

There are no state machines dedicated to this block.

State Machines for the "Masking and Enabling Logic" Block

The following state machines are used to manage the masking and enabling functions of the system (see Table CO-CR below).

TABLE CO

INIT_FORCED_MASK - Process Description

| Process Name | INIT_FORCED_MASK |
|---|---|
| Process Function | This is a system process is used to setup all bits that will be masked off from use in the Randomizer Calculations. This includes all ON/OFF bits as well as bits after the user programmed INPUT_DATA_LENGTH. |
| Return Value(s) |  |
| Required Inputs | MASK_OFF_CYCLE_REG, MASK_ON_CYCLE_REG |
| Modified Registers (This Process) | SET_ENAB_BANK SET_ENAB_BIT FORCE_MASK_ON |
| Modified Registers (Sub-Processes) |  |
| Error Conditions |  |

TABLE CP

INIT_FORCED_MASK - Process Implementation

| STATE NAME | ACTIVITY | NEXT STATE |
|---|---|---|
| IDLE | If the Main Control Directs this process to start. Done after a change to INPUT_DATA_LENGTH, MASK_ON_CYCLE_REG or MASK_OFF_CYCLE_REG. | INITIALIZE_VALUES |
|  | Else | IDLE |

TABLE CP-continued

INIT_FORCED_MASK - Process Implementation

| STATE NAME | ACTIVITY | NEXT STATE |
|---|---|---|
| INITIALIZE_VALUES | Set the following registers:<br>SET_ENAB_BANK=0<br>SET_ENAB_BIT=0<br>SET_ENAB_FROM_SMS0=0<br>FORCE_MASK_ON=0 | QUALIFY_BANK |
| QUALIFY_BANK | Here is where the system determines whether this BANK is covered by one of the four user programmable MASK Registers<br>If (ENAB_BANK==MASK_REGISTER_0) &&<br>(MASK_REGISTER_0 Enable Bit==1) | PROG_MASK0 |
| | Else If<br>(ENAB_BANK==MASK_REGISTER_1) && (MASK_REGISTER_1 Enable Bit==1) | PROG_MASK1 |
| | Else If<br>(ENAB_BANK==MASK_REGISTER_2) && (MASK_REGISTER_2 Enable Bit==1) | PROG_MASK2 |
| | Else If<br>(ENAB_BANK==MASK_REGISTER_3) && (MASK_REGISTER_3 Enable Bit==1) | PROG_MASK3 |
| | Else | USE_ON_OFF |
| PROG_MASK0 | SET_ENAB_FROM_SMS0=1<br>SET_ENAB_SMSO_SELECT=0 | FORCED_MASK_OFF |
| PROG_MASK1 | SET_ENAB_FROM_SMS0=1<br>SET_ENAB_SMSO_SELECT=1 | FORCED_MASK_OFF |
| PROG_MASK2 | SET_ENAB_FROM_SMS0=1<br>SET_ENAB_SMSO_SELECT=2 | FORCED_MASK_OFF |
| PROG_MASK3 | SET_ENAB_FROM_SMS0=1<br>SET_ENAB_SMSO_SELECT=3 | FORCED_MASK_OFF |
| USE_ON_OFF | SET_ENAB_FROM_SMS0=0 | QUALIFY_BIT |
| QUALIFY_BIT | The SET_ENAB_BANK and SET_ENAB_BIT values need to be combined to generate the input bit number. Check to see if this bit is the bit where the system is supposed to start MASKING OFF the data.<br>IF (((SET_ENAB_BANK <<5) \|\| (SET_ENAB_BIT)) == MASK_OFF_CYCLE_REG) && (MASK_OFF_CYCLE_REG Enable = 1) | FORCED_MASK_OFF |
| | Check to see if this bit is the bit where the system is supposed to start MASKING ON the data.<br>IF (((SET_ENAB_BANK <<5) \|\| (SET_ENAB_BIT)) == MASK_ON_CYCLE_REG) && (MASK_ON_CYCLE_REG Enable = 1) | FORCED_MASK_ON |
| | Check to see if this bit is the end of the INPUT_DATA_LENGTH.<br>IF (((SET_ENAB_BANK <<5) \|\| (SET_ENAB_BIT)) == INPUT_DATA_LENGTH) | FORCED_MASK_ON |
| FORCED_MASK_OFF | Set the FORCE_MASK_ON bit to "0" to signify that the system is not masking all bits at this point. | USE_FORCE_STATUS |
| FORCED_MASK_ON | Set the FORCE_MASK_ON bit to "1" to signify that all bits will be masked for the time being. | USE_FORCE_STATUS |
| USE_FORCE_STATUS | Write_Bit=FORCE_MASK_ON | WRITE_ENAB_BIT |
| WRITE_ENAB_BIT | The SET_ENAB_BANK and SET_ENAB_BIT need to be concatenated and run through two 10 to 1024 decoder. One set of decoder outputs will drive the Set lines on the Enable bits, and one set of decoder outputs will drive the Reset lines on the Enable Bits. If the Write_Bit=0 then the system needs to enable the Set line, and if the Write_Bit=1 then the system needsto enable the Reset line. | INCREMENT_BIT |
| INCREMENT_BIT | SET_ENAB_BIT=SET_ENAB_BIT+1.<br>If Rollover<br>Else | INCREMENT_BANK<br>QUALIFY_BIT |

TABLE CP-continued

INIT_FORCED_MASK - Process Implementation

| STATE NAME | ACTIVITY | NEXT STATE |
|---|---|---|
| INCREMENT_BANK | SET_ENAB_BANK=SET_ENAB_BANK+1<br>If Rollover<br>Else | IDLE<br>QUALIFY_BANK |

TABLE CQ

INIT_PROG_MASK - Process Description

| | |
|---|---|
| Process Name | INIT_PROG_MASK |
| Process Function | This is a system process to setup all of the Programmable Masking Impact Bits for the system. |
| Return Value(s) | |
| Required Inputs | MASK_OFF_CYCLE_REG, MASK_ON_CYCLE_REG |
| Modified Registers | SET_ENAB_BANK |
| (This Process) | SET_ENAB_BIT<br>INPUT_SOURCE_SELECT<br>EQUATION_STORE_ENTRY<br>SET_ENAB_SMSO_SELECT<br>WALKING_ONE_VALUE |
| Modified Registers (Sub-Processes) | N/A |
| Error Conditions | none |

TABLE CR

INIT_PROG_MASK - Process Implementation

| STATE NAME | ACTIVITY | NEXT STATE |
|---|---|---|
| IDLE | If the Main Control Directs this process to start.<br>{Done on initialization or after an equation is swapped out}<br>Else | INITIALIZE_VALUES<br><br><br><br>IDLE |
| INITIALIZE_VALUES | Set the following registers:<br>SET_ENAB_BANK=0<br>INPUT_SOURCE_SELECT=1 {Selects Walking One's} | QUALIFY_BANK |
| QUALIFY_BANK | Here is where the system determines whether this BANK is covered by one of the four user programmable MASK Registers<br>Set EQUATION_STORE_ENTRY=0<br>If (SET_ENAB_BANK==MASK_REGISTER_0) && (MASK_REGISTER_0 Enable Bit==1)<br>Else If (SET_ENAB_BANK==MASK_REGISTER_1) && (MASK_REGISTER_1 Enable Bit==1)<br>Else If (SET_ENAB_BANK==MASK_REGISTER_2) && (MASK_REGISTER_2 Enable Bit==1)<br>Else If (SET_ENAB_BANK==MASK_REGISTER_3) && (MASK_REGISTER_3 Enable Bit==1)<br>Else | CHECK_MASK0<br><br><br><br><br><br>CHECK_MASK1<br><br><br><br>CHECK_MASK2<br><br><br><br>CHECK_MASK3<br><br><br><br>INCREMENT_BANK |
| CHECK_MASK0 | SET_ENAB_SMSO_SELECT=0<br>SET_ENAB_BIT=0 | SET_WALKING_ONES |
| CHECK_MASK1 | SET_ENAB_SMSO_SELECT=1<br>SET_ENAB_BIT=0 | SET_WALKING_ONES |
| CHECK_MASK2 | SET_ENAB_SMSO_SELECT=2<br>SET_ENAB_BIT=0 | SET_WALKING_ONES |
| CHECK_MASK3 | SET_ENAB_SMSO_SELECT=3<br>SET_ENAB_BIT=0 | SET_WALKING_ONES |
| SET_WALKING_ONES | WALKING_ONE_VALUE=(SET_ENAB_BANK<<5)\|(SET_ENAB_BIT) | MAP_VALUE |

TABLE CR-continued

INIT_PROG_MASK - Process Implementation

| STATE NAME | ACTIVITY | NEXT STATE |
|---|---|---|
| MAP_VALUE | Write the Mapper Output into the Mask Impact register associated with Equation Number= EQUATION_STORE_ENTRY, Mask Register=SET_ENAB_SMS0_SELECT, and Bit Number=SET_ENAB_BIT. | INCREMENT_BIT |
| INCREMENT_BIT | SET_ENAB_BIT=SET_ENAB_BIT+1 If Overflow Else | INCREMENT_EQ SET_WALKING_ONES |
| INCREMENT_EQ | EQUATION_STORE_ENTRY= EQUATION_STORE_ENTRY+1 If Overflow Else | INCREMENT_BANK SET_WALKING_ONES |
| INCREMENT_BANK | SET_ENAB_BANK=SET_ENAB_BANK+1 If Overflow Else | IDLE QUALIFY_BANK |

State Machines for the "Equation Mapper" Block
   There are no state machines specific to this block.

State Machines for the "Mapper Multiplexer" Block
   There are no state machines specific to this block.

State Machines for the "Mapper Storage Control and Storage State Machine" Blk

The following processes have to do with initializing, storing, and removing and matching values in a primary randomizer table (see Tables CS-DV below).

TABLE CS

RAND_INIT - Process Description

| | |
|---|---|
| Process Name | RAND_INIT |
| Process Function | This process is used to initialize and clear out a randomizer Table for one specific equation. Only the first entry of each 2 × 16 bit primary randomizer entry must be cleared in the main table. In addition, the Valid Multiple Table must be cleared out for the equation to show that none of the Multiple entries are being used. |
| Return Value(s) | |
| Required Inputs | RAND_INIT_EQ |
| Modified Registers (This Process) | RAND_INIT_VALUE RAND_INIT_ADDRESS RAND_INIT_COUNT |
| Modified Registers (Sub-Processes) | N/A |
| Error Conditions | none |

TABLE CT

RAND_INIT - Process Description

| STATE NAME | ACTIVITY | NEXT STATE |
|---|---|---|
| CLEAR_EQUATION | If the Main Control Directs this process to start. The Main Control will set "RAND_INIT_EQ" to the number of the equation that is being initialized. Else | INITIALIZE CLEAR_EQUATION |
| INITIALIZE | Set RAND_INIT_VALUE=0 Set RAND_INIT_ADDRESS= PRIM_RAND_TABLE_BASE+ RAND_INIT_EQ*PRIM_RAND_LENGTH {This sets up the pointer to point to the base of the structure} Set RAND_INIT_COUNT=0 {This sets up that the sytstem has not cleared any locations yet} | CLEAR_VALUE |
| CLEAR_VALUE | Write RAND_INIT_VALUE to the location pointed to by RAND_INIT_ADDRESS RAND_INIT_ADDRESS=RAND_INIT_ | |

TABLE CT-continued

RAND_INIT - Process Description

| STATE NAME | ACTIVITY | NEXT STATE |
|---|---|---|
| | ADDRESS+2. | |
| | If RAND_INIT_COUNT==65535 | END_RAND_TABLE |
| | RAND_INIT_COUNT++ {At end of cycle} | |
| | Else | CLEAR_VALUE |
| | RAND_INIT_COUNT++ {At end of cycle} | |
| END_RAND_TABLE | RAND_INIT_COUNT=0 | GET_MULT_ADDRESS |
| GET_MULT_ADDRESS | Set RAND_INIT_ADDRESS= PRIM_RAND_TABLE_BASE+ RAND_INIT_EQ*PRIM_RAND_LENGTH+ MULT_VALID_OFFSET {This sets up the pointer to point to the base of the Multiple Structure} RAND_INIT_COUNT=0 | CLEAR_MULT |
| CLEAR_MULT | Write RAND_INIT_VALUE to the location pointed to by RAND_INIT_ADDRESS RAND_INIT_ADDRESS++ | |
| | If RAND_INIT_COUNT==67 {End of Cycle} | IDLE |
| | Else | CLEAR_MULT |
| | RAND_INIT_COUNT++ {After Cycle} | |

TABLE CU

PRAND_ADD_ENTRY - Process Description

| | |
|---|---|
| Process Name | PRAND_ADD_ENTRY |
| Process Function | This process is used to add a randomizer Table Entry for a single equation. |
| Return Value(s) | (Need something to indicate completion) |
| Required Inputs | PRIM_RAND_TABLE_BASE |
| | PRIM_RAND_EQ_NUM |
| | PRIM_RAND_LENGTH |
| | INPUT_DATA_NUMBER |
| | NEXT_MASK_STEP |
| Modified Registers (This Process) | PRIM_RAND_VALUE |
| | SEC_RAND_VALUE |
| | PRIM_RAND_LOCATION |
| | PRIM_RAND_ENTRY |
| | TEMP_POINTER0 |
| | TEMP_VALUE0 |
| Modified Registers (Sub-Processes) | GET_NEW_MULT_ENTRY returns TEMP_COUNT |
| Error Conditions | none |

TABLE CV

PRAND_ADD_ENTRY - Process Implementation

| STATE NAME | ACTIVITY | NEXT STATE |
|---|---|---|
| PRAND_ADD_ENTRY | A process to process handshake starts this off. | START_PROCESS |
| | Otherwise | PRAND_ADD_ENTRY |
| START_PROCESS | The system needs to generate the pointer into the primary randomizer Table that will be used for this value. PRIM_RAND_LOCATION = PRIM_RAND_TABLE_BASE+ PRIM_RAND_EQ_NUM*PRIM_RAND_LENGTH+ 2*PRIM_RAND_VALUE | GET_PRIOR_ENTRY |
| GET_PRIOR_ENTRY | Get the value from SRAM that is pointed to by PRIM_RAND_LOCATION, and store it in PRIM_RAND_ENTRY. | EVALUATE_PRIOR |
| EVALUATE_PRIOR | Evaluate B15, B14, B13, B12 to see what the previous entry consisted of. | |
| | If B15=0, B14=0 (No Existing Entry) | NEW_SINGLE_ENTRY |
| | If B15=0, B14=1 (Existing Single Entry) | NEW_PAIR_ENTRY |

TABLE CV-continued

PRAND_ADD_ENTRY - Process Implementation

| STATE NAME | ACTIVITY | NEXT STATE |
|---|---|---|
| | If B15=1, B14=0 (Existing Pair Entry) | NEW_TRIPLE_ENTRY |
| | If B15=1, B14=1, B13=0, B12=0 (Existing Triple Entry) | NEW_QUAD_ENTRY |
| | If B15=1, B14=1, B13=0, B12=1 (Existing Quad Entry) | NEW_OVERFLOW_ENTRY |
| | If B15=1, B14=1, B13=1, B12=0 (Existing Overflow Entry) | ADDED_OVERFLOW |
| | If B15=1, B14=1, B13=1, B12=1 (Single Mask Entry) | NEW_PAIR_ENTRY |

TABLE CW

Path for a New Single Entry

| | | |
|---|---|---|
| NEW_SINGLE_ENTRY | If NEXT_MASK_STEP!=0 (Masking Step) Bits[15:12]='1111'. Bits[4:0]=NEXT_MASK_STEP Store Bits[15:0] in PRIM_RAND_ENTRY If NEXT_MASK_STEP=0 (Non-Masking Step) Bits[15:14]='01' Bits[13:0]=INPUT_DATA_NUMBER Store Bits[15:0] in PRIM_RAND_ENTRY | STORE_SINGLE_ENTRY |
| STORE_SINGLE_ENTRY | Write the PRIM_RAND_ENTRY into the memory pointed to by the PRIM_RAND_LOCATION pointer. PRIM_RAND_LOCATION++ | STORE_SING_SEC_RAN |
| STORE_SING_SEC_RAN | Write the SEC_RAND_VALUE into the memory pointed to by the PRIM_RAND_LOCATION pointer. | PRAND_ADD_ENTRY |

TABLE CX

Path for handling a New Pair

| | | |
|---|---|---|
| NEW_PAIR_ENTRY | GET_NEW_MULT_ENTRY (Macro Call) Return value of pair index in TEMP_COUNT. | CALC_NEW_MULT_PTR |
| CALC_NEW_MULT_PTR | TEMP_POINTER0= PRIM_RAND_TABLE_BASE+ PRIM_RAND_EQ_NUM*PRIM_RAND_LENGTH+ MULT_TABLE_OFFSET+ TEMP_COUNT*8 | COPY_SINGLE_INPUT |
| COPY_SINGLE_INPUT | PRIM_RAND_ENTRY contains either the input value or a Masking Value. It needs to be copied over into the pair structure as the First Value Input Pointer. Write PRIM_RAND_ENTRY into location (TEMP_POINTER0+4) | GET_PRIM_RAND_SEC |
| GET_PRIM_RAND_SEC | Get the information that is stored at the location pointed to by (PRIM_RAND_LOCATION+1), and store it in PRIM_RAND_ENTRY. | STORE_PRIM_RAND_SEC |
| STORE_PRIM_RAND_SEC | PRIM_RAND_ENTRY now holds the secondary randomizer value. PRIM_RAND_ENTRY should be stored in location TEMP_POINTER0. {This calculation is being done early when the ALU's are not being utilized} Calculate the value for the New Pair Entry in the primary randomizer Table. The Pair Index is stored in TEMP_COUNT, and the system needs to modify the upper bits. | STORE_SINGLE_SEC |

TABLE CX-continued

Path for handling a New Pair

| | | |
|---|---|---|
| | PRIM_RAND_ENTRY[15:14]='10'<br>PRIM_RAND_ENTRY[13:0]=TEMP_COUNT<br>[13:0] | |
| STORE_SINGLE_SEC | Store the SEC_RAND_VALUE for the latest input in the location TEMP_POINTER0+1.<br>Calculate the pair table value for the new input.<br>If NEXT_MASK_STEP!=0(Masking Step)<br>TEMP_VALUE0[15]='1'.<br>TEMP_VALUE0[4:0]=NEXT_MASK_STEP<br>If NEXT_MASK_STEP=0 (Non-Masking Step)<br>TEMP_VALUE0[15]='0'<br>TEMP_VALUE0[13:0]=INPUT_DATA_NUMBER | STORE_NEW_INPUT |
| STORE_NEW_INPUT | Store Bits[15:0] in the location pointed to by TEMP_POINTER0+5. | STORE_PRIM_ENTRY_PAIR |
| STORE_PRIM_ENTRY_PAIR | Write PRIM_RAND_ENTRY into the location pointed to by PRIM_RAND_LOCATION. This will activate the new Multiple Entry block. | PRAND_ADD_ENTRY |

TABLE CY

Path For a New Triple

| | | |
|---|---|---|
| NEW_TRIPLE | TEMP_POINTER0 will be used to access the Multiple Entry Table.<br>TEMP_POINTER0=<br>PRIM_RAND_TABLE_BASE+<br>PRIM_RAND_EQ_NUM*PRIM_RAND_LENGTH+<br>MULT_TABLE_OFFSET+PRIM_RAND_ENTRY[9:0]*8 | WRITE_THIRD_SR |
| WRITE_THIRD_SR | Write the SEC_RAND_VALUE into the location pointed to by (TEMP_POINTER0+2). This writes the Third Input secondary randomizer value into the Multiple Entry table.<br>{Calculate the new THIRD_INPUT value for the Multiple Entry Table.}<br>If NEXT_MASK_STEP!=0,<br>TEMP_VALUE0[15]=1.<br>TEMP_VALUE0[4:0]=NEXT_MASK_STEP<br>If NEXT_MASK_STEP=0,<br>TEMP_VALUE0[15]=0.<br>TEMP_VALUE0[13:0]=PRIM_RAND_INPUT. | WRITE_THIRD_INPUT |
| WRITE_THIRD_INPUT | Write TEMP_VALUE0 (previously calculated) into the location pointed to by (TEMP_POINTER0+6). This loads the Third input into the Multiple Entry Table.<br>{Calculate the new PRIM_RAND_ENTRY value that signifies that the system is dealing with a Triple, and save it for the end of this routine}<br>PRIM_RAND_ENTRY[15:12]='1100'<br>PRIM_RAND_ENTRY[9:0]=PRIM_RAND_ENTRY[9:0] | WRITE_PRIM_RAND_TRIP |
| WRITE_PRIM_RAND_TRIP | Write PRIM_RAND_ENTRY (previously calculated) into the location pointed to by PRIM_RAND_LOCATION to setup and activate the New Triple. | PRAND_ADD_ENTRY |

TABLE CZ

Path For a New quadruple

| | | |
|---|---|---|
| NEW_QUAD_ENTRY | TEMP_POINTER0 will be used to access the Multiple Entry Table. TEMP_POINTER0= PRIM_RAND_TABLE_BASE+ PRIM_RAND_EQ_NUM*PRIM_RAND_LENGTH+ MULT_TABLE_OFFSET+PRIM_RAND_ENTRY [9:0]*8 | WRITE_FOURTH_SR |
| WRITE_FOURTH_SR | Write the SEC_RAND_VALUE into the location pointed to by (TEMP_POINTER0+3). This writes the Third Fourth Input secondary randomizer value into the Multiple Entry table. {Calculate the new FOURTH_INPUT value for the Multiple Entry Table.} If NEXT_MASK_STEP!=0, TEMP_VALUE0[15]=1. TEMP_VALUE0[4:0]=NEXT_MASK_STEP If NEXT_MASK_STEP=0, TEMP_VALUE0[15]=0. TEMP_VALUE0[13:0]=PRIM_RAND_INPUT. | WRITE_FOURTH_INPUT |
| WRITE_FOURTH_INPUT | Write TEMP_VALUE0 (previously calculated) into the location pointed to by (TEMP_POINTER0+7). This loads the Fourth input into the Multiple Entry Table. {Calculate the new PRIM_RAND_ENTRY value that signifies that the system is dealing with a quadruple, and save it for the end of this routine} PRIM_RAND_ENTRY[15:12]='1101' PRIM_RAND_ENTRY[4:0]=TEMP_VALUE0 [4:0] | WRITE_PRIM_RAND_ QUAD |
| WRITE_PRIM_RAND_QUAD | Write PRIM_RAND_ENTRY (previously calculated) into the location pointed to by PRIM_RAND_LOCATION to setup and activate the New quadruple. | PRAND_ADD_ENTRY |

TABLE DA

Path for a New Overflow Entry

| | | |
|---|---|---|
| NEW_OVERFLOW_ENTRY | At this point, the system has a Multiple Entry (quadruple) that it needs to add an input to. PRIM_RAND_ENTRY[9:0] contains the number for the Multiple Entry Location. TEMP_POINTER0= PRIM_RAND_TABLE_BASE+ PRIM_RAND_EQ_NUM*PRIM_RAND_LENGTH+ MULT_TABLE_OFFSET+ (PRIM_RAND_ENTRY[9:0])*8 | CALC_FIRST_OVERFLOW |
| CALC_FIRST_OVERFLOW | If NEXT_MASK_STEP!=0 {Masking} TEMP_VALUE0[15]=1 TEMP_VALUE0[4:0]=NEXT_MASK_STEP If NEXT_MASK_STEP=0 {Non Masking} TEMP_VALUE0[15]=0 TEMP_VALUE0[13:0]=INPUT_DATA_NUMBER | WR_FIRST_OVER_INPUT |
| WR_FIRST_OVER_INPUT | Write TEMP_VALUE0 into the location pointed to by TEMP_POINTER0+0. {This is normally the first secondary randomizer Value} {Calculate the new PRIM_RAND_ENTRY to show that there is a single overflow.} PRIM_RAND_ENTRY[9:0]=PRIM_RAND_ ENTRY[9:0] PRIM_RAND_ENTRY[15:10]='111001' The '01' in bits 10,11 map to a single overflow. | WRITE_PRIM_OVERFLOW |
| WRITE_PRIM_OVERFLOW | Write the PRIM_RAND_ENTRY to the location pointed to by the PRIM_RAND_LOCATION pointer. | PRAND_ADD_ENTRY |

TABLE DB

Path for an Added Overflow Entry

| | | |
|---|---|---|
| ADDED_OVERFLOW_ENTRY | At this point, the system has a Multiple Entry Overflow that it needs to add an input to.<br>PRIM_RAND_ENTRY[9:0] contains the number for the Multiple Entry Location.<br>TEMP_POINTER0=<br>PRIM_RAND_TABLE_BASE+<br>PRIM_RAND_EQ_NUM*PRIM_RAND_LENGTH+<br>MULT_TABLE_OFFSET+<br>(PRIM_RAND_ENTRY[9:0])*8 | CHECK_OVERFLOW_NUM |
| CHECK_OVERFLOW_NUM | {The following is done to calculate the value of the new input that is to be stored}<br>If NEXT_MASK_STEP!=0{Masking}<br>TEMP_VALUE0[15]=1<br>TEMP_VALUE0[4:0]=NEXT_MASK_STEP<br>If NEXT_MASK_STEP=0 {Non Masking}<br>TEMP_VALUE0[15]=0<br>TEMP_VALUE0[13:0]=INPUT_DATA_NUMBER | |
| | If PRIM_RAND_ENTRY[11:10]='01' {1 Over Exists} | WR_SEC_OVERFLOW |
| | If PRIM_RAND_ENTRY[11:10]='10' {2 Over Exists} | WR_THIRD_OVERFLOW |
| | If PRIM_RAND_ENTRY[11:10]='11' {3 Over Exists} | WR_FOURTH_OVERFLOW |
| | If PRIM_RAND_ENTRY[11:10]='00' {4 Over Exists} | WR_OVER_ERROR |
| WR_SEC_OVERFLOW | Write TEMP_VALUE0 into the location pointed to by TEMP_POINTER0+1. {This is normally the second secondary randomizer Value}<br>{Calculate the new PRIM_RAND_ENTRY to show that there are two overflow.}<br>PRIM_RAND_ENTRY[9:0]=PRIM_RAND_ENTRY[9:0]<br>PRIM_RAND_ENTRY[15:10]='111010'<br>The '10' in bits 11,10 map to a double overflow. | WRITE_PRIM_OVERFLOW |
| WR_THIRD_OVERFLOW | Write TEMP_VALUE0 into the location pointed to by TEMP_POINTER0+2. {This is normally the third secondary randomizer Value}<br>{Calculate the new PRIM_RAND_ENTRY to show that there are three overflow.}<br>PRIM_RAND_ENTRY[9:0]=PRIM_RAND_ENTRY[9:0]<br>PRIM_RAND_ENTRY[15:10]='111011'<br>The '11' in bits 11,10 map to a triple overflow. | WRITE_PRIM_OVERFLOW |
| WR_FOURTH_OVERFLOW | Write TEMP_VALUE0 into the location pointed to by TEMP_POINTER0+3. {This is normally the fourth secondary randomizer Value}<br>{Calculate the new PRIM_RAND_ENTRY to show that there are four overflow.}<br>PRIM_RAND_ENTRY[9:0]=PRIM_RAND_ENTRY[9:0]<br>PRIM_RAND_ENTRY[15:10]='111000'<br>The '00' in bits 11,10 map to a quadruple overflow. | WRITE_PRIM_OVERFLOW |
| WR_OVER_ERROR | Fire off an interrupt and set a status register to show that the system has overflowed a Multiple Entry. | PRAND_ADD_ENTRY |
| WRITE_PRIM_OVERFLOW | Write the PRIM_RAND_ENTRY to the location pointed to by the PRIM_RAND_LOCATION pointer. | PRAND_ADD_ENTRY |

TABLE DC

GET_NEW_MULT_ENTRY - Process Description

| | |
|---|---|
| Process Name | GET_NEW_MULT_ENTRY |
| Process Function | This Process is called to search through the Multiple Entry Structure and to find and tag a specific Multiple Entry as being used, and to provide the index to the Multiple Entry. |

TABLE DC-continued

GET_NEW_MULT_ENTRY - Process Description

| | |
|---|---|
| Return Value(s) | TEMP_COUNT {Multiple Entry Index} |
| Required Inputs | PRIM_RAND_EQ_NUM |
| | PRIM_RAND_TABLE_BASE |
| | PRIM_RAND_LENGTH |
| | MULT_VALID_OFFSET |
| Modified Registers (This Process) | TEMP_POINTER0 |
| | TEMP_POINTER1 |
| | TEMP_VALUE0 |
| | TEMP_VALUE1 |
| | TEMP_ENCODE0 |
| | TEMP_ENCODE1 |
| | TEMP_COUNT |
| Modified Registers (Sub-Processes) | N/A |
| Error Conditions | none |

TABLE DE

GET_NEW_MULT_ENTRY - Process Implementation

| | | |
|---|---|---|
| GET_NEW_MULT_ENTRY | Calculate the location for the first multiple entry super block entry.<br>TEMP_POINTER0= PRIM_RAND_TABLE_BASE+ PRIM_RAND_EQ_NUM*PRIM_RAND_LENGTH+ MULT_VALID_OFFSET+64<br>Set TEMP_COUNT=0 to signify that the sytstem is looking at the First Multiple Entry Super Block. | READ_MULT_SUP_BLOCK |
| READ_MULT_SUP_BLOCK | Read the value pointed to by TEMP_POINTER0, and store it in the TEMP_VALUE0 location. | CHECK_AVAIL_SUP_BLOCK |
| CHECK_AVAIL_SUP_BLOCK | Run the TEMP_VALUE0 through a 16 bit priority encoder to report back the lowest location with a 0.<br>TEMP_ENCODE0=(5 Bit Encoded Version from 0–15, with 16 being a no un-used value location.) | |
| | If TEMP_ENCODE0[4]=0 | CALC_SUB_BLOCK_PTR |
| | If TEMP_ENCODE0[4]=1 and TEMP_COUNT<3 | INCREMENT_SUP_BLOCK |
| | If TEMP_ENCODE0[4]=1 and TEMP_COUNT>=3 | FIND_MULT_ERROR |
| INCREMENT_SUP_BLOCK | TEMP_COUNT=TEMP_COUNT+1<br>TEMP_POINTER0=TEMP_POINTER0+1 | READ_MULT_SUP_BLOCK |
| CALC_SUB_BLOCK_PTR | TEMP_POINTER1 will now be set to point to the sub-block location that stores information regarding 16 pair entries.<br>TEMP_POINTER1= PRIM_RAND_TABLE_BASE+ PRIME_RAND_EQ_NUM*PRIM_RAND_LENGTH+ MULT_VALID_OFFSET+ TEMP_COUNT*16+TEMP_ENCODE0[3:0] | READ_MULT_SUB_BLOCK |
| READ_MULT_SUB_BLOCK | Calculate upper 6 bits of the 10 bit Multiple Entry Index, and store them in TEMP_COUNT:<br>TEMP_COUNT=(TEMP_COUNT*16+ TEMP_ENCODE0[3:0]) <<4<br>The value stored at the location pointed to by TEMP_POINTER1 should be placed in TEMP_VALUE1 | GET_MULT_LOCATION |
| GET_MULT_LOCATION | Run TEMP_VALUE1 through a 16 bit priority encoder to report back the lowest location with a 0.<br>TEMP_ENCODE1=(5 Bit Encoded Version from 0–15, with 16 being a no un-used value location.) | |
| | If TEMP_ENCODE1[4]=0 {There is an un-used pair} | CALC_MULT_USED |
| | If TEMP_ENCODE1[4]=1 {There are no | FIND_MULT_ERROR |

TABLE DE-continued

GET_NEW_MULT_ENTRY - Process Implementation

| | | |
|---|---|---|
| | un-used multiple entry locations, and something has gone wrong with the system} | |
| CALC_MULT_USED | This section is used to calculate the new multiple entry index to return to the user.<br>TEMP_COUNT=TEMP_COUNT+TEMP_ENCODE1[3:0]<br>Run TEMP_ENCODE1[3:0] through a 4 bit decoder to differentiate the location which is being used. OR this value with TEMP_VALUE1 and store it back into TEMP_VALUE1. | STORE_MULT_USED |
| STORE_MULT_USED | Write TEMP_VALUE1 to the location pointed to by TEMP_POINTER1. | CHECK_SUPERBLOCK |
| CHECK_SUPERBLOCK | The TEMP_VALUE1 needs to be checked to see whether there are any available locations remaining. If there are not any, then the Upper BLOCK needs to be modified.<br>Run TEMP_VALUE1 through a 16 bit priority encoder to report back the lowest location with a 0.<br>TEMP_ENCODE1=(5 Bit Encoded Version from 0–15, with 16 being a no un-used value location.) | |
| | If TEMP_ENCODE1[4]=0 {Unused locations remain} | CALC_MULT_PTR |
| | If TEMP_ENCODE1[4]=1 {No Unused locations remain} | CALC_MULT_SUPER_BLOCK |
| CALC_MULT_SUPERBLOCK | At this point, the sub-block of 16 multiple entries is full. Therefore the bit in the super-block needs to be set to signify that there is no room for that sub-block.<br>Run TEMP_ENCODE0[3:0] through a 4 bit decoder to differentiate the location which is being used. OR this value with TEMP_VALUE0. | CLEAR_MULT_SUPER_BLOCK |
| CLEAR_MULT_SUPERBLOCK | Write TEMP_VALUE0 into the location pointed to by the TEMP_POINTER0 pointer. This modifies the super-block to indicate that all of the sub-blocks are used. | FM_IDLE |
| FIND_MULT_ERROR | There has been an error in trying to find an available multiple entry. This will be set in a status register, and then the system will interrupt that there is an error. | FM_IDLE |

TABLE DF

PRAND_SUB_ENTRY - Process Description

| | |
|---|---|
| Process Name | PRAND_SUB_ENTRY |
| Process Function | This process is used to remove an entry from a primary randomizer Table for a single Equation. |
| Return Value(s) | |
| Required Inputs | PRIM_RAND_TABLE_BASE<br>PRIM_RAND_EQ_NUM<br>PRIM_RAND_LENGTH<br>PRIM_RAND_VALUE<br>INPUT_DATA_NUMBER<br>SEC_RAND_VALUE |
| Modified Registers (This Process) | PRIM_RAND_LOCATION<br>PRIM_RAND_ENTRY<br>TEMP_VALUE0<br>TEMP_POINTER0<br>TEMP_COUNT<br>USER_WRITE_INPUT_NUMBER |
| Modified Registers (Sub-Processes) | IDENTIFY_MULT_INPUT returns TEMP_COUNT |
| Error Conditions | none |

TABLE DG

PRAND_SUB_ENTRY - Process Description

| STATE NAME | ACTIVITY | NEXT STATE |
|---|---|---|
| PRAND_SUB_ENTRY | There needs to be a process to process handshake to start this off. | START_PROCESS |
| | Otherwise | PRAND_SUB_ENTRY |
| START_PROCESS | The system needs to generate the pointer into the primary randomizer Table for the Input that is being removed PRIM_RAND_LOCATION = PRIM_RAND_TABLE_BASE+ PRIM_RAND_EQ_NUM*PRIM_RAND_LENGTH+ 2*PRIM_RAND_VALUE | GET_TABLE_ENTRY |
| GET_TABLE_ENTRY | Get the value from SRAM that is pointed to by PRIM_RAND_LOCATION, and store it in PRIM_RAND_ENTRY. | EVALUATE_ENTRY |
| EVALUATE_ENTRY | Evaluate PRIM_RAND_ENTRY Bits[15:12] to see what the previous entry consisted of. In the case of Overflows, the system must also look at PRIM_RAND_ENTRY[6:5] to determine how many exist. | |
| | If Bits[15:14]='00' (No Existing Entry) | REMOVE_PR_ERROR |
| | If Bits[15:14]='01' (Existing Single Entry) | REMOVE_SINGLE |
| | If Bits[15:14]='10' (Existing Pair Entry) | REMOVE_PAIR |
| | If Bits[15:12]='1100' (Existing Triple Entry) | REDUCE_MULT_ENTRY |
| | If Bits[15:12]='1101' (Existing quadruple Entry) | REDUCE_MULT_ENTRY |
| | If Bits[15:12]='1110' (Existing Overflow Entry) | REDUCE_MULT_ENTRY |
| | If Bits[15:12]='1111' (Single Mask Entry) | REMOVE_SINGLE |
| REMOVE_PR_ERROR | Interrupt the System and indicate through a status register that an attempt has been made to remove a value that did not exist. | PRAND_SUB_ENTRY |

TABLE DH

Path to Remove a Single Entry

| | | |
|---|---|---|
| REMOVE_SINGLE | Analyze PRIM_RAND_ENTRY | |
| | If NEXT_MASK_STEP!=0 (Existing Masking Step) | CLEAR_SINGLE |
| | If Bits[15:12]='1111' && Bits[4:0]=NEXT_MASK_STEP TEMP_VALUE0=0 {Prepare for clear} | |
| | If NEXT_MASK_STEP=0 (Existing Non-Masking Step) | REMOVE_PR_ERROR |
| | If Bits[15:12]=='1111' && Bits[4:0]!=NEXT_MASK_STEP | |
| | If NEXT_MASK_STEP=0 (Existing Non-Masking Step) | CLEAR_SINGLE |
| | If Bits[15:14]='01' && Bits[13:0]=INPUT_DATA_NUMBER TEMP_VALUE0=0 {Prepare for clear} | |
| | If NEXT_MASK_STEP=0 (Existing Non-Masking Step) | REMOVE_PR_ERROR |
| | If Bits[15:14]='01' && Bits[13:0]!=INPUT_DATA_NUMBER | |
| CLEAR_SINGLE | Write a TEMP_VALUE0 into the location pointed to by PRIME_RAND_LOCATION | PRAND_SUB_ENTRY |
| REMOVE_SING_ERROR | Set an interrupt, and a status bit in register to show that there was an error in finding an input in the primary randomizer | PRAND_SUB_ENTRY |

TABLE DI

Path to Remove one of the Entries of a Pair in a Multiple Entry Structure

| | | |
|---|---|---|
| REMOVE_PAIR_ENTRY | IDENTIFY_MULT_INPUT (MACRO CALL) This is a Macro that uses the PRIM_RAND_ENTRY and either an input | GET_REMAINING_ENTRY |

TABLE DI-continued

Path to Remove one of the Entries of a Pair in a Multiple Entry Structure

| | | |
|---|---|---|
| | or a mask value, to identify the location in the pair table that matches and should be eliminated. TEMP_POINTER0 points to base of the Multiple Entry | |
| GET_REMAINING_ENTRY | If TEMP_COUNT=8, There was an error, and neither input should be copied over. | PRAND_SUB_ENTRY |
| | If TEMP_COUNT=0 read the value at TEMP_POINTER0+5 and store it in TEMP_VALUE0 | MODIFY_INPUT_VALUE |
| | If TEMP_COUNT=1 read the value at TEMP_POINTER0+4 and store it in TEMP_VALUE0 | MODIFY_INPUT_VALUE |
| MODIFY_INPUT_VALUE | At this point, TEMP_VALUE0 needs to be changed so that it can be written back into the PRIMARY_TABLE. If TEMP_VALUE0[15]=1 {This is a mask value} Set TEMP_VALUE0[15:12]='1111' The remainder of the word is correct. If TEMP_VALUE[15]=0 {This is a non-mask value} Set TEMP_VALUE0[15:14]='01'. The remainder of the word is correct. | WR_PRIM_INPUT |
| WR_PRIM_INPUT | Write TEMP_VALUE0 back into the location that is pointed to by PRIM_RAND_LOCATION. | GET_REMAINING_SR |
| GET_REMAINING_SR | If TEMP_COUNT=0 read the value at location TEMP_POINTER0+1 and store it in TEMP_VALUE0 | WR_PRIM_SR |
| | If TEMP_COUNT=1, Read the value located at TEMP_POINTER0 and store it in TEMP_VALUE0 | WR_PRIM_SR |
| WR_PRIM_SR | Write TEMP_VALUE0 into the location pointed to by PRIM_RAND_LOCATION+1 TEMP_VALUE0=PRIM_RAND_ENTRY[9:0] | CLEAR_MULT_VALID |
| CLEAR_MULT_VALID | CLEAR_MULT_ENTRY (MACRO CALL) TEMP_VALUE0 must contain the number of the pair that is to be cleared. | PRAND_SUB_ENTRY |

TABLE DJ

Path to Reduce a Multiple Input

| | | |
|---|---|---|
| REDUCE_MULT_ENTRY | IDENTIFY_MULT_INPUT (MACRO CALL) This Macro is passed a PRIM_RAND_ENTRY, and is used to identify the position in the Multiple Entry table location where a specific Input or Mask Step is located. TEMP_COUNT Return Values: 0=First Location in Multiple Entry Table 1=Second Location in Multiple Entry Table 2=Third Location in Multiple Entry Table 3=Fourth Location in Multiple Entry Table 4=First Overflow Location in Multiple Entry Table 5=Second Overflow Location in Multiple Entry Table 6=Third Overflow Location in Multiple Entry Table 7=Fourth Overflow Location in Multiple Entry Table 8=ERROR CONDITION and input did not match TEMP_POINTER0 Return Value: Address of the base of the specific Multiple Entry Structure. | BR_ON_MULT_LENGTH |

TABLE DJ-continued

Path to Reduce a Multiple Input

| | | |
|---|---|---|
| BR_ON_MULT_LENGTH | The length of the Multiple structure must be dealt with. This is really contained in information in the PRIM_RAND_ENTRY. One must read the information at the end of the structure, and be prepared to write it into the location pointed to by TEMP_COUNT. Then one must be prepared to modify the primary randomizer Entry. | |
| | If PRIM_RAND_ENTRY[15:10]='1100XX' {Triple} | RD_IN3_SR |
| | If PRIM_RAND_ENTRY[15:10]='1101XX' {quadruple} | RD_IN4_SR |
| | If PRIM_RAND_ENTRY[15:10]='111001' {1 Overflow} | GEN_QUAD |
| | If PRIM_RAND_ENTRY[15:10]='111010' {2 Overflow} | RD_IN6 |
| | If PRIM_RAND_ENTRY[15:10]='111011' {3 Overflow} | RD_IN7 |
| | If PRIM_RAND_ENTRY[15:10]='111000' {4 Overflow} | RD_IN8 |
| RD_IN3_SR | Read the Input 3 secondary randomizer value from the multiple structure at location TEMP_POINTER0+2 and store it in TEMP_VALUE0 | WR_IN3_SR |
| WR_IN3_SR | Write TEMP_VALUE0 into the location pointed to by TEMP_POINTER0+TEMP_COUNT to fill in the input that is being removed. | RD_IN3_INPUT |
| RD_IN3_INPUT | Read the Input 3 Input Value from the multiple structure at location (TEMP_POINTER0+6) and store it in TEMP_VALUE0 | WR_IN3_INPUT |
| WR_IN3_INPUT | Write TEMP_VALUE0 into the location pointed to by (TEMP_POINTER0+4+TEMP_COUNT) | CALC_PAIR_PR |
| CALC_PAIR_PR | Calculate the new primary randomizer value for the new Pair. PRIM_RAND_ENTRY[9:0]=PRIM_RAND_ENTRY[9:0] PRIM_RAND_ENTRY[15:10]='100000' {Pair is stored} | WR_NEW_PR |
| RD_IN4_SR | Read the Input 4 secondary randomizer value from the multiple structure at location TEMP_POINTER0+3 and store it in TEMP_VALUE0 | WR_IN4_SR |
| WR_IN4_SR | Write TEMP_VALUE0 into the location pointed to by TEMP_POINTER0+TEMP_COUNT to fill in the input that is being removed. | RD_IN4_INPUT |
| RD_IN4_INPUT | Read the Input 4 Input Value from the multiple structure at location (TEMP_POINTER0+7) and store it in TEMP_VALUE0 | WR_IN4_INPUT |
| WR_IN4_INPUT | Write TEMP_VALUE0 into the location pointed to by (TEMP_POINTER0+4+TEMP_COUNT) | CALC_TRIP_PR |
| CALC_TRIP_PR | Calculate the new primary randomizer value for the new Triple. PRIM_RAND_ENTRY[9:0]=PRIM_RAND_ENTRY[9:0] PRIM_RAND_ENTRY[15:10]='110000' {Triple is stored} | WR_NEW_PR |
| GEN_QUAD | This is the most complex path because the system must regenerate the secondary randomizer values. The inputs are the only valid cases, so the system needs to bring over the $5^{th}$ input Read the value located in TEMP_POINTER0+0 (first overflow input), and store it in TEMP_VALUE0. | WR_IN5_INPUT |
| WR_IN5_INPUT | If TEMP_COUNT<=3, then the system needs to write TEMP_VALUE0 into the location pointed to by TEMP_POINTER0+4+TEMP_COUNT Otherwise, write TEMP_VALUE0 into the location pointed to by TEMP_POINTER0+TEMP_COUNT-4 | GET_INPUT1 |

TABLE DJ-continued

Path to Reduce a Multiple Input

| | | |
|---|---|---|
| GET_INPUT1 | Read the value stored at location TEMP_POINTER0+4 (Input #1), and store it in the USER_WRITE_INPUT_NUMBER register. | CALC_INPUT1_SR |
| CALC_INPUT1_SR | Call the Macro to read back the first input into the input register: Call USER_INPUT_READ_DRAM Macro | WR_INPUT1_SR |
| WR_INPUT1_SR | Write the SEC_RAND_VALUE into the location pointed to by TEMP_POINTER0 | GET_INPUT2 |
| GET_INPUT2 | Read the value stored at location TEMP_POINTER0+5 (Input #2), and store it in the USER_WRITE_INPUT_NUMBER register. | CALC_INPUT2_SR |
| CALC_INPUT2_SR | Call the Macro to read back the first input into the input register: Call USER_INPUT_READ_DRAM Macro | WR_INPUT2_SR |
| WR_INPUT2_SR | Write the SEC_RAND_VALUE into the location pointed to by TEMP_POINTER0+1 | GET_INPUT3 |
| GET_INPUT3 | Read the value stored at location TEMP_POINTER0+6 (Input #3), and store it in the USER_WRITE_INPUT_NUMBER register. | CALC_INPUT3_SR |
| CALC_INPUT3_SR | Call the Macro to read back the first input into the input register: Call USER_INPUT_READ_DRAM Macro | WR_INPUT3_SR |
| WR_INPUT3_SR | Write the SEC_RAND_VALUE into the location pointed to by TEMP_POINTER0+2 | GET_INPUT4 |
| GET_INPUT4 | Read the value stored at location TEMP_POINTER0+7 (Input #4), and store it in the USER_WRITE_INPUT_NUMBER register. | CALC_INPUT4_SR |
| CALC_INPUT4_SR | Call the Macro to read back the first input into the input register: Call USER_INPUT_READ_DRAM Macro | WR_INPUT4_SR |
| WR_INPUT4_SR | Write the SEC_RAND_VALUE into the location pointed to by TEMP_POINTER0+3 | CALC_QUAD_PR |
| CALC_QUAD_PR | Calculate the new primary randomizer value for the new quadruple. PRIM_RAND_ENTRY[9:0]=PRIM_RAND_ENTRY[9:0] PRIM_RAND_ENTRY[15:10]='110100' {Quad is stored} | WR_NEW_PR |
| RD_IN6 | In this case, there are two overflows, and the system needs to read the top value. Read the value pointed to be TEMP_POINTER0+1 ($2^{nd}$ overflow input) and store it in TEMP_VALUE0 | WR_IN6_INPUT |
| WR_IN6_INPUT | Based on TEMP_COUNT, there are two possibilities as to where the system will write TEMP_VALUE0. If TEMP_COUNT<=3, write TEMP_VALUE0 into the location pointed to by TEMP_POINTER0+TEMP_COUNT+4. If TEMP_COUNT>3, write TEMP_VALUE0 into the location pointed to by TEMP_POINTER0+TEMP_COUNT−4 | CALC_OVER1_PR |
| CALC_OVER1_PR | Calculate the new primary randomizer value for the new Single Overflow value. PRIM_RAND_ENTRY[9:0]=PRIM_RAND_ENTRY[9:0] PRIM_RAND_ENTRY[15:10]='111001' {Over1 is stored} | WR_NEW_PR |
| RD_IN7 | In this case, there are three overflows, and the system needs to read the top value. Read the value pointed to be TEMP_POINTER0+2 ($3^{rd}$ overflow input) and store it in TEMP_VALUE0 | WR_IN7_INPUT |
| WR_IN7_INPUT | Based on TEMP_COUNT, there are two possibilities as to where the system will write TEMP_VALUE0. If TEMP_COUNT<=3, write TEMP_VALUE0 into the location pointed to by TEMP_POINTER0+4+TEMP_COUNT. If TEMP_COUNT>3, write TEMP_VALUE0 into the location pointed to by TEMP_POINTER0+TEMP_COUNT | CALC_OVER2_PR |

TABLE DJ-continued

Path to Reduce a Multiple Input

| | | |
|---|---|---|
| CALC_OVER2_PR | Calculate the new primary randomizer value for the new Double Overflow value. PRIM_RAND_ENTRY[9:0]=PRIM_RAND_ENTRY[9:0] PRIM_RAND_ENTRY[15:10]='111010' {Over2 is stored} | WR_NEW_PR |
| RD_IN8 | In this case, there are four overflows, and the system needs to read the top value. Read the value pointed to be TEMP_POINTER0+3 (4$^{th}$ overflow input) and store it in TEMP_VALUE0 | WR_IN8_INPUT |
| WR_IN8_INPUT | Based on TEMP_COUNT, there are two possibilities as to where the system will write TEMP_VALUE0. If TEMP_COUNT<=3, write TEMP_VALUE0 into the location pointed to by TEMP_POINTER0+4+TEMP_COUNT. If TEMP_COUNT>3, write TEMP_VALUE0 into the location pointed to by TEMP_POINTER0+TEMP_COUNT | CALC_OVER3_PR |
| CALC_OVER3_PR | Calculate the new primary randomizer value for the new Double Overflow value. PRIM_RAND_ENTRY[9:0]=PRIM_RAND_ENTRY[9:0] PRIM_RAND_ENTRY[15:10]='111011' {Over3 is stored} | WR_NEW_PR |
| WR_NEW_PR | Write the PRIM_RAND_ENTRY value into the location pointed to by PRIM_RAND_LOCATION. | PRAND_SUB_ENTRY |

TABLE DK

CLEAR_MULT_ENTRY - Process Description

| | |
|---|---|
| Process Name | CLEAR_MULT_ENTRY |
| Process Function | This process is used to remove an entry from the Multiple Entry Table. |
| Return Value(s) | |
| Required Inputs | TEMP_VALUE0[9:0] must contain the index for the Multiple Entry Table. PRIM_RAND_TABLE_BASE PRIM_RAND_EQ_NUM PRIM_RAND_LENGTH PAIR_VALID_OFFSET |
| Modified Registers (This Process) | TEMP_POINTER0 TEMP_ENCODE0 TEMP_VALUE1 |
| Modified Registers (Sub-Processes) | |
| Error Conditions | none |

TABLE DL

CLEAR_MULT_ENTRY Process Implementation

| | | |
|---|---|---|
| CLEAR_MULT_ENTRY | TEMP_VALUE0[9:0] contains the number of the Multiple Entry location. TEMP_VALUE0[9:8] contains the number of the Super Block, TEMP_VALUE[7:4] contains the number of the sub-block, and TEMP_VALUE0[3:0] contains the location within the sub-block that needs to be decoded. TEMP_VALUE0[3:0] will be run through a 4:16 decoder, and the result will be stored in TEMP_ENCODE0. TEMP_ENCODE0 now contains a 1 in the location of the block that is being cleared out. Calculate the pointer to the multiple sub-block entry. TEMP_POINTER0= PRIM_RAND_TABLE_BASE+ PRIM_RAND_EQ_NUM*PRIM_RAND_LENGTH+ MULT_VALID_OFFSET+TEMP_VALUE0[9:4] | CALC_MULT_SUB_MOD |

TABLE DL-continued

CLEAR_MULT_ENTRY Process Implementation

| | | |
|---|---|---|
| CALC_MULT_SUB_MOD | Read the value pointed to by TEMP_POINTER0, AND it with the inverse of TEMP_ENCODE0, and store it in TEMP_VALUE1. | WRITE_MULT_SUB_MOD |
| WRITE_MULT_SUB_MOD | Write the value in TEMP_VALUE1 into the location pointed to by TEMP_POINTER0. | GET_MULT_SUPER_PTR |
| GET_MULT_SUPER_PTR | At this point, the system needs to get the pointer location for the Pair Super block that is being cleared out. TEMP_POINTER0= PRIM_RAND_TABLE_BASE+ PRIM_RAND_EQ_NUM*PRIM_RAND_LENGTH+ PAIR_VALID_OFFSET+64+ TEMP_VALUE0[9:8] The system needs to calculate the bit in the Super Block that needs to be cleared simultaneously. TEMP_VALUE0[7:4] contains the encoded value. TEMP_VALUE0[7:4] needs to be run through a 4:16 decoder, and the resulting value needs to be stored in TEMP_ENCODE0. | GET_MULT_SUPER |
| GET_MULT_SUPER | Read the value pointed to by TEMP_POINTER0, and AND it with the inverse of TEMP_ENCODE0, and store it in TEMP_VALUE1. | MOD_MULT_SUPER |
| MOD_MULT_SUPER | Write the value in TEMP_VALUE1 into the location pointed to by TEMP_POINTER0. | END_MACRO |

TABLE DM

IDENTIFY_MULT_INPUT - Process Description

| | |
|---|---|
| Process Name | IDENTIFY_MULT_INPUT |
| Process Function | This Macro is passed a PRIM_RAND_ENTRY, and is used to identify the position in the Multiple Entry table location where a specific Input or Mask Step is located. |
| Return Value(s) | The Location in the Pair Table where the specific Input or Mask Step is located is returned in TEMP_COUNT. TEMP_COUNT Return Values: 0=First Location in Multiple Entry Table 1=Second Location in Multiple Entry Table 2=Third Location in Multiple Entry Table 3=Fourth Location in Multiple Entry Table 4=First Overflow Location in Multiple Entry Table 5=Second Overflow Location in Multiple Entry Table 6=Third Overflow Location in Multiple Entry Table 7=Fourth Overflow Location in Multiple Entry Table 8=ERROR CONDITION and input did not match TEMP_POINTER0 Return Value: Address of the base of the specific Multiple Entry Structure. |
| Required Inputs | PRIM_RAND_ENTRY - This register must contain the value from the table that has the Multiple Entry Pointer. MASKING_ON/OFF - This bit status is required. INPUT_DATA_NUMBER - This register contains the value of the Input being compared and is required if MASKING_ON/OFF=0. NEXT_MASK_STEP - This register contains the next masking step that is to be taken, and is required if MASKING_ON/OFF=1. PRIM_RAND_TABLE_BASE PRIM_RAND_EQ_NUM PRIM_RAND_LENGTH PAIR_TABLE_OFFSET are all values that are required to access the Pair location. |
| Modified Registers | TEMP_COUNT {Return Value} TEMP_POINTER0 {Return Value} TEMP_VALUE0 |
| Error Conditions | TEMP_COUNT=0, and Interrupt is Generated. |

TABLE DN

| | IDENTIFY_MULT_INPUT - Process Implementation | |
|---|---|---|
| IDENTIFY_MULT_INPUT | The PRIM_RAND_ENTRY contains the value that has been read from the primary Randomization Table.<br>TEMP_COUNT=0 {This is the return value for the matching input in the triple structure}<br>PRIM_RAND_ENTRY Bits[9:0] contain the number of the Multiple Entry structure that is being used.<br>Calculate the location for the first multiple entry block location.<br>TEMP_POINTER0=<br>PRIM_RAND_TABLE_BASE+<br>PRIM_RAND_EQ_NUM*PRIM_RAND_LENGTH+<br>MULT_TABLE_OFFSET+<br>PRIM_RAND_ENTRY[9:0]*8 | GET_NEXT_MULT_INPUT |
| GET_NEXT_MULT_INPUT | If PRIM_RAND_ENTRY[15:14]=='10' {Pair} && TEMP_COUNT>1 | MULT_CHECK_ERROR |
| | Else if PRIM_RAND_ENTRY[15:12]=='1100' {Triple} && TEMP_COUNT>2 | MULT_CHECK_ERROR |
| | Else if PRIM_RAND_ENTRY[15:12]=='1101' {Quad} && TEMP_COUNT>3 | MULT_CHECK_ERROR |
| | Else If PRIM_RAND_ENTRY[15:10]=='111001' {Single Overflow} && TEMP_COUNT>4 | MULT_CHECK_ERROR |
| | Else if PRIM_RAND_ENTRY[15:10]='111010' {Double Overflow} && TEMP_COUNT>5 | MULT_CHECK_ERROR |
| | Else if PRIM_RAND_ENTRY[15:10]='111011' {Triple Overflow} && TEMP_COUNT>6 | MULT_CHECK_ERROR |
| | Else If PRIM_RAND_ENTRY[15:10]='111000' {quadruple Overflow} && TEMP_COUNT>7 | MULT_CHECK_ERROR |
| | If TEMP_COUNT<4, Get the data stored at location TEMP_POINTER0+TEMP_COUNT+4 and put it into TEMP_VALUE0<br>Else, Get the data stored at location TEMP_POINTER0+TEMP_COUNT-4 and put it into TEMP_VALUE0 | CHECK_NEXT_MULT_INPUT |
| CHECK_NEXT_MULT_INPUT | If NEXT_MASK_STEP!=0 && TEMP_VALUE0[15]==1 && TEMP_VALUE0[4:0]==NEXT_MASK_STEP | IDLE |
| | If NEXT_MASK_STEP!=0 && (TEMP_VALUE0[15]!=1 || TEMP_VALUE0[4:0]!=NEXT_MASK_STEP)<br>TEMP_COUNT=TEMP_COUNT+1 | GET_NEXT_MULT_INPUT |
| | If NEXT_MASK_STEP==0 && TEMP_VALUE0[15]==0 && TEMP_VALUE0[13:0]=PRIM_RAND_INPUT | IDLE |
| | If NEXT_MASK_STEP==0 && (TEMP_VALUE0[15]!=0 || TEMP_VALUE0[13:0]!=PRIM_RAND_INPUT)<br>TEMP_COUNT=TEMP_COUNT+1 | GET_NEXT_MULT_INPUT |
| MULT_CHECK_ERROR | Set an interrupt that an input is being checked, and it is not stored in the corresponding pair. The status register should identify this situation.<br>TEMP_COUNT=8 to show error. | IDLE |

TABLE DO

| RECEIVE_PROCESS_CYCLE - Process Description ||
|---|---|
| Process Name | RECEIVE_PROCESS_CYCLE |
| Process Function | This process performs a sequence of cycles of analysis on a received Primary and Secondary Randomizer value to determine the associated Input. This process relies on Time Accelerated Randomizer values and Mask Capture Data all being captured prior to it's start. The PROG_MASK_PRIM_RAND value is a latched value of PROG_MASK_RX at any given step in the cycle, and is used in determining whether there is a matching entry in the appropriate equation table. The PROG_MASK_SEC_RAND value is a latched value of PROG_MASK_RX at any given step in the cycle, and is used to verify the input, and to differentiate between multiple inputs. If Masking Steps are used, the SELECTIVE_MASK_SELECT register is updated, and the core cycle is repeated. |
| Return Value(s) | INPUT MATCH |
| Required Inputs | PROG_MASK_PRIM_RAND {Output from the Programmable Mask State Machine at a given step in the analysis process} PROG_MASK_SEC_RAND {Output from the Programmable Mask State Machine at a given step in the analysis process} SELECTIVE_MASK_SELECT {Starts at 0 for first analysis step} PRIM_RAND_ENTRY - This register must contain the modified Primary Randomizer Value. PRIM_RAND_TABLE_BASE PRIM_RAND_EQ_NUM PRIM_RAND_LENGTH MULT_TABLE_OFFSET are all values that are required to access the Multiple Table. |
| Modified Registers | TEMP_COUNT {Return Value} TEMP_POINTER0 {Return Value} TEMP_VALUE0 |
| Error Conditions | NO_INPUT_MATCH is found. |

TABLE DP

| RECEIVE_PROCESS_CYCLE - Process Implementation |||
|---|---|---|
| RECEIVE_PROCESS_CYCLE | {Generate the address of the appropriate table entry that is being pointed to by the Programmably Masked Primary Randomizer value.} PRIM_RAND_LOCATION= PRIM_RAND_TABLE_BASE+ PRIM_RAND_EQ_NUM*PRIM_RAND_LENGTH+ 2*PROG_MASK_PRIM_RAND | READ_FIRST_LOCATION |
| READ_FIRST_LOCATION | The SRAM value at address PRIM_RAND_LOCATION will be loaded into PRIM_RAND_ENTRY | EVALUATE_TYPE |
| EVALUATE_TYPE | Evaluate B15, B14, B13, B12 of the PRIM_RAND_ENTRY to see what the Entry consists of. | |
| | If B15=0, B14=0 (No Existing Entry) | ERROR_NO_MATCH |
| | If B15=0, B14=1 (Existing Single Entry) INPUT_MATCH=PRIM_RAND_ENTRY[13:0] PRIM_RAND_LOCATION++ {To prepare to retrieve the Secondary Randomizer value} | READ_SINGLE_SR |
| | If B15=1, B14=0 (Existing Pair Entry) PRIM_RAND_LOCATION= PRIM_RAND_TABLE_BASE+ PRIM_RAND_EQ_NUM*PRIM_RAND_LENGTH+ MULT_TABLE_OFFSET+PRIM_RAND_ENTRY[9:0]*8 | GET_MULT_PAIR |
| | If B15=1, B14=1, B13=0, B12=0 (Existing Triple Entry) PRIM_RAND_LOCATION= PRIM_RAND_TABLE_BASE+ PRIM_RAND_EQ_NUM*PRIM_RAND_LENGTH+ MULT_TABLE_OFFSET+PRIM_RAND_ENTRY[9:0]*8 | GET_MULT_TRIPLE |
| | If B15=1, B14=1, B13=0, B12=1 (Existing Quad Entry) PRIM_RAND_LOCATION= | GET_MULT_QUAD |

TABLE DP-continued

RECEIVE_PROCESS_CYCLE - Process Implementation

| | | |
|---|---|---|
| | PRIM_RAND_TABLE_BASE+<br>PRIM_RAND_EQ_NUM*PRIM_RAND_LENGTH+<br>MULT_TABLE_OFFSET+PRIM_RAND_ENTRY[9:0]*8 | |
| | If B15=1, B14=1, B13=1, B12=0 (Existing<br>Overflow Entry)<br>PRIM_RAND_LOCATION=<br>PRIM_RAND_TABLE_BASE+<br>PRIM_RAND_EQ_NUM*PRIM_RAND_LENGTH+<br>MULT_TABLE_OFFSET+PRIM_RAND_ENTRY[9:0]*8 | ERROR_NO_MATCH<br>{Since the actual<br>input being<br>matched can not<br>be identified} |
| | If B15=1, B14=1, B13=1, B12=1 (Single<br>Mask Entry)<br>SELECTIVE_MASK_STEP=PRIM_RAND_<br>ENTRY[4:0]<br>{Prepare to check the Secondary<br>Randomizer value}<br>PRIM_RAND_LOCATION++ | READ_MASK_SR |

TABLE DQ

Path to Evaluate a Single Entry

| | | |
|---|---|---|
| READ_SINGLE_SR<br>{Longer SRAM Access} | The SRAM value at address<br>PRIM_RAND_LOCATION will be loaded into<br>PRIM_RAND_ENTRY | EVALUATE_SR |
| EVALUATE_SR | If {PRIM_RAND_ENTRY==<br>PROG_MASK_SEC_RAND}<br>Else<br>INPUT_MATCH=0 {There is not a match} | INPUT_MATCH<br><br>ERROR_NO_MATCH |

TABLE DR

Path to Evaluate a Single Mask Entry

| | | |
|---|---|---|
| READ_MASK_SR | The SRAM value at address<br>PRIM_RAND_LOCATION will be loaded into<br>PRIM_RAND_ENTRY | EVALUATE_MASK_SR |
| EVALUATE_MASK_SR | If {PRIM_RAND_ENTRY==<br>PROG_MASK_SEC_RAND}<br>Else<br>SELECTIVE_MASK_STEP=0 | MASK_MATCH<br><br>ERROR_NO_MATCH |

TABLE DS

Path to Evaluate a Paired Entry

| | | |
|---|---|---|
| GET_MULT_PAIR | The SRAM value at address<br>PRIM_RAND_LOCATION will be loaded<br>into PRIM_RAND_ENTRY | EVALUATE_PAIR_VAL1SR |
| EVALUATE_PAIR_VAL1 | If<br>{PRIM_RAND_ENTRY==PROG_MASK_<br>SEC_RAND}<br>PRIM_RAND_LOCATION+=4 {To read the<br>value}<br>Else<br>PRIM_RAND_LOCATION++ | MATCH_PAIR_SR<br><br><br><br><br>GET_PAIR_VAL2SR |
| GET_PAIR_VAL2_SR | The SRAM value at address<br>PRIM_RAND_LOCATION will be loaded<br>into PRIM_RAND_ENTRY | EVALUATE_PAIR_VAL2SR |
| EVALUATE_PAIR_VAL2SR | If<br>{PRIM_RAND_ENTRY==PROG_MASK_<br>SEC_RAND}<br>PRIM_RAND_LOCATION+=4 {To read the<br>value}<br>Else | MATCH_PAIR_SR<br><br><br><br><br>ERROR_NO_MATCH |
| MATCH_PAIR_SR | The SRAM value at address<br>PRIM_RAND_LOCATION will be loaded<br>into PRIM_RAND_ENTRY | PAIR_VAL_OR_MASK |

TABLE DS-continued

Path to Evaluate a Paired Entry

| | | |
|---|---|---|
| PAIR_VAL_OR_MASK | If {PRIM_RAND_ENTRY[15]==0<br>INPUT_MATCH=PRIM_RAND_<br>ENTRY[13:0] | INPUT_MATCH |
| | Else<br>SELECTIVE_MASK_STEP=PRIM_RAND_<br>ENTRY[4:0] | MASK_MATCH |

TABLE DT

Path to Evaluate a Tripled Entry

| | | |
|---|---|---|
| GET_MULT_TRIPLE | The SRAM value at address PRIM_RAND_LOCATION will be loaded into PRIM_RAND_ENTRY | EVALUATE_TRIP_VAL1SR |
| EVALUATE_TRIP_VAL1SR | If {PRIM_RAND_ENTRY==PROG_MASK_SEC_RAND}<br>PRIM_RAND_LOCATION+=4 {To read the value} | MATCH_TRIP_SR |
| | Else<br>PRIM_RAND_LOCATION++ | GET_TRIP_VAL2SR |
| GET_TRIP_VAL2SR | The SRAM value at address PRIM_RAND_LOCATION will be loaded into PRIM_RAND_ENTRY | EVALUATE_TRIP_VAL2SR |
| EVALUATE_TRIP_VAL2SR | If {PRIM_RAND_ENTRY==PROG_MASK_SEC_RAND}<br>PRIM_RAND_LOCATION+=4 {To read the value} | MATCH_TRIP_SR |
| | Else<br>PRIM_RAND_LOCATION++ | GET_TRIP_VAL3SR |
| GET_TRIP_VAL3SR | The SRAM value at address PRIM_RAND_LOCATION will be loaded into PRIM_RAND_ENTRY | EVALUATE_TRIP_VAL3SR |
| EVALUATE_TRIP_VAL3SR | If {PRIM_RAND_ENTRY==PROG_MASK_SEC_RAND}<br>PRIM_RAND_LOCATION+=4 {To read the value} | MATCH_TRIP_SR |
| | Else | ERROR_NO_MATCH |
| MATCH_TRIP_SR | The SRAM value at the address PRIM_RAND_LOCATION will be loaded into PRIM_RAND_ENTRY | TRIP_VAL_OR_MASK |
| TRIP_VAL_OR_MASK | If {PRIM_RAND_ENTRY[15]==0<br>INPUT_MATCH=PRIM_RAND_ENTRY[13:0] | INPUT_MATCH |
| | Else<br>SELECTIVE_MASK_STEP=PRIM_RAND_<br>ENTRY[4:0] | MASK_MATCH |

TABLE DU

Path to Evaluate a Quadrupled Entry

| | | |
|---|---|---|
| GET_MULT_QUAD | The SRAM value at address PRIM_RAND_LOCATION will be loaded into PRIM_RAND_ENTRY | EVALUATE_QUAD_VAL1SR |
| EVALUATE_QUAD_VAL1SR | If {PRIM_RAND_ENTRY==PROG_MASK_SEC_RAND}<br>PRIM_RAND_LOCATION+=4 {To read the value} | MATCH_QUAD_SR |
| | Else<br>PRIM_RAND_LOCATION++ | GET_QUAD_VAL2SR |
| GET_QUAD_VAL2SR | The SRAM value at address PRIM_RAND_LOCATION will be loaded into PRIM_RAND_ENTRY | EVALUATE_QUAD_VAL2SR |
| EVALUATE_QUAD_VAL2SR | If {PRIM_RAND_ENTRY==PROG_MASK_SEC_RAND}<br>PRIM_RAND_LOCATION+=4 {To read the value} | MATCH_QUAD_SR |
| | Else<br>PRIM_RAND_LOCATION++ | GET_QUAD_VAL3SR |

TABLE DU-continued

Path to Evaluate a Quadrupled Entry

| | | |
|---|---|---|
| GET_QUAD_VAL3SR | The SRAM value at address PRIM_RAND_LOCATION will be loaded into PRIM_RAND_ENTRY | EVALUATE_QUAD_VAL3SR |
| EVALUATE_QUAD_VAL3SR | If {PRIM_RAND_ENTRY==PROG_MASK_SEC_RAND} PRIM_RAND_LOCATION+=4 {To read the value} | MATCH_QUAD_SR |
| | Else PRIM_RAND_LOCATION++ | GET_QUAD_VAL4SR |
| GET_QUAD_VAL4SR | The SRAM value at address PRIM_RAND_LOCATION will be loaded into PRIM_RAND_ENTRY | EVALUATE_QUAD_VAL4SR |
| EVALUATE_QUAD_VAL4SR | If {PRIM_RAND_ENTRY==PROG_MASK_SEC_RAND} PRIM_RAND_LOCATION+=4 {To read the value} | MATCH_QUAD_SR |
| | Else | ERROR_NO_MATCH |
| MATCH_QUAD_SR | The SRAM value at the address PRIM_RAND_LOCATION will be loaded into PRIM_RAND_ENTRY | QUAD_VAL_OR_MASK |
| QUAD_VAL_OR_MASK | If {PRIM_RAND_ENTRY[15]==0 INPUT_MATCH=PRIM_RAND_ENTRY[13:0] | INPUT_MATCH |
| | Else SELECTIVE_MASK_STEP=PRIM_RAND_ENTRY[4:0] | MASK_MATCH |

TABLE DV

Final Processing steps for all Primary Randomizer Situations

| | | |
|---|---|---|
| MASK_MATCH | Set RANDOMIZER_SELECT=0 for the Masking State Machine to generate a new Programmably Masked Primary Randomizer value. | LATCH_NEW_PR |
| LATCH_NEW_PR | Latch new PROG_MASK_PRIM_RAND value Set RANDOMIZER_SELECT=1 for the Masking State Machine to generate a new Programmably Masked Secondary Randomizer value. | LATCH_NEW_SR |
| LATCH_NEW_SR | Latch new PROG_MASK_SEC_RAND value | RECEIVE_PROCESS_CYCLE |
| INPUT_MATCH | Interrupt the host that an input match has occurred. | END_PROCESS |
| ERROR_NO_MATCH | Interrupt the host that an error condition has occurred, and that no input match has been found. | END_PROCESS |

State Machines for the "Mapper Engine, Statistics and Equation State Machine" Block The following state machines are used to manage the mapper engine, statistic, and equation selection and calculation functions of the system (see Tables DW–EI below).

TABLE DW

INITIALIZE_ONE_EQ - Process Description

| | |
|---|---|
| Process Name | INITIALIZE_ONE_EQ |
| Process Function | This process is used to Initialize a single equation and all of it's associated statistics registers. |
| Return Value(s) | |
| Required Inputs | RAND_INIT_EQ {Contains the equation to be updated} |

TABLE DW-continued

INITIALIZE_ONE_EQ - Process Description

| | |
|---|---|
| Modified Registers (This Process) | EQn_TRIPS EQn_QUADS EQn_MULTS EQn_OVERFLOW |
| Modified Registers (Sub-Processes) | RAND_INIT |
| Error Conditions | none |

TABLE DX

INITIALIZE_ONE_EQ - Process Implementation

| STATE NAME | ACTIVITY | NEXT STATE |
| --- | --- | --- |
| INITIALIZE_ONE_EQ | If the Main Control Directs this process to start. RAND_INIT_EQ contains the equation to be updated. | INITIALIZE |
| | Else | INITIALIZE_ONE_EQ |
| INITIALIZE | Call the Macro to clear out the randomizer Tables. | RAND_INIT |
| RAND_INIT | Macro Call to clear out randomizers. | CLEAR_COUNTERS |
| CLEAR_COUNTERS | Case RAND_INIT_EQ | |
| | Case 0 EQ0_TRIPS=0 EQ0_QUADS=0 EQ0_MULTS=0 EQ0_OVERFLOW=0 | IDLE |
| | Case 1 EQ1_TRIPS=0 EQ1_QUADS=0 EQ1_MULTS=0 EQ1_OVERFLOW=0 | IDLE |
| | Case 2 EQ2_TRIPS=0 EQ2_QUADS=0 EQ2_MULTS=0 EQ2_OVERFLOW=0 | IDLE |
| | Case 3 EQ3_TRIPS=0 EQ3_QUADS=0 EQ3_MULTS=0 EQ3_OVERFLOW=0 | IDLE |
| | Case 4 EQ4_TRIPS=0 EQ4_QUADS=0 EQ4_MULTS=0 EQ4_OVERFLOW=0 | IDLE |
| | Case 5 EQ5_TRIPS=0 EQ5_QUADS=0 EQ5_MULTS=0 EQ5_OVERFLOW=0 | IDLE |
| | Case 6 EQ6_TRIPS=0 EQ6_QUADS=0 EQ6_MULTS=0 EQ6_OVERFLOW=0 | IDLE |
| | Case 7 EQ7_TRIPS=0 EQ7_QUADS=0 EQ7_MULTS=0 EQ7_OVERFLOW=0 | IDLE |

TABLE DY

INITIALIZE_ALL_EQS - Process Description

| | |
| --- | --- |
| Process Name | INITIALIZE_ALL_EQS |
| Process Function | This process is used to Initialize all equations and all of their associated statistics registers. |
| Return Value(s) | |
| Required Inputs | |
| Modified Registers (This Process) | RAND_INIT_EQ EQn_TRIPS EQn_QUADS EQn_MULTS EQn_OVERFLOW |
| Modified Registers (Sub-Processes) | INITIALIZE_ONE_EQ |
| Error Conditions | none |

TABLE DZ

INITIALIZE_ALL_EQS - Process Description

| STATE NAME | ACTIVITY | NEXT STATE |
|---|---|---|
| INITIALIZE_ALL_EQS | If the Main Control Directs this process to start. | INITIALIZE |
| | Else | INITIALIZE_ALL_EQS |
| INITIALIZE | RAND_INIT_EQ=0. Call the Macro to clear out the randomizer Tables. | INIT_TABLE |
| INIT_TABLE | Macro Call to clear out randomizer and Multiple Tables | INITIALIZE_ONE_EQ |
| INITIALIZE_ONE_EQ | Macro Call to clear out randomizer and Counters | SET_MAPPINGS |
| SET_MAPPINGS | EQ[RAND_INIT_EQ]_PRIM_MAP=RAND_INIT_EQ {Sets the initial primary mapping to a value from 0 to 7 EQ[RAND_INIT_EQ]_SEC_EQ_NUM=RAND_INIT_EQ+1 {With analyzing only 3 bits so that a value of 7 will have one added to it and become 0} RAND_INIT_EQ++ | CHECK_TO_CONTINUE |
| CHECK_TO_CONTINUE | If RAND_INIT_EQ==0 {3 bit value, signifies wrapover} | IDLE |
| | Else | INIT_TABLE |

TABLE EA

ADD_INPUT_ALL_EQ - Process Description

| | |
|---|---|
| Process Name | ADD_INPUT_ALL_EQ |
| Process Function | This process is used to add an input to all equations. |
| Return Value(s) | |
| Required Inputs | |
| Modified Registers | EQ_POINTER |

TABLE EA-continued

ADD_INPUT_ALL_EQ - Process Description

| | |
|---|---|
| (This Process) | EQUATION_MAP_SELECT PRIM_RAND_EQ_NUM PRIM_RAND_VALUE SEC_RAND_VALUE |
| Modified Registers (Sub-Processes) | PRAND_ADD_ENTRY |
| Error Conditions | none |

TABLE EB

ADD_INPUT_ALL_EQ - Process Description

| STATE NAME | ACTIVITY | NEXT STATE |
|---|---|---|
| ADD_INPUT_ALL_EQ | If the Main Control Directs this process to start. {Done anytime an input is added to the system} | INITIALIZE |
| | Else | ADD_INPUT_ALL_EQ |
| INITIALIZE | Set EQ_POINTER=0 to start with the first equation. | MAP_NEXT_EQ |
| MAP_NEXT_EQ | Set EQUATION_MAP_SELECT to EQ[EQ_POINTER]_PRIM_MAP. Now the primary map value is driving the Mapper. PRIM_RAND_EQ_NUM=EQ_POINTER {To setup so that the value can be stored in the proper place.} | STORE_PRIM_RAND |
| STORE_PRIM_RAND | Latch CALC_RANDOMIZER_VALUE into the PRIM_RAND_VALUE register. Set EQUATION_MAP_SELECT to EQ[EQ_POINTER]_SEC_MAP. Now the secondary map value is driving the Mapper | STORE_SEC_RAND |
| STORE_SEC_RAND | Latch CALC_RANDOMIZER_VALUE into the SEC_RAND_VALUE register. | PRAND_ADD_ENTRY |
| PRAND_ADD_ENTRY | Call the macro to add an entry to the table. | INC_EQUATION_PTR |
| INC_EQUATION_PTR | If EQ_POINTER==7 | IDLE |
| | Else EQ_POINTER++ | MAP_NEXT_EQ |

TABLE EC

SUB_INPUT_ALL_EQ - Process Description

| | |
|---|---|
| Process Name | SUB_INPUT_ALL_EQ |
| Process Function | This process is used to subtract an input from all equations. |
| Return Value(s) | |
| Required Inputs | |
| Modified Registers (This Process) | EQ_POINTER<br>EQUATION_MAP_SELECT<br>PRIM_RAND_EQ_NUM<br>PRIM_RAND_VALUE<br>SEC_RAND_VALUE |
| Modified Registers (Sub-Processes) | PRAND_SUB_ENTRY |
| Error Conditions | none |

TABLE ED

SUB_INPUT_ALL_EQ - Process Description

| STATE NAME | ACTIVITY | NEXT STATE |
|---|---|---|
| SUB_INPUT_ALL_EQ | If the Main Control Directs this process to start. {Done anytime an input is removed from the system} | INITIALIZE |
| | Else | SUB_INPUT_ALL_EQ |
| INITIALIZE | Set EQ_POINTER=0 to start with the first equation. | SUB_NEXT_EQ |
| SUB_NEXT_EQ | Set EQUATION_MAP_SELECT to EQ[EQ_POINTER]_PRIM_MAP. Now the primary map value is driving the Mapper. PRIM_RAND_EQ_NUM=EQ_POINTER {To setup so that the value can be stored in the proper place.} | STORE_PRIM_RAND |
| STORE_PRIM_RAND | Latch CALC_RANDOMIZER_VALUE into the PRIM_RAND_VALUE register. Set EQUATION_MAP_SELECT to EQ[EQ_POINTER]_SEC_MAP. Now the secondary map value is driving the Mapper | STORE_SEC_RAND |
| STORE_SEC_RAND | Latch CALC_RANDOMIZER_VALUE into the SEC_RAND_VALUE register. | PRAND_SUB_ENTRY |
| PRAND_SUB_ENTRY | Call the macro to subtract an entry from the table. | INC_EQUATION_PTR |
| INC_EQUATION_PTR | If EQ_POINTER==7<br>Else EQ_POINTER++ | IDLE<br>SUB_NEXT_EQ |

TABLE EE

UPDATE_DISABLED_EQS - Process Description

| | |
|---|---|
| Process Name | UPDATE_DISABLED_EQS |
| Process Function | This process is used to bring all inputs back into the Input Register and map them through all of the disabled equations. |
| Return Value(s) | |
| Required Inputs | |
| Modified Registers (This Process) | EQ_POINTER<br>EQn_INCOMPLETE bits.<br>RAND_INIT_EQ |
| Modified Registers (Sub-Processes) | |
| Error Conditions | none |

TABLE EF

UPDATE_DISABLED_EQS - Process Description

| STATE NAME | ACTIVITY | NEXT STATE |
|---|---|---|
| UPDATE_DISABLED_EQS | If the Main Control Directs this process to start. | INITIALIZE |
| | {Done when the equation threshold is met for having a predetermined number of un-usable equations. This value is stored in the EQ_UPDATE_THRESH register} | |
| | Else | UPDATE_DISABLED_EQS |

TABLE EG

Section to Clear out Invalid Equations and Setup New Mappings

| | | |
|---|---|---|
| INITIALIZE | Set EQ_POINTER=0 to start with the first equation. | SET_INCOMPLETE |
| SET_INCOMPLETE | If (EQ[EQ_POINTER]_DISABLE=1 {Disable} && EQ[EQ_POINTER]_AGING==255) {equation is aged out} then set EQ[EQ_POINTER]_INCOMPLETE=1 {Signifies that the equation is incomplete.} | |
| | If EQ_POINTER=7 | CLEAR_EQUATIONS |
| | Else EQ_POINTER++ | SET_INCOMPLETE |
| CLEAR_EQUATIONS | Set RAND_INIT_EQ=0 to start with the first equation. | CHECK_FOR_CLEAR |
| CHECK_FOR_CLEAR | If EQ[RAND_INIT_EQ]_INCOMPLETE=1 {Incomplete} | INIT_EQUATION |
| | Else If RAND_INIT_EQ=7 | RE_CALCULATE |
| | Else RAND_INIT_EQ++ | CHECK_FOR_CLEAR |
| INIT_EQUATION | INITIALIZE_ONE_EQ {Process to clear out and initialize the selected equation.} | CHANGE_MAPPING |
| CHANGE_MAPPING | EQ[EQ_POINTER]_PRIM_MAP+=8 {Changes the mapping for the primary equation to the present value +8} EQ[EQ_POINTER]_SEC_MAP= EQ[OPTIMAL_EQUATION]_PRIM_MAP {This uses the best remaining optimal mapping as the secondary randomizer value} | CHECK_COUNT |
| CHECK_COUNT | If RAND_INIT_EQ==7 | RE_CALCULATE |
| | Else RAND_INIT_EQ++ | CHECK_FOR_CLEAR |

TABLE EH

Section to recalculate the equations that will be updated

| | | |
|---|---|---|
| RE_CALCULATE | {The inputs need to be brought back into the system to calculate their values for the appropriate equations} Set EQ_INPUT_COUNT=0 {To start cycling through inputs at the first possible} | SET_INPUT_NUMBER |
| SET_INPUT_NUMBER | SYS_INPUT_DATA_NUMBER=EQ_INPUT_COUNT | CHECK_INPUT_VALID |
| | IF EQ_INPUT_COUNT>10000 | INPUTS_DONE |
| CHECK_INPUT_VALID | SYS_CHECK_VALID {This routine returns a "1" in the INPUT_STRUCT_VALUE register if the input is valid.} | BRANCH_VALID |
| BRANCH_VALID | If INPUT_STRUCT_VALUE==1 | GET_INPUT |
| | Else (INPUT_STRUCT_VALUE==0) EQ_INPUT_COUNT++ | SET_INPUT_NUMBER |
| GET_INPUT | SYS_INPUT_LOAD {This routine is used to load the input into the Input Register} EQ_POINTER=0 {Prepare to start cycling through to find the equations that have been disabled.} | CHECK_EQ_UPDATE |
| CHECK_EQ_UPDATE | If EQ[EQ_POINTER]_INCOMPLETE==1, then the system needs to update the equation. PRIM_RAND_EQ_NUM=EQ_POINTER {For Storage} {Setup the mapper to the primary Map EQUATION_MAP_SELECT= EQ[EQ_POINTER]_PRIM_MAP++ | MAP_PRIMARY |
| | Else, the system needs to increment and check. | INC_AND_CHECK |
| MAP_PRIMARY | PRIM_RAND_VALUE=CALC_RANDOMIZER_VALUE {Setup the mapper to the secondary Map EQUATION_MAP_SELECT= EQ[EQ_POINTER]_PRIM_SEC++ | MAP_SECONDARY |
| MAP_SECONDARY | SEC_RAND_VALUE=CALC_RANDOMIZER_VALUE | UPDATE_TABLE |
| UPDATE_TABLE | PRAND_ADD_ENTRY {This routine loads the new entry} | NEXT_EQUATION |
| NEXT_EQUATION | IF (EQ_POINTER==7) | SET_INPUT_NUMBER |

TABLE EH-continued

Section to recalculate the equations that will be updated

| | |
|---|---|
| {The system has gone through all the equations} EQ_INPUT_COUNT++ {The system needs to go to the next input.} Else EQ_POINTER++ {Prepare for the next equation} | CHECK_EQ_UPDATE |

TABLE EI

This Section Handles the Final Cleanup and Enabling of the Equations

| | | |
|---|---|---|
| INPUTS_DONE | Set EQ_POINTER=0 to start Looping | RE_ENABLE_EQ |
| RE_ENABLE_EQ | If EQ[EQ_POINTER]_INCOMPLETE==1, EQ[EQ_POINTER]_INCOMPLETE=0 {This re-enables the equation} | CHECK_LAST_EQ |
| CHECK_LAST_EQ | IF EQ_POINTER==7 Else EQ_POINTER++ | IDLE RE_ENABLE_EQ |

Process Summary

The following table lists a summary of the key processes described above.

TABLE EJ

Process Summary

| Process Name | Calling Processes | Additional Process Start Conditions | Description |
|---|---|---|---|
| INPUT_VALID_INIT | | Power On / Reset | Initializes the Input Valid Table. |
| USER_CHECK_VALID | | User Initiated | Checks to see whether an input location contains a valid entry. |
| SYS_CHECK_VALID | UPDATE_DISABLED_EQS | | System routine to see whether an input location contains a valid entry. |
| SYS_GET_AVAIL_INPUT | | System Initiated based on whether Auto Storage Location is Full. | Determines the next open location in the input structure. |
| USER_INPUT_WR_LOAD | | User Initiated | Writes a new input into the system, loads it into the Input Register, and reflects it in the Randomizer Tables. |
| USER_INPUT_WRITE | | User Initiated | Writes a new input into the system but does not load it into the Input Register and reflect it in the Randomizer Tables |
| USER_INPUT_READ | | User Inititated | Reads an input from DRAM but does not load it into the Input Register. |
| USER_INPUT_CLEAR | | User Inititated | Reads and clears an input from DRAM, loads it into |

TABLE EJ-continued

Process Summary

| Process Name | Calling Processes | Additional Process Start Conditions | Description |
| --- | --- | --- | --- |
| SYS_INPUT_LOAD | PRAND_SUB_ENTRY UPDATE_DISABLED_EQS | | the Input Register, and clears it from the Randomizer Tables. Retrieves an input from DRAM and loads it into the Input Register. |
| INIT_FORCED_MASK | | Mask Register Setup Completed | Sets up all bits that will be masked off from use in Randomizer Calculations. |
| INIT_PROG_MASK | | Mask Register Setup Completed | Sets up all of the Programmable Mask bits and their Impact Registers. |
| RAND_INIT | INITIALIZE_ONE_EQ | | Clears out the Randomizer Table for a specific equation entry. |
| PRAND_ADD_ENTRY | ADD_INPUT_ALL_EQS UPDATE_DISABLED_EQS | | Adds a Randomizer Table Entry for one specific equation. |
| GET_NEW_MULT_ENTRY | PRAND_ADD_ENTRY | | Identifies the next Multiple Table Entry for a Specific Equation. |
| PRAND_SUB_ENTRY | SUB_INPUT_ALL_EQ | | Removes an entry from a Randomizer Table for a single equation. |
| CLEAR_MULT_ENTRY | PRAND_SUB_ENTRY | | Clears out and frees up a multiple entry for a specific equation. |
| IDENTIFY_MULT_INPUT | PRAND_SUB_ENTRY | | Identifies the location where a multiple input resides. |
| RECEIVE_PROCESS_CYCLE | | Packet Received. Randomizer values Time Accelerated and Masked. | Uses Received Randomizer Values to determine an input number match. |
| INITIALIZE_ONE_EQ | INITIALIZE_ALL_EQS UPDATE_DISABLED_EQS {Minor Arbitration} | | Clears out and initializes all Randomizer Table entries for a single equation. |
| INITIALIZE_ALL_EQS | | Power On/Reset | Clears out and initializes all Randomizer Table entries for all equations. |
| ADD_INPUT_ALL_EQS | USER_INPUT_WR_LOAD | | Adds an input to all of the Randomizer Tables. |
| SUB_INPUT_ALL_EQS | USER_INPUT_CLEAR | | Subtracts an input from all of the Randomizer Tables. |
| UPDATE_DISABLED_EQS | | Threshold Reached for requiring equation update. | Brings all inputs into the Input Register and remaps all disabled equations to new equations. |

Captured Packet Classification Description (Interface)

Figure 18:
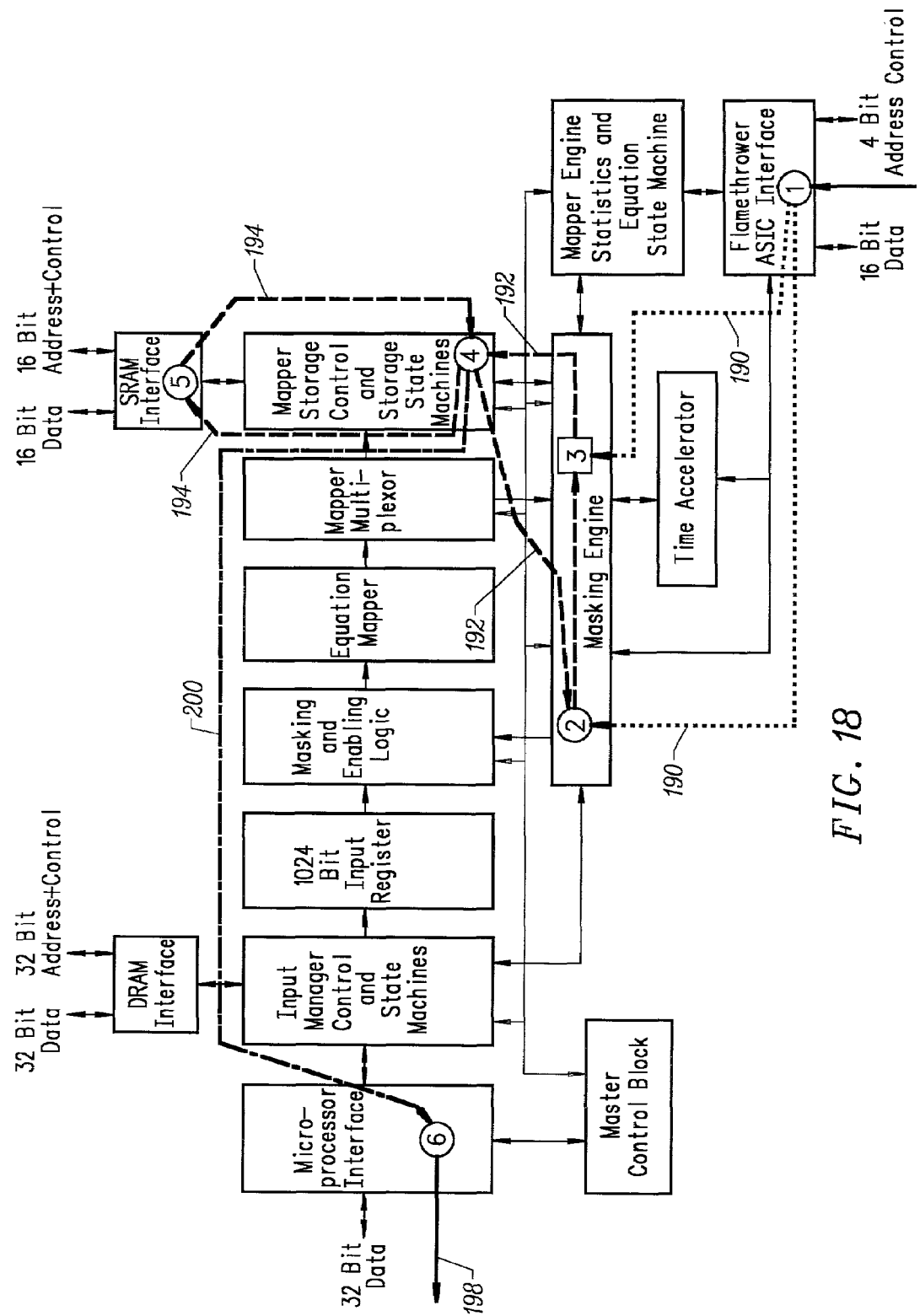
FIG. 18 is a block schematic diagram that shows captured packet classification according to the invention.

In FIG. 18, one path 196 involves latching the output data into various novel custom ASIC registers.

The primary randomizer is latched into the FLAME_PRIM_RAND register.

The secondary randomizer is latched into the FLAME_SEC_RAND register.

The primary randomizer feedback value from the data framer ASIC is latched into the FLAME_PRIM_FB register.

The secondary randomizer feedback value from the data framer ASIC is latched into the FLAME_SEC_FB register.

Zero to four masking registers from the data framer ASIC are latched into the applicable FLAME_MASK_n registers.

A set of paths 190 are initiated when the master control block clears the system to start processing the received values. In the case of a single data framer ASIC, this is immediately.

The path 190 to "2" shows the transfer of the FLAME_MASK_n registers into the MASK_CAPTURE_DATA_n registers. These transfers can be done entirely in parallel in a single cycle.

The path 190 to "3" shows the time acceleration of the received randomizer values. The FLAME_PRIM_RAND value is time accelerated in a single cycle to generate the PRIM_RANDOMIZER_RX value. The FLAME_SEC_RAND value is time accelerated in a single cycle to generate the SEC_RANDOMIZER_RX.

Another set of paths 192 are initiated when the randomizer values need to be modified by masking prior to their use in accessing and verifying entries in the appropriate primary randomizer table.

The path 192 from "2" to "3" shows how the MASK_CAPTURE_DATA, in conjunction with the mask register impact data for the appropriate equation and the selective masking step information is added together with the randomizer value.

The path 192 from "3" to "4" shows how a properly masked randomizer value is directed to the mapper storage state machine.

The path 192 from "4" to "2" reflects how when a new masking step is reached in the mapper storage state machine, the system must re-mask the randomizer values for their use in the next step of the mapper storage state machine.

Another set of paths 194 are used to show how the mapper storage control and storage state machine accesses the external SRAM.

A path 200 is initiated when a match in the primary randomizer table has been found.

The path 200 from "4" to "6" shows how the matching input value is transferred to the microprocessor interface.

In circumstances where no match is encountered, that information must be transferred to the microprocessor.

A path 198 is initiated when a value is ready for the microprocessor to read.

This path generates an interrupt to the microprocessor.

All necessary information regarding the match is contained in a register.

Captured Packet Classification Description (Parallel Microprocessor Interface)

Figure 19:
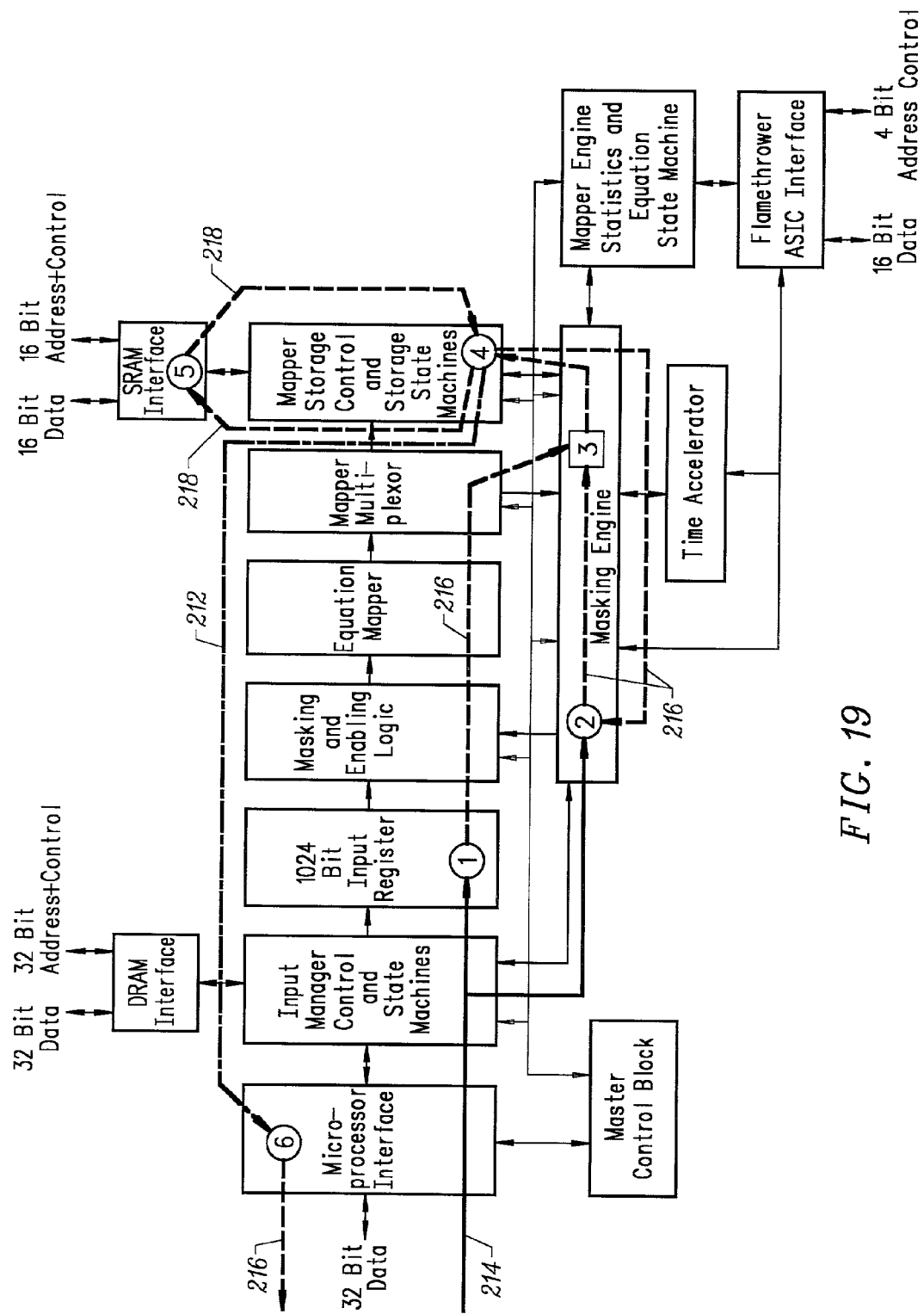
FIG. 19 is a block schematic diagram that shows captured packet classification for a parallel interface according to the invention.

In FIG. 19, one path 214 involves latching parallel microprocessor data into the input register, and any appropriate data into mask capture registers.

The system must write the parallel classification data into the INPUT_CLASS_REG_BANKn registers. This is done indirectly by writing into the INPUT_CLASS_VALUE register.

When a write to the INPUT_CLASS_REG_BANKn is to a mask register that is being used, the system loads the parallel classification mask register.

One set of paths 216 are initiated when the master control block starts the parallel classification process.

When the INPUT_CLASS_WORD_COUNT exceeds the INPUT_DATA_LENGTH, the master controller is interrupted to start the parallel classification process.

The path 216 from "1" to "3" shows how the INPUT_CLASS_REG_BANKn registers are masked with fixed enabling logic, and then mapped and latched into the PRIM_RANDOMIZER_PAR and SEC_RANDOMIZER_PAR registers using the optimal equation at the time.

The path 216 from "2" to "3" shows how the appropriate EQn_MASK_REGm_IMP_BITx (mask impact bits) are applied based on the selective masking step being used to generate the masked randomizer value.

The path 216 from "3" to "4" shows how a properly masked randomizer value is directed to the mapper storage state machine.

The path 216 from "4" to "2" reflects how when a new masking step is reached in the mapper storage state machine, the system must re-mask the randomizer values for their use in the next step of the mapper storage state machine.

Another set of paths 218 are used to show how the mapper storage control and storage state machine accesses the external SRAM.

Another path 212 is initiated when a match in the primary randomizer table has been found.

The path from "4" to "6" shows how the matching input value is transferred to the microprocessor interface.

In circumstances where no match is encountered, that information must be transferred to the microprocessor.

Another path 210 is initiated when a value is ready for the microprocessor to read.

This path generates an interrupt to the microprocessor.

All necessary information regarding the match is contained in a register.

Probability Analysis

The following analysis is used to investigate the probability of any given primary and secondary mapping fitting within the constraints of multiple values mapping to the same endpoint. The basic problem involves the random distribution of mapped input values across an output space of a given size. As an example: if the output space has a size of $2^{16}=65,536$ values, and there are 10,000 random inputs, how many output values are mapped to by zero, one, two, three, four, or more inputs in a random probability analysis. This affects the chances that an individual mapping is usable, and directly impacts the number of mappings that should be maintained at any given time.

General Pairing (and Higher) Odds Calculations

Let us use a problem where we have ten inputs that map to outputs with the letters A to J respectively. As we analyze the probabilities of various scenarios for these odds, we use a generic number of output vectors called "STATES" to signify the possible outputs to which any input can be randomly mapped. For purposes of probability analysis, a pair refers to two inputs mapping to a single output, a triple refers to three inputs mapping to a single output, and a quadruple refers to four inputs mapping to a single output.

Odds of No Pairs

In the case of having no paired outputs, each input must be compared to all of the others. The easiest way to analyze the output situation is to show what equalities do not occur as opposed to what equalities do occur. In the case of outputs being equal, they could be equal because they are components of a pair, a triple, a quadruple, or higher. In the cases of outputs being unequal, the situation is unambiguous. In the following tables, the "!=" sign is used to signify that two outputs are not equal.

When the first output "A" is analyzed, it must be compared against all other outputs. In the comparisons for "A", the odds that "A" is not equal to any other output are (STATES−1)/STATES because there are STATES−1 non "A" outputs in a total of STATES outputs remaining. When the second output "B" is analyzed, the "A" state has already been eliminated. This reduces the possible remaining states to be used in the probability calculation since there are really only STATES−1 possible states, of which STATES−2 do not match "B" (see Table EK below).

TABLE EK

Odds of No Pairs in 10 Inputs

| Output Vector Situation | Probability |
|---|---|
| A!=B | (STATES−1)/STATES |
| A!=C | (STATES−1)/STATES |
| A!=D | (STATES−1)/STATES |
| A!=E | (STATES−1)/STATES |
| A!=F | (STATES−1)/STATES |
| A!=G | (STATES−1)/STATES |
| A!=H | (STATES−1)/STATES |
| A!=I | (STATES−1)/STATES |
| A!=J | (STATES−1)/STATES |
| B!=C | (STATES−2)/(STATES−1) |
| B!=D | (STATES−2)/(STATES−1) |
| B!=E | (STATES−2)/(STATES−1) |
| B!=F | (STATES−2)/(STATES−1) |
| B!=G | (STATES−2)/(STATES−1) |
| B!=H | (STATES−2)/(STATES−1) |
| B!=I | (STATES−2)/(STATES−1) |
| B!=J | (STATES−2)/(STATES−1) |
| C!=D | (STATES−3)/(STATES−2) |
| C!=E | (STATES−3)/(STATES−2) |
| C!=F | (STATES−3)/(STATES−2) |
| C!=G | (STATES−3)/(STATES−2) |
| C!=H | (STATES−3)/(STATES−2) |
| C!=I | (STATES−3)/(STATES−2) |
| C!=J | (STATES−3)/(STATES−2) |
| D!=E | (STATES−4)/(STATES−3) |
| D!=F | (STATES−4)/(STATES−3) |
| D!=G | (STATES−4)/(STATES−3) |
| D!=H | (STATES−4)/(STATES−3) |
| D!=I | (STATES−4)/(STATES−3) |
| D!=J | (STATES−4)/(STATES−3) |
| E!=F | (STATES−5)/(STATES−4) |
| E!=G | (STATES−5)/(STATES−4) |
| E!=H | (STATES−5)/(STATES−4) |
| E!=I | (STATES−5)/(STATES−4) |
| E!=J | (STATES−5)/(STATES−4) |
| F!=G | (STATES−6)/(STATES−5) |
| F!=H | (STATES−6)/(STATES−5) |
| F!=I | (STATES−6)/(STATES−5) |
| F!=J | (STATES−6)/(STATES−5) |
| G!=H | (STATES−7)/(STATES−6) |
| G!=I | (STATES−7)/(STATES−6) |
| G!=J | (STATES−7)/(STATES−6) |
| H!=I | (STATES−8)/(STATES−7) |
| H!=J | (STATES−8)/(STATES−7) |
| I!=J | (STATES−9)/(STATES−8) |

Odds of Any Single Pair

When we are trying to calculate the odds of a single pair in this group of outputs, we can do the same the same sort of a table for a single possibility of a pair. When we are looking at a situation where A=B, the odds can be easily determined as 1/STATES. After the odds for a single pair are calculated, we must multiply by the number of possible pairs to determine the total odds of any pair occurring when ten inputs are mapped into "STATES" possible outputs (see Table EK below).

TABLE EK

Odds of a Single Pair Occurrence where A=B

| Output Vector Situation | Probability |
|---|---|
| A=B | 1/STATES |
| A!=C | (STATES−1)/STATES |
| A!=D | (STATES−1)/STATES |
| A!=E | (STATES−1)/STATES |
| A!=F | (STATES−1)/STATES |
| A!=G | (STATES−1)/STATES |
| A!=H | (STATES−1)/STATES |
| A!=I | (STATES−1)/STATES |
| A!=J | (STATES−1)/STATES |
| C!=D | (STATES−2)/(STATES−1) |
| C!=E | (STATES−2)/(STATES−1) |
| C!=F | (STATES−2)/(STATES−1) |
| C!=G | (STATES−2)/(STATES−1) |
| C!=H | (STATES−2)/(STATES−1) |
| C!=I | (STATES−2)/(STATES−1) |
| C!=J | (STATES−2)/(STATES−1) |
| D!=E | (STATES−3)/(STATES−2) |
| D!=F | (STATES−3)/(STATES−2) |
| D!=G | (STATES−3)/(STATES−2) |
| D!=H | (STATES−3)/(STATES−2) |
| D!=I | (STATES−3)/(STATES−2) |
| D!=J | (STATES−3)/(STATES−2) |
| E!=F | (STATES−4)/(STATES−3) |
| E!=G | (STATES−4)/(STATES−3) |
| E!=H | (STATES−4)/(STATES−3) |
| E!=I | (STATES−4)/(STATES−3) |
| E!=J | (STATES−4)/(STATES−3) |
| F!=G | (STATES−5)/(STATES−4) |
| F!=H | (STATES−5)/(STATES−4) |
| F!=I | (STATES−5)/(STATES−4) |
| F!=J | (STATES−5)/(STATES−4) |
| G!=H | (STATES−6)/(STATES−5) |
| G!=I | (STATES−6)/(STATES−5) |
| G!=J | (STATES−6)/(STATES−5) |
| H!=I | (STATES−7)/(STATES−6) |
| H!=J | (STATES−7)/(STATES−6) |
| I!=J | (STATES−8)/(STATES−7) |

To determine the overall odds, the total number of possible pairs must be calculated. A binomial equation for probability provide us with the total number of pairs in ten outputs.

Binomial Equation:

$$\binom{n}{m} = \frac{n!}{(n-m)! * m!}$$

In the case where n=2 and m=10, referred to as 2 choose 10, the binomial equation above produces a result of 45 possible combinations of a single pair in ten output values.

Odds of Any Single Triple

When we are trying to calculate the odds of a single triple, we are looking at a situation where A=B=C. The odds can for a single occurrence can be easily determined as (1/STATES)*(1/STATES). After the odds for a single triple are calculated, we must multiply by the number of possible triples to determine the total odds of a any triple occurring when 10 inputs are mapped into "STATES" possible outputs (see Table EL below).

TABLE EL

Odds of a Single Triple Occurrence where A=B=C

| Output Vector Situation | Probability |
| --- | --- |
| A=B | 1/STATES |
| A=C | 1/STATES |
| A!=D | (STATES-1)/STATES |
| A!=E | (STATES-1)/STATES |
| A!=F | (STATES-1)/STATES |
| A!=G | (STATES-1)/STATES |
| A!=H | (STATES-1)/STATES |
| A!=I | (STATES-1)/STATES |
| A!=J | (STATES-1)/STATES |
| D!=E | (STATES-2)/(STATES-1) |
| D!=F | (STATES-2)/(STATES-1) |
| D!=G | (STATES-2)/(STATES-1) |
| D!=H | (STATES-2)/(STATES-1) |
| D!=I | (STATES-2)/(STATES-1) |
| D!=J | (STATES-2)/(STATES-1) |
| E!=F | (STATES-3)/(STATES-2) |
| E!=G | (STATES-3)/(STATES-2) |
| E!=H | (STATES-3)/(STATES-2) |
| E!=I | (STATES-3)/(STATES-2) |
| E!=J | (STATES-3)/(STATES-2) |
| F!=G | (STATES-4)/(STATES-3) |
| F!=H | (STATES-4)/(STATES-3) |
| F!=I | (STATES-4)/(STATES-3) |
| F!=J | (STATES-4)/(STATES-3) |
| G!=H | (STATES-5)/(STATES-4) |
| G!=I | (STATES-5)/(STATES-4) |
| G!=J | (STATES-5)/(STATES-4) |
| H!=I | (STATES-6)/(STATES-5) |
| H!=J | (STATES-6)/(STATES-5) |
| I!=J | (STATES-7)/(STATES-6) |

The binomial equation for n=3, m=10 provides a total of 120 possible triples given ten possible output values. The odds for the single triple must be multiplied by 120 to get the overall odds for all cases of a single triple.

Odds of Any Single Quadruple

When we are trying to calculate the odds of a single quadruple, we are looking at a situation where A=B=C=D. The odds can for a single occurrence can be easily determined as (1/STATES)*(1/STATES)*(1/STATES). After the odds for a single quadruple are calculated, we must multiply by the number of possible quadruples to determine the total odds of any quadruple occurring when ten inputs are mapped into "STATES" possible outputs (see Table EM below).

TABLE EM

Odds of a Single quadruple Occurrence where A=B=C

| Output Vector Situation | Probability |
| --- | --- |
| A=B | 1/STATES |
| A=C | 1/STATES |
| A=D | 1/STATES |
| A!=E | (STATES-1)/STATES |
| A!=F | (STATES-1)/STATES |
| A!=G | (STATES-1)/STATES |
| A!=H | (STATES-1)/STATES |
| A!=I | (STATES-1)/STATES |
| A!=J | (STATES-1)/STATES |
| E!=F | (STATES-2)/(STATES-1) |
| E!=G | (STATES-2)/(STATES-1) |
| E!=H | (STATES-2)/(STATES-1) |
| E!=I | (STATES-2)/(STATES-1) |
| E!=J | (STATES-2)/(STATES-1) |
| F!=G | (STATES-3)/(STATES-2) |
| F!=H | (STATES-3)/(STATES-2) |
| F!=I | (STATES-3)/(STATES-2) |
| F!=J | (STATES-3)/(STATES-2) |
| G!=H | (STATES-4)/(STATES-3) |
| G!=I | (STATES-4)/(STATES-3) |
| G!=J | (STATES-4)/STATES-3) |
| H!=I | (STATES-5)/(STATES-4) |
| H!=J | (STATES-5)/(STATES-4) |
| I!=J | (STATES-6)/(STATES-5) |

The binomial equation for n=4, m=10 provides a total of 210 possible quadruples given ten possible output values. The odds for the single quadruple must be multiplied by 210 to get the overall odds for all cases of a single quadruple.

Odds of Pair and a Triple:

When we are trying to calculate the odds of a single pair where A=B, and a single triple where C=D=E, the odds are more complex. The odds for the single pair are (1/STATES), and the odds for the single triple are (1/STATES)*(1/STATES). All of the remaining inputs must not pair with either the output from the pair (A) or the output from the triple (C) (see Table EN below).

TABLE EN

Odds of a Single Pair A=B and a Single Triple C=D=E

| Output Vector Situation | Probability |
| --- | --- |
| A=B | 1/STATES (PAIR) |
| C=D | 1/STATES (TRIPLE) |
| C=E | 1/STATES (TRIPLE) |
| A!=C | (STATES-1)/STATES |
| A!=F | (STATES-1)/STATES |
| A!=G | (STATES-1)/STATES |
| A!=H | (STATES-1)/STATES |
| A!=I | (STATES-1)/STATES |
| A!=J | (STATES-1)/STATES |
| F!=G | (STATES-2)/(STATES-1) |
| F!=H | (STATES-2)/(STATES-1) |
| F!=I | (STATES-2)/(STATES-1) |
| F!=J | (STATES-2)/(STATES-1) |
| G!=H | (STATES-3)/(STATES-2) |
| G!=I | (STATES-3)/(STATES-2) |
| G!=J | (STATES-3)/(STATES-2) |
| H!=I | (STATES-4)/(STATES-3) |
| H!=J | (STATES-4)/(STATES-3) |
| I!=J | (STATES-5)/(STATES-4) |

The calculation of the number of possible occurrences of a single pair and a single triple are slightly harder. For each possible pair, there are eight remaining outputs that can generate a triple. Similarly, for each possible triple, there are seven possible outputs remaining that can generate a pair. Approaching this problem from either side will produce the same answer.

Binomial Equation:

$$\binom{n}{m} = \frac{n!}{(n-m)! * m!}$$

Total Possibility Calculation for a Single Pair and a Single Triple:

$$\binom{2}{10} * \binom{3}{8} = 2520$$

General Formula Development

By reviewing the above tables for "No Pairs", "Single Pair", "Single Triple", "Single quadruple", and "Single Pair and Single Triple", it is possible to develop a generic formula to calculate the probability. The first term in the formula accounts for the pairs, triples and quadruples. This term accounts for the (1/STATES) terms for all of the possible outputs that are paired.

$$\text{Match Term} = \left(\frac{1}{STATES}\right)^{(Pairs+2*Triples+3*Quadruples)}$$

Once the pairs, triples, and quadruples have been accounted for, all of the appropriate outputs must be checked to make sure they do not match any other output. One element from each pair, triple and quadruple must be checked against one element from all remaining pairs, triples, and quadruples in addition to the remaining un-matched outputs. All remaining un-matched outputs must also be checked against each other to verify that they do not match. The UNMATCHED_OUTPUTS−1 term accounts for the fact that with n outputs, there are only n−1 checks to be done with the first one.

Non_Match_Term =

$$\prod_{m=0}^{\{UNMATCHED\_OUTPUTS-1\}} \left(\frac{STATES-1-m}{STATES-m}\right)^{\{UNMATCHED\_OUTPUTS-m\}}$$

UNMATCHED_OUTPUTS=INPUTS−1−PAIRS−2*TRIPLES−3*QUADRUPLES

Occurrence_Probability=Match_Term*Non_Match_Term

Overall Odds for Pair/Triple/QuadrupleSituation=#Occurrences*Occurrence_Probability Calculation of Number of Occurrences The number of occurrences (combo_hits) for any given combination of pairs, triples, and quadruples is calculated in a sequential form. The problem can be broken down first into calculating the combinations of quadruples within the space of inputs, then by subtracting out the inputs associated with quadruples and calculating the combinations of triples within the remaining space of inputs, and finally by subtracting out the inputs associated with quadruples and triples, and calculating the combinations of pairs within the remaining space of inputs. The combination values for pairs, triples and quadruples can be multiplied together to determine the overall odds for a specific combination of these elements.

The following examples show empirically how this is done, and show the derivation of the formulas for pairs and triples.

Explanation of Combo_hits Pair Calculation for 10 Inputs

The number of possibilities is based purely upon the number of inputs that are present. If there are ten inputs, there are (10 choose 2)=45 possible pairs in ten inputs. Once the first pair is gone, there are (8 choose 2)=28 chances of selecting a second pair from the remaining inputs. Once the second pair is gone, there are (6 choose 2)=15 chances of selecting a third pair from the remaining inputs.

Given 45 possible pairs, there are (45 choose 3)=14190 combinations of three pairs out of 45 possible pairs.

The odds for the first pair are 45/45, the odds for the second pair to be non-overlapping are 28/44, and the odds for the third pair to be non-overlapping are 15/43.

Pair Example for 10 Inputs

If there are enough inputs left to make a pair:
1 Possible_Pairs=N_Choose_M (in puts−3*(triple_count)−2*(pair_Count−1 ),2) Check remaining Inputs, How many possible pairs can be found.
2 Possible_Pairs/=(Total_pairs-(pair_count−1))
3 Running_Pair_Hits*=Possible_Pairs
4 Combo_Hits=Running_Pair_Hits *N_Choose_M(Total_Pairs, Pair_count)

TABLE EO

Example of ten Inputs and up to five pairs:

Total_Pairs = N_Choose_M(10,2) = 45
Running_Pair_Hits = 1

| Step | Step #1 Possible Pairs | Step #2 2 Pairs | Step #3 Running_ Pair_Hits | Step #4 Combo_Hits |
|---|---|---|---|---|
| No Pairs | N/A | N/A | 1 | 1 |
| 1 | 10 Choose 2 =45 | /45 =1 | =1 | 1*(45 Choose 1) =45 |
| 2 | 8 Choose 2 =28 | /44 =0.636363 | =0.636363 | 0.63*(45 Choose 2) =0.63*990 =630 |
| 3 | 6 Choose 2 =15 | /43 =0.348837 | =0.221987 | 0.22*(45 Choose 3) =0.22*14190 =3150 |
| 4 | 4 Choose 2 =6 | /42 =0.142857 | =0.031712 | 0.031*(45 Choose 4) =0.031*148995 =4725 |
| 5 | 2 Choose 2 =1 | /41 =0.02439 | =0.0007735 | 0.00073*(45 Ch. 5) =0.00073*1221759 =945 |

Test for five pairs:
{(10 Choose 2)/Total_Pairs}*{(8 Choose 2)/(Total_Pairs−1)}*{(6 Choose 2)/(Total_Pairs−2)}*
{(4 Choose 2)/(Total_Pairs−3)}*{(2 Choose 2)/(Total_Pairs−4)}

$$\text{running\_hits} = \frac{10!}{(10-2)!*2!} * \frac{8!}{(8-2)!*2!} *$$

-continued $$\frac{6!}{(6-2)! * 2!} * \frac{4!}{(4-2)! * 2!} * \frac{2!}{(2-2)! * 2!} * \frac{(total\_pairs - pairs)!}{(total\_pairs)!}$$

$$running\_hits = \frac{inputs!}{(inputs - 2 * pairs)!} * \frac{1}{2!^{pairs}} * \frac{(total\_pairs - pairs)!}{(total\_pairs)!}$$

$$combo\_hits = \frac{inputs!}{(inputs - 2 * pairs)!} * \frac{1}{2!^{pairs}} *$$
$$\frac{(total\_pairs - pairs)!}{(total\_pairs)!} * \frac{(total\_pairs)!}{(total\_pairs - pairs)! * pairs!}$$

$$combo\_hits\_for\_pairs = \frac{inputs!}{(inputs - 2 * pairs)!} * \frac{1}{2!^{pairs}} * \frac{1}{pairs!}$$

Triple Example for Fifteen Inputs
If there are enough inputs left to make a triple:
1  Possible_Triples=N_Choose_M(inputs-3*(triple_count-1),3) Check remaining Inputs, How many possible triples can be found.
2 Possible_Triples/=(Total_triples-(triple_count-1))
3 Running_Triple_Hits*=Possible_Triples
4 Combo_Hits=Running_Triple_Hits *N_Choose_M(Total_Triples, Triple_count)
Total_triples=N_Choose_M(15,3)=455
Running_Triple_Hits=1

TABLE EP

Example of fifteen inputs and up to five triples

| Step | Step #1 Possible Triples | Step #2 Divide by Total Trips | Step #3 Running_ Triple_Hits | Step #4 Combo_Hits |
|---|---|---|---|---|
| No Triples | N/A | N/A | 1 | 1 |
| 1 | 15 Choose 3 =455 | /455 =1 | =1 | 1*(455 Choose 1) =455 |
| 2 | 12 Choose 3 =220 | /454 =0.4846 | =0.4846 | 0.4846*(455 Choose 2) =0.4846*103285 =50050 |
| 3 | 9 Choose 3 =84 | /453 =0.1854 | =0.0898 | 0.0898*(455 Choose 3) =0.0898*15596035 =1401400 |
| 4 | 6 Choose 3 =20 | /452 =0.04424 | =0.00397 | 0.00397*(455 Choose 4) =0.00397*1762351 955 =7007000 |
| 5 | 3 Choose 3 =1 | /451 =0.02217 | =8.8158e−6 | 8.8158e−6*(455 Ch. 5) =8.8158e− 6*158964146341 =1401400 |

Test for five triples:
{(15 Choose 3)/Total_Trips}*{(12 Choose 3)/(Total_Trip-1)}*{(9 Choose 3)/(Total_Trips-2)}*
{(6 Choose 3)/(Total_Trips-3)}*{(3 Choose 3)/(Total_Trips-4)}

$$running\_hits = \frac{15!}{(15-3)! * 3!} * \frac{12!}{(12-3)! * 3!} * \frac{9!}{(9-3)! * 3!} *$$
$$\frac{6!}{(6-3)! * 3!} * \frac{3!}{(3-3)! * 3!} * \frac{(total\_triples - triples)!}{(total\_triples)!}$$

$$running\_hits = \frac{inputs!}{(inputs - 3 * triples)!} * \frac{1}{3!^{triples}} * \frac{(total\_triples - triples)!}{(total\_triples)!}$$

$$combo\_hits = \frac{inputs!}{(inputs - 3 * triples)!} * \frac{1}{3!^{triples}} *$$
$$\frac{(total\_triples - triples)!}{(total\_triples)!} * \frac{(total\_triples)!}{(total\_triples - triples)! * triples!}$$

$$combo\_hits\_triples = \frac{inputs!}{(inputs - 3 * triples)!} * \frac{1}{3!^{triples}} * \frac{1}{triples!}$$

Quadruple Example for 20 Inputs:
If there are enough inputs left to make a quadruple:
1  Possible_quadruples=N_Choose_M(inputs-4*(quadruple_count-1),4) Check remaining Inputs, How many possible quadruples can be found.
2 Possible_quadruples/=(Total_quadruples-(quadruple_count-1))
3 Running_quadruple_Hits*=Possible_quadruples
4 Combo_Hits=Running_quadruple Hits *N_Choose_M (Total_quadruples, quadruple_count)

TABLE EQ

Example of twenty inputs and up five quadruples

Total_quadruples = N_Choose_M(20,4) = 4845
Running_Triple_Hits=1

| Step | Step #1 Possible quadruples | Step #2 Divide by Total Quads | Step #3 Running_ Quad_Hits | Step #4 Combo_Hits |
|---|---|---|---|---|
| No Quads | N/A | N/A | 1 | 1 |
| 1 | 20 Choose 4 =4845 | /4845 =1 | =1 | 1*(4845 Choose 1) =4845 |
| 2 | 16 Choose 4 =1820 | /4844 =0.3757 | =0.3757 | 0.3757*(4845 Choose 2) =0.3757*11734590 4408685 |
| 3 | 12 Choose 4 =495 | /4843 =0.1022 | =0.038402 | 0.0384*(4845 Choose 3) =0.0384*18943539 790 =727476750 |
| 4 | 8 Choose 4 =70 | /4842 =0.014457 | =0.000555 | 0.000555*(4845 Choose 4) =0.000555*229311 54915795 =12730843125 |
| 5 | 4 Choose 4 =1 | /4841 =0.000207 | =1.146E−7 | 1.146E-7*(4845 Ch. 5) =8.8158e− 6*22201944189472 |

TABLE EQ-continued

Example of twenty inputs and up five quadruples

Total_quadruples = N_Choose_M(20,4) = 4845
Running_Triple_Hits=1

| Step | Step #1 Possible quadruples | Step #2 Divide by Total Quads | Step #3 Running_ Quad_Hits | Step #4 Combo_Hits |
|---|---|---|---|---|
|  |  |  |  | 700 =2546168625 |

Test for five quadruples:

{(20 Choose 4)/Total_Quads}*{(16 Choose 4)/(Total_Quads−1)}*{(12 Choose 4)/(Total_Quads−2)}*{(8 Choose 4)/(Total_Quads−3)}*{(4 Choose 4)/(Total_Quads−4)}

$$\text{running\_hits} = \frac{20!}{(20-4)! * 4!} * \frac{16!}{(16-4)! * 4!} * \frac{12!}{(12-4)! * 4!} * \frac{8!}{(8-4)! * 4!} * \frac{4!}{(4-4)! * 3!} * \frac{(\text{total\_quads} - \text{quads})!}{(\text{total\_quads})!}$$

$$\text{running\_hits} = \frac{\text{inputs}!}{(\text{inputs} - 4 * \text{quads})!} * \frac{1}{4!^{\text{quadruples}}} * \frac{(\text{total\_quads} - \text{quads})!}{(\text{total\_quads})!}$$

$$\text{combo\_hits} = \frac{\text{inputs}!}{(\text{inputs} - 4 * \text{quads})!} * \frac{1}{4!^{\text{quadruples}}} * \frac{(\text{total\_quads} - \text{quads})!}{(\text{total\_quads})} * \frac{(\text{total\_quads})!}{(\text{total\_quads} - \text{quads})! * \text{quads}!}$$

$$\text{combo\_hits\_quadruples} = \frac{\text{inputs}!}{(\text{inputs} - 4 * \text{quads})!} * \frac{1}{4!^{\text{quadruples}}} * \frac{1}{\text{quadruples}!}$$

Multiple Table Analysis

Introduction

The following analysis is used to evaluate the odds that various combinations of multiple tables will be sufficient for handling all of the pairs, triples and quadruples that may arise. The issue is what the odds are that any given equation will be handled properly by the tables that are available. If this overall odds for any random equation is too low, then it will be necessary to store mappings for more equations and to be able to swap equations more frequently.

Primary Randomizer Simulations for Various Scenarios

The following Primary Randomizer simulations were run for 10,000 inputs and 65,536 states. The goal of these simulations was to show what probability of success could be achieved by permitting a certain number of pairs, triples and quadruples of Primary Randomizer values.

| Maximize Pairs, and Vary Triples with No Quadruples | |
|---|---|
| 1024 Pairs, 0 Triples, 0 Quadruples | 5.49e−16 |
| 1024 Pairs, 8 Triples, 0 Quadruples | 3.30e−8 |
| 1024 Pairs, 16 Triples, 0 Quadruples | 1.59e−4 |
| 1024 Pairs, 24 Triples, 0 Quadruples | 0.014 |
| 1024 Pairs, 32 Triples, 0 Quadruples | 0.121 |
| 1024 Pairs, 40 Triples, 0 Quadruples | 0.240 |
| 1024 Pairs, 48 Triples, 0 Quadruples | 0.268 |
| 1024 Pairs, 56 Triples, 0 Quadruples | 0.269 |

This experiment shows that allowing more than 48 Triples seems to produce minimal impact.

| Use 48 Triples, and Vary Pairs with No Quadruples | |
|---|---|
| 128 Pairs, 48 Triples, 0 Quadruples | 2.6895e−168 |
| 256 Pairs, 48 Triples, 0 Quadruples | 1.7762e−87 |
| 384 Pairs, 48 Triples, 0 Quadruples | 9.8751e−39 |
| 512 Pairs, 48 Triples, 0 Quadruples | 6.6245e−12 |
| 640 Pairs, 48 Triples, 0 Quadruples | 0.067 |
| 768 Pairs, 48 Triples, 0 Quadruples | 0.268 |
| 896 Pairs, 48 Triples, 0 Quadruples | 0.268 |
| 1024 Pairs, 48 Triples, 0 Quadruples | 0.268 |

This experiment shows that allowing more than 768 Pairs seems to produce minimal impact.

| Use 896 Pairs, 48 Triples, and Vary Quadruples | |
|---|---|
| 896 Pairs, 48 Triples, 0 Quadruples | 0.268 |
| 896 Pairs, 48 Triples, 1 Quadruple | 0.609 |
| 896 Pairs, 48 Triples, 2 Quadruples | 0.826 |
| 896 Pairs, 48 Triples, 3 Quadruples | 0.917 |
| 896 Pairs, 48 Triples, 4 Quadruples | 0.946 |
| 896 Pairs, 48 Triples, 5 Quadruples | 0.954 |

This experiment shows that allowing more than 5 Quadruples seems to produce minimal impact.

Primary Randomizer Simulation Conclusions

The above experiments show that for the example of 65,536 States and 10,000 inputs, there is a better than 95% chance that a Primary Randomizer equation value will produce no more than 896 Pairs, 48 Triples, 5 Quadruples. By permitting 1024 Multiple Entries, that can be pairs, triples or quadruples, the odds of a successful Primary Randomizer will therefore be better than 95%.

Secondary Randomizer Probability Analysis

Introduction

Once the Primary Randomizer spreads out the inputs across the memory space, the job of the Secondary Randomizer is to differentiate between any paired, tripled or quadrupled inputs. The probability analysis for this function is much different than for the Primary Randomizer. For ease of analysis, worst case Primary Randomizer distributions can be used instead of weighting the values for all possible situations.

Pairs

In the case of a Primary Randomizer Pair, the odds that the uncorrelated Secondary Randomizer values will be the same can be calculated as follows:

$$\text{Odds\_Pair\_Has\_No\_Match} = \frac{\text{STATES} - 1}{\text{STATES}}$$

In the case of a Pair, this is a straightforward probability where there are (STATES−1) out of (STATES) values for the second Secondary Randomizer Value that will not be a match.

Triples

In the case of a Triple with three Secondary Randomizer Values labeled A, B, and C, there are a number of odds that must be included. There are three individual possibilities that must be considered where A=B, B=G or A=C. Any of these could individually destroy the usability of the Triple, and they include the odds of all three being the same.

$$\text{Odds\_Triple\_A\_Equals\_B} = \frac{1}{\text{STATES}}$$

$$\text{Odds\_Triple\_Has\_Match} = \frac{3}{\text{STATES}}$$

$$\text{Odds\_Triple\_Has\_No\_Match} = 1 - \frac{3}{\text{STATES}}$$

$$\text{Odds\_Triple\_Has\_No\_Match} = \frac{\text{STATES} - 3}{\text{STATES}}$$

Quadruples

In the case of a Quadruple, with four Secondary Randomizer Values labeled A, B, C and D, there are a number of odds that must be included. There are six possible cases of a pair: A=B, A=C, A=D, B=C, B=D, and C=D.

$$\text{Odds\_Quadruple\_A\_Equals\_B} = \frac{1}{\text{STATES}}$$

$$\text{Odds\_Quadruple\_Has\_Match} = \frac{6}{\text{STATES}}$$

$$\text{Odds\_Quadruple\_Has\_No\_Match} = 1 - \frac{6}{\text{STATES}}$$

$$\text{Odds\_Quadruple\_Has\_No\_Match} = \frac{\text{STATES} - 6}{\text{STATES}}$$

Overall Secondary Randomizer Odds

In a case with a number of Pairs, Triples and Quadruples, the following formula can be used to determine the Overall Odds that the Secondary Randomizer will differentiate all Pairs, Triples and Quadruples.

Odds_Good_SR=Odds_Pair_Has_No_Match$^{Number\_Pairs}$ *

Odds_Triple_Has_No_Match$^{Number\_Triples}$ *

Odds_Quadruple_Has_No_Match$^{Number\_Quadruples}$

Secondary Randomizer Example

For an example case of 65536 States, with 896 Pairs, 48 Triples, and 5 Quadruples, the odds that the Secondary Randomizer values will not be duplicated for any of the pairs, triples or quadruples can be calculated as follows:

$$\_SR = \left(\frac{\text{STATES} - 1}{\text{STATES}}\right)^{896} * \left(\frac{\text{STATES} - 3}{\text{STATES}}\right)^{48} * \left(\frac{\text{STATES} - 6}{\text{STATES}}\right)^{5}$$

Odds_Good_SR=0.983445

In this example, there is a greater than 98% chance that the Secondary Randomizer will differentiate all of the pairs, triples, and quadruples. It should be noted that the odds that 896 pairs, 48 triples and 5 quadruples will be needed are very slim. In the average case, the odds that the Secondary Randomizer will be usable will be much improved.

Feedback Shift Register Theory

Figure 20:
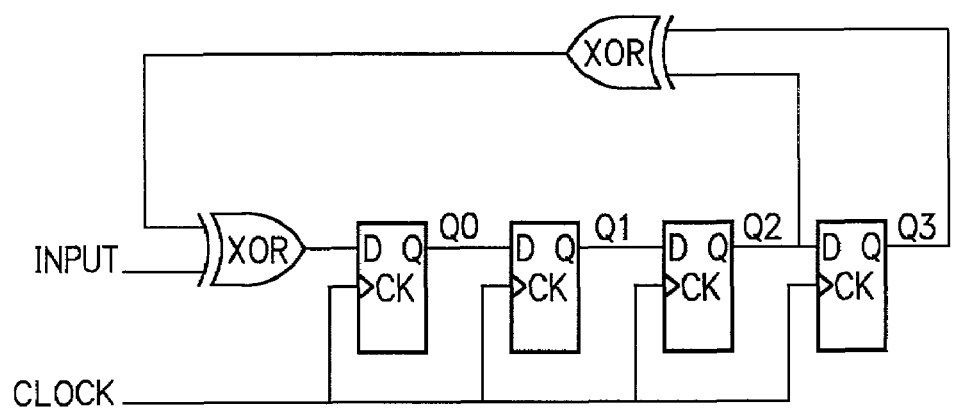
FIG. 20 is a block schematic diagram that shows a sample 4-bit feedback shift register.

The purpose of this discussion is to explain the basics of serial shift register theory, and how those apply to the system. The areas that are analyzed include basic feedback shift register operation, future state prediction, shift register time acceleration, and masking of input values. A four bit feedback shift register is used to explain the theory behind the system (see FIG. 20).

Basic Feedback Shift Register Theory

An exemplary basic feedback shift register contains four D-flip flops that are clocked simultaneously. Each of these flip flops is also known as a stage in the shift register. With four stages, the shift register has $2^4=16$ possible states. In the case of the shift register in this example, the Q2 and Q3 stages are fed back to generate the first stage Q0 in conjunction with the INPUT value. This feedback mechanism occurs continuously for each clock of the CLOCK signal, and results in the values of Q0–Q3 cycling through a pattern that depends upon their initial state as well as the pattern of INPUTs that are applied.

Equations For Each Shift Register Stage

The next value of each shift register stage, i.e. Q0+, Q1+, Q2+ and Q3+, can be calculated as a function of both the present values of all shift register stages, i.e. Q0, Q1, Q2 and Q3, and the value of the INPUT.

Shift Register Equations $Q0+=((\text{INPUT}) \text{ XOR } (Q2 \text{ XOR } Q3))$ $Q1+=Q0$ $Q2+=Q1$ $Q3+=Q2$ Features of XOR Gates and XORTrees A 2-input XOR gate produces an output of "1" when it's inputs are different. If a 2-input XOR gate's inputs are the same, it produces and output of "0". When more than two inputs are XOR'd together, the output is a "1" if there are an odd number of inputs that are "1"s and the output is a "0" if there are zero or an even number of inputs that are "1" (see Table ER below).

TABLE ER

| XOR Gate Logic Truth Table | | |
|---|---|---|
| Input 1 | Input 2 | Output |
| 0 | 0 | 0 |
| 0 | 1 | 1 |

TABLE ER-continued

XOR Gate Logic Truth Table

| Input 1 | Input 2 | Output |
|---------|---------|--------|
| 1 | 0 | 1 |
| 1 | 1 | 0 |

From the XOR logic truth table, it can be seen that the for an value "A", the XOR of "A" and "A" equals "0". This results because whether "A" is a 0 or a 1, when "A" is XOR'd with itself, the output is a zero. This feature is critical when evaluating shift registers over time.

Shift Register State Prediction

As a shift register is clocked along, the feedback continues to introduce values back into the input stage. In some cases, these cancel out terms that exist due to the fact that "A" XOR "A" =0. In other cases, terms continue to propagate. For purposes of description, the sequence of inputs that are applied to the shift register are A,B,C,D,E,F,G,H,J,K,L,M,N. In this example, the initial state is assumed to be Q0=Q0S, Q1=Q1S, Q2=Q2S, and Q3=Q3S to signify that these are starting values. For description purposes, the XOR of multiple inputs are XOR(a,b,c, . . . z). In Table ES shown below, terms that are canceled out for a specific stage after a specific input are not shown.

From a theoretical standpoint, the exemplary shift register could be used to map inputs A,B,C,D,E,F,G,H,J,K,L,M, and N to a 4 bit value consisting of Q0, Q1, Q2 and Q3. Theoretically, after a shift register has been clocked through some number of cycles (thirteen in this case), the output can be predicted exactly by knowing what the inputs were and what the initial condition was. In the case of the system, the randomizers in the data framer ASIC are initialized to all 0's prior to the start of the packet. This removes the Q0S, Q1S, Q2S, and Q3S terms from the analysis since they are $0^i$. By doing this, the state of each stage becomes an XOR tree of a set of inputs.

The system could allow the randomizer to start at any value at the start of the packet. In that case, the value of the randomizer at the start of the packet would have to be captured and factored out of the final result. The mapped effects of the initial condition would have to be subtracted out of the final randomizer numbers knowing what the initial conditions were. This approach is similar to the masking approaches used in the system.

In the case of Table ES, Q0 after thirteen cycles is the XOR of inputs B,C,D,E,G,J,K and N. This XOR function can be implemented in a tree of XOR gates to generate the value. The values of Q1, Q2, and Q3 can be calculated using similar trees of XOR gates that use the inputs found in their specific equation.

TABLE ES

Shift Register State Prediction

| Input | Q0 Value | Q1 Value | Q2 Value | Q3 Value |
|-------|----------|----------|----------|----------|
|  | Q0S | Q1S | Q2S | Q3S |
| A | XOR(A,Q2S,Q3S) | Q0S | Q1S | Q2S |
| B | XOR(B,Q1S,Q2S) | XOR(A,Q2S,Q3S) | Q0S | Q1S |
| C | XOR(C,Q0S,Q1S) | XOR(B,Q1S,Q2S) | XOR(A,Q2S,Q3S) | Q0S |
| D | XOR(A,D,Q0S,Q2S,Q3S) | XOR(C,Q0S,Q1S) | XOR(B,Q1S,Q2S) | XOR(A,Q2S,Q3S) |
| E | XOR(A,B,E,Q1S,Q3S) | XOR(A,D,Q0S,Q2S,Q3S) | XOR(C,Q0S,Q1S) | XOR(B,Q1S,Q2S) |
| F | XOR(B,C,F,Q0S,Q2S) | XOR(A,B,E,Q1S,Q3S) | XOR(A,D,Q0S,Q2S,Q3S) | XOR(C,Q0S,Q1S) |
| G | XOR(A,C,D,G,Q1S,Q2S,Q3S) | XOR(B,C,F,Q0S,Q2S) | XOR(A,B,E,Q1S,Q3S) | XOR(A,D,Q0S,Q2S,Q3S) |
| H | XOR(B,D,E,H,Q0S,Q1S,Q3S) | XOR(A,C,D,G,Q1S,Q2S,Q3S) | XOR(B,C,F,Q0S,Q2S) | XOR(A,B,E,Q1S,Q3S) |
| J | XOR(A,C,E,F,J,Q0S,Q1S,Q2S,Q3S) | XOR(B,D,E,H,Q0S,Q1S,Q3S) | XOR(A,C,D,G,Q1S,Q2S,Q3S) | XOR(B,C,F,Q0S,Q2S) |
| K | XOR(A,B,D,F,G,K,Q0S,Q1S,Q3S) | XOR(A,C,E,F,J,Q0S,Q1S,Q2S,Q3S) | XOR(B,D,E,H,Q0S,Q1S,Q3S) | XOR(A,C,D,G,Q1S,Q2S,Q3S) |
| L | XOR(A,B,C,E,G,H,L,Q0S,Q2S) | XOR(A,B,D,F,G,K,Q0S,Q1S,Q3S) | XOR(A,C,E,F,J,Q0S,Q1S,Q2S,Q3S) | XOR(B,D,E,H,Q0S,Q1S,Q3S) |
| M | XOR(A,B,C,D,F,H,J,M,Q2S) | XOR(A,B,C,E,G,H,L,Q0S,Q2S) | XOR(A,B,D,F,G,K,Q0S,Q1S,Q3S) | XOR(A,C,E,F,J,Q0S,Q1S,Q2S,Q3S) |
| N | XOR(B,C,D,E,G,J,K,N,Q2S) | XOR(A,B,C,D,F,H,J,M,Q2S) | XOR(A,B,C,E,G,H,L,Q0S,Q2S) | XOR(A,B,D,F,G,K,Q0S,Q1S,Q3S) |

By viewing Table ES, it can be seen that the XOR terms for a specific stage such as Q0 vary from clock cycle to clock cycle. Instead of providing length variability by attempting to calculate these trees for each length (which would be extremely prohibitive in size), the system uses a fixed length the case of Table ET below, each shift is determined by looking at the table above and removing all of the Input values because these are each 0. The values listed Table ET below reflect how a starting value of Q0S, Q1S, Q2S, Q3S is mapped after "n" cycles of "0" inputs.

TABLE ET

| Number of Zeros | Q0 Value | Q1 Value | Q2 Value | Q3 Value |
|---|---|---|---|---|
| Binary Weighted "0" Input Shifts | | | | |
| 1 | XOR(Q2S,Q3S) | XOR(Q0S) | XOR(Q1S) | XOR(Q2S) |
| 2 | XOR(Q1S,Q2S) | XOR(Q2S,Q3S) | XOR(Q0S) | XOR(Q1S) |
| 4 | XOR(Q0S,Q2S,Q3S) | XOR(Q0S,Q1S) | XOR(Q1S,Q2S) | XOR(Q2S,Q3S) | of inputs in its equation generators regardless of the end user length selection. The system relies on the fact that a "0" value input does not appear in the output state vectors, other than in the shifting of the state register that it introduces.

Time Acceleration Theory

To produce a general purpose ASIC, the system implements a large number of possible input values (1024). This large fixed value allows a single set of XOR trees to be implemented to calculate the state values for each equation. The result is that in most situations, the input values that the user is classifying are padded with trailing "0" values. In many applications, users may wish to classify only 50 to 100 possible inputs. In the data framer ASIC, the randomizers could continue to cycle "0" values into the randomizers, after the bits of interest, to reach a final value of 1024 that is used to generate all equation values. This results in added time delay, and additional power consumption in the high speed data framer. As an alternative, a feature called time acceleration is used.

If a feedback shift register, is applied a sequence of "0"s prior to being disabled, the final output state is a predictable value based on the state prior to the start of the shifting in of "0"s, and the number of "0"s that are shifted in. In Table ES, this can be viewed as having an initial state and then having all "0" inputs. In this case, the output vector after some number of cycles is purely a functional re-mapping through an XOR tree of the initial state. To provide flexibility, a set of binary weighted shifters are implemented. This permits from 1 to 1023 trailing zeros to be effectively simulated by the time accelerator.

As an example of how the successive binary weighting would work, Table ES can be used to show how values are mapped to generate different weightings for shifting 0's. In The time acceleration approach involves selectively and serially mapping the inputs through a number of binary weighted "0" input shift stages to generate an output. For example purposes, a starting vector of Q0S, Q1S, Q2S, and Q3S are first mapped through a "0" input shift length of one. The result is then mapped through a "0" input shift length of two. That result is then mapped through a "0" input shift length of four. The result after mapping through shift lengths of 1, 2, and 4 should then equal a result as though we started with Table ES above and had seven cycles of inputs that were equal to "0" (see Table EU below).

TABLE EU

| Number of Zeros | Q0 Value | Q1 Value | Q2 Value | Q3 Value |
|---|---|---|---|---|
| Mapping Through various Shift Lengths | | | | |
| 0=Start | Q0S | Q1S | Q2S | Q3S |
| 1 | XOR(Q2S,Q3S) | XOR(Q0S) | XOR(Q1S) | XOR(Q2S) |
| 2 | XOR(Q0S, Q1S) | XOR(Q1S, Q2S) | XOR(Q2S,Q3S) | XOR(Q0S) |
| 4 | XOR(Q0S,Q1S, Q2S,Q3S, Q0S)= XOR(Q1S,Q2S,Q3S) | XOR(Q0S,Q1S, Q1S,Q2S)= XOR(Q0S,Q2S) | XOR(Q1S,Q2S, Q2S, Q3S)= XOR(Q1S,Q3S) | XOR(Q2S,Q3S, Q0S)= XOR(Q0S,Q2S,Q3S) |

When comparing with Table ES above, for the INPUT G row, and zeroing out inputs A–G, we can see that the mapping is equivalent to the table immediately above after a total shift of 1,2 and 4 zero inputs. This displays how a variable time accelerated value can be rapidly calculated for a given equation.

Masking Theory

Referring to Table ES above, it can be seen that every input bit appears in an XOR tree term for one or more of the shift register output bits. As described earlier, if an input is XOR'd with itself, the result is a value of "0". Therefore, if a final shift register output is known that included a specific input in its calculations, that input can be removed by XOR'ing each bit in the result with that specific input bit, if that input bit affected the final shift register output (see Table EV below).

TABLE EV

Copied from the Table ES above

| Input | Q0 Value | Q1 Value | Q2 Value | Q3 Value |
|---|---|---|---|---|
| N | XOR(B, C, D, E, G, J, K, N Q2S) | XOR(A, B, C, D, F, H, J, M, Q2S) | XOR(A, B, C, E, G, H, L Q0S, Q2S) | XOR(A, B, D, F, G, K, Q0S, Q1S, Q3S) |

In this case, if we wish to selectively mask out INPUT E from the result, we would XOR input E in with the Q0 and the Q2 bits. The selective masking approach in the system relies on the theory of knowing and subtracting out the effects of specific inputs. For any given Input bit that is desired to be masked out, it is possible to determine which bits in the output result are affected by the input bit. This is done by using the input mapper, for a specific equation, and sets the initial state of the randomizer to all "0"s, while controlling all inputs in parallel simultaneously. The process is done through a walking ones pattern that takes the bit under investigation and sets it to a "1", while setting all other bits to a "0". As each bit that is analyzed is set to a 1, the mapper outputs are stored in bit locations referred to as mask impact bits. The system allows the user to decide selectively what bits must be masked, versus those that can be always analyzed, or those that are never viewed.

Explanation of Masking Effect

The effect of masking is to remove an input from consideration in the analysis. This removal effectively makes the input appear as though it was a 0 and had no affect on the final shift register output. Therefore, there is no difference between a masked input and one that sets all of the masked bits to zero. In the following example of three inputs and their various combinations, input B is masked. The like shaded rows are equivalent as a result of this masking (see Table EW below).

TABLE EW

Masking Effect

| Input A | Masked Input B | Input C |
|---|---|---|
| 0 | 0 | 0 |
| 0 | 0 | 1 |
| 0 | 1 | 0 |
| 0 | 1 | 1 |
| 1 | 0 | 0 |
| 1 | 0 | 1 |
| 1 | 1 | 0 |
| 1 | 1 | 1 |

Sequential Masking

A two step masking operation could be done as follows: first inputs A and B are masked and we differentiate based on input C. If input C is found to be a 0, then input B is masked and we differentiate on input A. If input C is found to be a 1, then input A is masked and we differentiate on input B (see Table EX-EZ below).

TABLE EX

Masking Step #1 (Inputs A and B Masked)

| Masked Input A | Masked Input B | Input C | Post MaskingValue |
|---|---|---|---|
| 0 | 0 | 0 | 0, 0, 0 |
| 0 | 0 | 1 | 0.0, 1 |
| 0 | 1 | 0 | 0, 0, 0 |
| 0 | 1 | 1 | 0, 0, 1 |
| 1 | 0 | 0 | 0, 0, 0 |
| 1 | 0 | 1 | 0, 0, 1 |
| 1 | 1 | 0 | 0, 0, 0 |
| 1 | 1 | 1 | 0, 0, 1 |

TABLE EY

Masking Step #2 (For Cases Where Input C = 0)

| Masked Input A | Masked Input B | Input C | Post MaskingValue |
|---|---|---|---|
| 0 | 0 | 0 | 0, 0, 0 |
| 0 | 1 | 0 | 0, 0, 0 |
| 1 | 0 | 0 | 1, 0, 0 |
| 1 | 1 | 0 | 1, 0, 0 |

TABLE EZ

Masking Step #2 (For Cases Where Input C = 1)

| Masked Input A | Masked Input B | Input C | Post MaskingValue |
|---|---|---|---|
| 0 | 0 | 1 | 0, 0, 1 |
| 0 | 1 | 1 | 0, 1, 1 |
| 1 | 0 | 1 | 0, 0, 1 |
| 1 | 1 | 1 | 0, 1, 1 |

The example above shows how the results of an initial check can be used to drive what masking is done at the next step in the process. In the case that is illustrated, input C is first used to determine whether input A or B should be analyzed.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

The invention claimed is:

1. In a network for high-speed transmission of digital data, said network comprising a memory,
an apparatus for rapid differentiation between input data, the apparatus comprising:
a module comprising a functional element for each of adaptive, programmable, predictive randomization of said digital data; and
said module comprising at least one programmable feedback shift register that is driven by said input data, wherein a final state of said at least one programmable shift register is used as an index into said memory to determine which if any input data pattern has been matched;
wherein said functional element for predictive randomization comprises means for permitting a plurality of possible randomization feedback path mappings to be maintained in said memory at any time;

wherein said functional element for adaptive randomization of said input data comprises means for adjusting said randomization feedback path mappings over time to handle changing input data patterns that are to be analyzed, said apparatus further comprising:

means for maintaining statistics on substantially all presently evaluated feedback randomization path mappings to determine a best randomization feedback path mapping, as well as any randomization feedback path mapping that is no longer usable; and means for quickly bringing substantially all of said input data patterns back to evaluate other possible randomization patterns when said randomization feedback path mapping is no longer usable;

wherein said input data pattern matching effects data classification.

2. The apparatus of claim 1, wherein said at least one shift register comprises a register having at least two feedback paths that can be programmed to be enabled or disabled.

3. The apparatus of claim 2, wherein said at least two programmable feedback paths are comprised such that output values from one feedback path are uncorrelated to output values from another feedback path.

4. The apparatus of claim 3, wherein general probability theory to be used to evaluate randomization of said input data.

5. The apparatus of claim 1, wherein said element for predictive randomization comprises means for pre-calculating said randomization for each possible input data pattern.

6. The apparatus of claim 5, wherein said pre-calculation is performed at a time that a new input data pattern is entered.

7. The apparatus of claim 1, further comprising:

means for performing a full hardware calculation of expected randomization outputs for each input that is applied.

8. The apparatus of claim 7, wherein a plurality of randomizer feedback values are evaluated in real-time when a new input is applied.

9. The apparatus of claim 1, further comprising:

means for implementing sequential masking operations on said input data to accomplish sequential randomization of said input data patterns.

10. The apparatus of claim 9, further comprising:

means for permitting either of fixed or programmable masking of selected bit patterns within said input data.

11. The apparatus of claim 10, wherein said masking operations permit a user to pre-program a series of masking decisions that can result in a final input data pattern match.

12. An apparatus for rapid differentiation between input data comprised of a limited number of input data bits, comprising:

a randomizer for providing a usable feedback randomization pattern, for a random set of received inputs, based upon an effective mapping of received input data patterns to output vectors, the randomizer comprising a primary randomizer for mapping each received input data pattern to an output value, wherein sufficient randomizer feedbacks are simultaneously evaluated to provide that a usable feedback is substantially always available; and a secondary randomizer for differentiating between received input data patterns that have been mapped to a same output value;

wherein entries in each of multiple data input patterns are different from each other said secondary randomizer comprising:

means for permitting a set value of multiple output cases where any of a plurality of input data patterns map to a same output pattern, said means for permitting further including means for evaluating a plurality of paired, tripled or quadrupled output vectors from said primary randomizer.

13. The apparatus of claim 12, wherein for a given number of output states, a given number of received input data patterns, and a given number of multiple outputs, said means for handling determines a probability that any specific randomizer feedback maps said input data patterns into a usable set of output states.

14. A method for ultra-high speed data classification, comprising the steps of:

providing a data framer comprising an adaptive programmable randomizer, the adaptive programmable randomizer comprising primary and secondary randomizers for framing input data;

providing a complex circuit for permitting a user to differentiate between a plurality of different patterns in said input data, said complex circuit performing the step of:

performing serial mode classification of said input data to produce extremely fast characterization in a predictable timeframe by performing adaptive programmable randomization to differentiate between input vectors;

wherein said adaptive, programmable randomization comprises the steps of:

maintaining multiple input pattern mappings associated with different primary and secondary randomizer equations;

determining a best randomizer selection;

deciding when to switch randomizer values; and determining when a randomizer value is no longer useful and an entirely new mapping should be generated.

15. An apparatus for ultra-high speed data classification, comprising:

a data framer;

said data framer comprising an adaptive programmable randomizer, the adaptive programmable randomizer comprising primary and secondary randomizers; and a complex circuit for controlling said adaptive programmable randomizer, wherein said primary and secondary randomizers are programmably configured by said complex circuit;

wherein said complex circuit maintains multiple input pattern mappings associated with different primary and secondary randomizer equations, determines a best randomizer selection, decides when to switch randomizer values, and determines when a randomizer value is no longer useful and an entirely new mapping should be generated.

16. The apparatus of claim 15, said data framer further comprising:

a plurality of registers for setting up feedback configurations for said randomizers.

17. The apparatus of claim 15, said data framer further comprising:

a randomizer enable control block.

18. The apparatus of claim 17, wherein a clock to said primary and secondary randomizers is gated ON and OFF by an enable randomizer signal that is generated by said enable control block; and wherein said enable randomizer signal is turned on at the start of a packet.

19. The apparatus of claim 15, said data framer further comprising:

a masking control block that allows programmable, sequential, user controlled masking of groups of user defined bits.

20. The apparatus of claim 15, said data framer further comprising:

an output register synchronization and queue that assures that said primary randomizer, said secondary randomizer, feedback registers, and masking registers are stored for each packet.

21. The apparatus of claim 15, wherein said complex circuit comprises any of the following:

a microprocessor interface for communicating to a host processor system;

a first memory interface for communicating with either of a stand alone memory or shared dual port memory, for storing data patterns to be matched;

a second memory interface for communicating with a dedicated memory that contains mappings for a plurality of primary and secondary randomizer settings; and an interface for communicating with said data framer.

* * * * *